United States Patent
Vorbach

(10) Patent No.: US 9,348,587 B2
(45) Date of Patent: May 24, 2016

(54) PROVIDING CODE SECTIONS FOR MATRIX OF ARITHMETIC LOGIC UNITS IN A PROCESSOR

(75) Inventor: Martin Vorbach, Lingenfeld (DE)

(73) Assignee: Hyperion Core, Inc., Los Gatos, CA (US)

( * ) Notice: Subject to any disclaimer, the term of this patent is extended or adjusted under 35 U.S.C. 154(b) by 256 days.

(21) Appl. No.: 13/809,159

(22) PCT Filed: Jul. 8, 2011

(86) PCT No.: PCT/EP2011/003428
§ 371 (c)(1),
(2), (4) Date: Mar. 1, 2013

(87) PCT Pub. No.: WO2012/003997
PCT Pub. Date: Jan. 12, 2012

(65) Prior Publication Data
US 2013/0205123 A1    Aug. 8, 2013

(30) Foreign Application Priority Data

| Jul. 9, 2010 | (EP) | 10007074 |
| Jul. 19, 2010 | (EP) | 10007437 |
| Jul. 23, 2010 | (EP) | 10007657 |
| Aug. 21, 2010 | (EP) | 10008734 |
| Sep. 27, 2010 | (EP) | 10010803 |
| Oct. 4, 2010 | (EP) | 10013253 |
| Oct. 25, 2010 | (EP) | 10013932 |
| Dec. 28, 2010 | (EP) | 10016117 |
| Jan. 26, 2011 | (EP) | 11000597 |
| Feb. 17, 2011 | (EP) | 11001305 |
| May 16, 2011 | (EP) | 11004033 |

(51) Int. Cl.
*G06F 9/30* (2006.01)
*G06F 9/32* (2006.01)
(Continued)

(52) U.S. Cl.
CPC ............ *G06F 9/3001* (2013.01); *G06F 9/3013* (2013.01); *G06F 9/30043* (2013.01);
(Continued)

(58) Field of Classification Search
CPC .................................. G06F 9/381; G06F 8/452
USPC ............................................................ 712/241
See application file for complete search history.

(56) References Cited

U.S. PATENT DOCUMENTS

| 6,438,747 B1 * | 8/2002 | Schreiber et al. ............. 717/160 |
| 6,578,138 B1 * | 6/2003 | Kyker et al. .................. 712/241 |
| 2009/0288075 A1 | 11/2009 | Song |

FOREIGN PATENT DOCUMENTS

| GB | 2398412 A | 8/2004 |
| WO | 2010142432 | 2/2010 |

(Continued)

OTHER PUBLICATIONS

International Preliminary Report on Patentability, dated Jan. 15, 2013, for related PCT Application No. PCT/EP2011/003428.
(Continued)

*Primary Examiner* — William B Partridge
(74) *Attorney, Agent, or Firm* — IP Spring

(57) ABSTRACT

The present invention relates to a processor having a trace cache and a plurality of ALUs arranged in a matrix, comprising an analyzer unit located between the trace cache and the ALUs, wherein the analyzer unit analyzes the code in the trace cache, detects loops, transforms the code, and issues to the ALUs sections of the code combined to blocks for joint execution for a plurality of clock cycles.

10 Claims, 40 Drawing Sheets

(51) Int. Cl.
*G06F 9/355* (2006.01)
*G06F 9/38* (2006.01)

(52) U.S. Cl.
CPC ........ *G06F9/30054* (2013.01); *G06F 9/30058* (2013.01); *G06F 9/30072* (2013.01); *G06F 9/30076* (2013.01); *G06F 9/30094* (2013.01); *G06F 9/30098* (2013.01); *G06F 9/30138* (2013.01); *G06F 9/30167* (2013.01); *G06F 9/325* (2013.01); *G06F 9/355* (2013.01); *G06F 9/381* (2013.01); *G06F 9/383* (2013.01); *G06F 9/384* (2013.01); *G06F 9/3836* (2013.01); *G06F 9/3855* (2013.01); *G06F 9/3857* (2013.01); *G06F 9/3887* (2013.01); *G06F 9/3889* (2013.01)

(56) References Cited

FOREIGN PATENT DOCUMENTS

| | | |
|---|---|---|
| WO | 2010043401 | 4/2010 |
| WO | 2011079942 | 7/2011 |

OTHER PUBLICATIONS

International Search Report, dated Jun. 10, 2011, for related PCT Application No. PCT/EP2011/003428.

Shanley, Tom; "x86 Instruction Set Architecture"; Mindshare Inc.; ISBN 978-0-9770878-5-3; 2009; all pages.

Shanley, Tom, "The Unabridged Pentium 4, IA32 Processor Genealogy," Mindshare Inc., ISBN 0-321-24656-X; 2004, all pages.

ARM7TDMI-S Data Sheet, Document No. ARM DDI 0084D, 2001, pp. 4-1 to 4-60.

Rotenberg, Eric et al.; "Trace Cache: a Low Latency Approach to High Bandwidth Instruction Fetching," IEEE, Proc. of the 29thAnnual International Symposium on Microarchitecture, Dec. 2-4, 1996, all pages.

Allen, Randy et al., "Optimizing Compilers for Modern Architectures," Moran Kaufmann Publishers, ISBN-13:978-1-55860; ISBN-10:1-55860-286-0; 2002, all pages.

Shanley, Tom; "Pentium PRO and Pentium II System Architecture," Second Edition, Mindshare Inc., ISBN 978-0-201-30973-7; 1998; all pages.

Aho, Alfred et al., "Compilers, Principles, Techniques, and Tools," Second edition, ISBN 0-321-48681-1; 2007, all pages.

\* cited by examiner

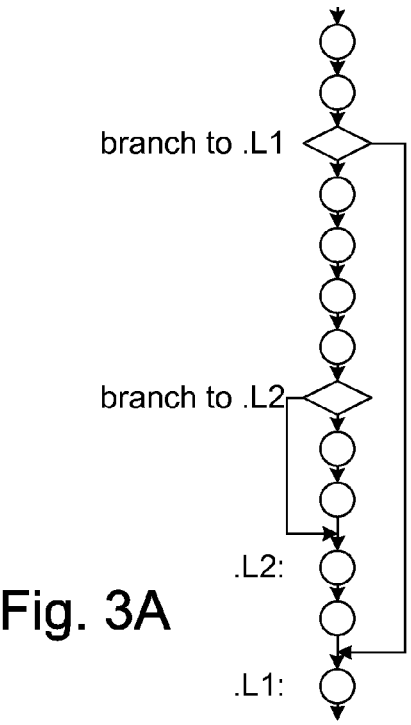

Fig. 3A

| | | |
|---|---|---|
| uncond op | always | always |
| uncond op (set flags 1) | always | always |
| branch .L1 | always | cond_1 |
| uncond op | always | cond_1 |
| uncond op | always | cond_1 |
| uncond op (set flags 1) | always | cond_1 |
| branch .L2 | cond_2 | cond_1 |
| uncond op | cond_2 | cond_1 |
| .L2: uncond op | always | cond_1 |
| .L1: uncond op | always | always | 0301
                                    0302

Fig. 3B

| | | |
|---|---|---|
| uncond op | always | always |
| uncond op (set flags 1) | always | always | 0313
| cond_1 op | always | cond_1 |
| cond_1 op | always | cond_1 |
| cond_1 op | always | cond_1 |
| cond_1 op (set flags 2) | always | cond_1 | 0312
| cond_2 op | cond_2 | cond_1 |
| cond_2 op | cond_2 | cond_1 |
| back_2 op | cond_2 | cond_1 | 0311
| cond_1 op | always | cond_1 |
| back_1 op | always | cond_1 |
| uncond op | always | always |

Fig. 3C

| | | |
|---|---|---|
| uncond op | always | always |
| uncond op (set flags 1) | always | always |
| cond_1 op | always | cond_1 |
| cond_1 op | always | cond_1 |
| cond_1 op | always | cond_1 |
| cond_1 op (set flags 2) | always | cond_1 |
| cond_2 op | cond_2 | cond_1 |
| cond_2 op | cond_2 | cond_1 |
| cond_1 op (CC is BK) | always | cond_1 | 0321
| cond_1 op | always | cond_1 |
| uncond op (CC is BK) | always | always | 0322

Condition Code is "Back", or "Always" (depending on semantics of "Always", see spec)

```
function quicksort(array, left, right)
    var pivot, leftIdx = left, rightIdx = right
    if right - left > 0
        pivot = (left + right) / 2
0411    while leftIdx <= pivot and rightIdx >= pivot
0412        while array[leftIdx] < array[pivot] and leftIdx <= pivot
                leftIdx = leftIdx + 1
0413        while array[rightIdx] > array[pivot] and rightIdx >= pivot
                rightIdx = rightIdx - 1;
            swap array[leftIdx] with array[rightIdx]
            leftIdx = leftIdx + 1
            rightIdx = rightIdx - 1
            if leftIdx - 1 == pivot
                pivot = rightIdx = rightIdx + 1
            else if rightIdx + 1 == pivot
                pivot = leftIdx = leftIdx - 1
        quicksort(array, left, pivot - 1)
        quicksort(array, pivot + 1, right)
```

Fig. 4B

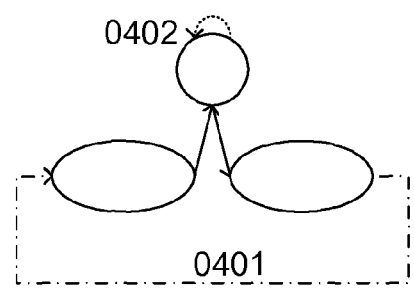

Fig. 4A

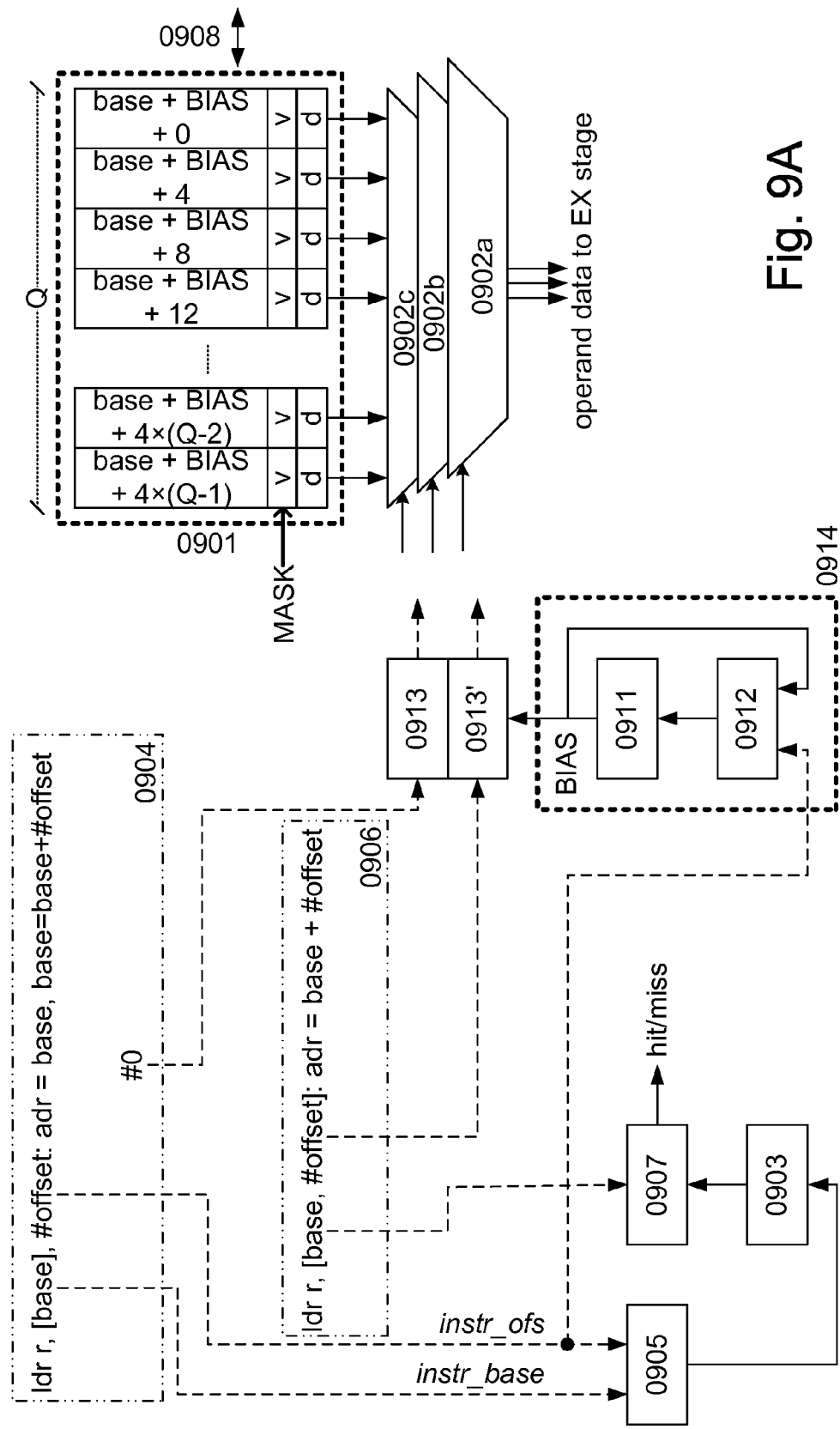

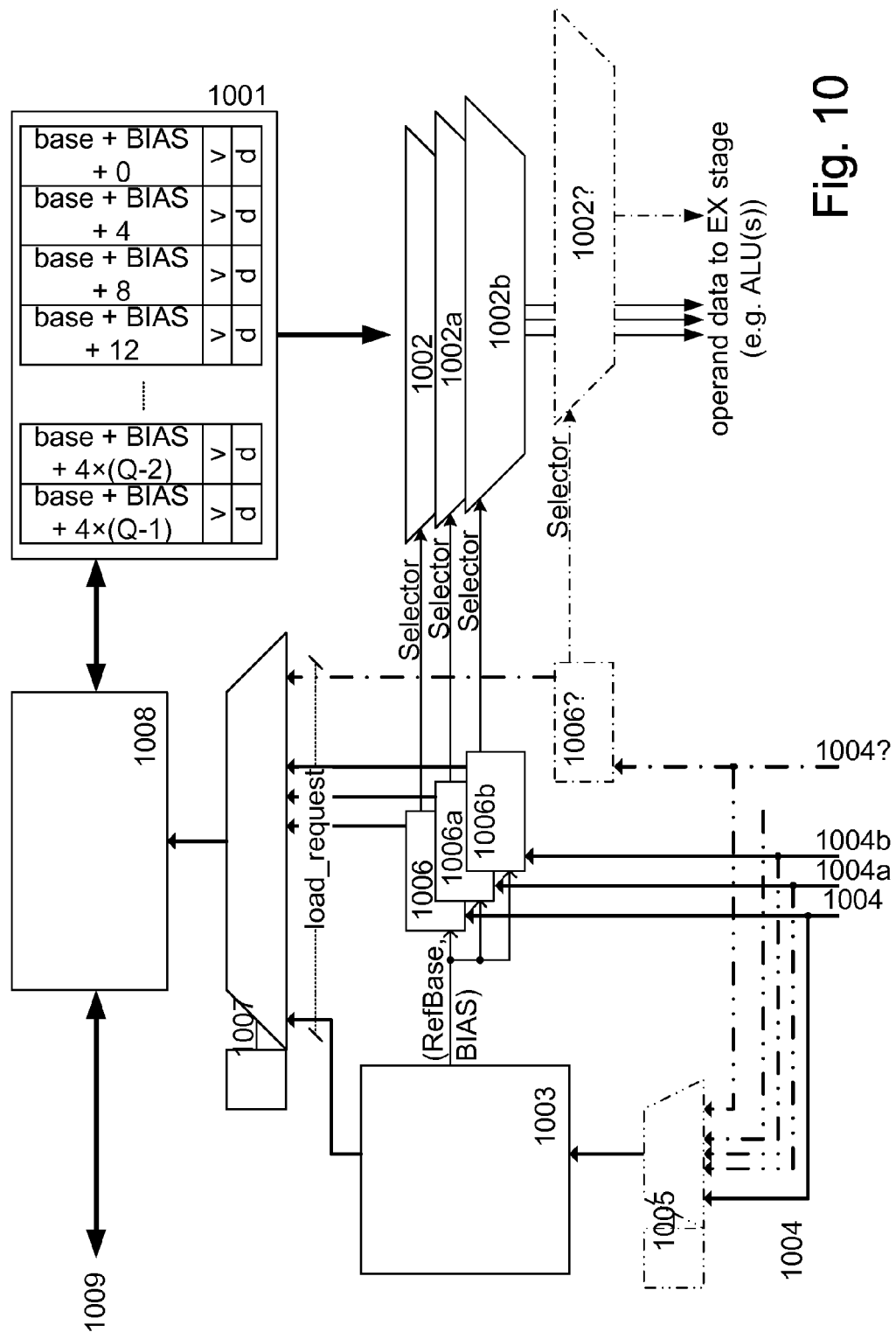

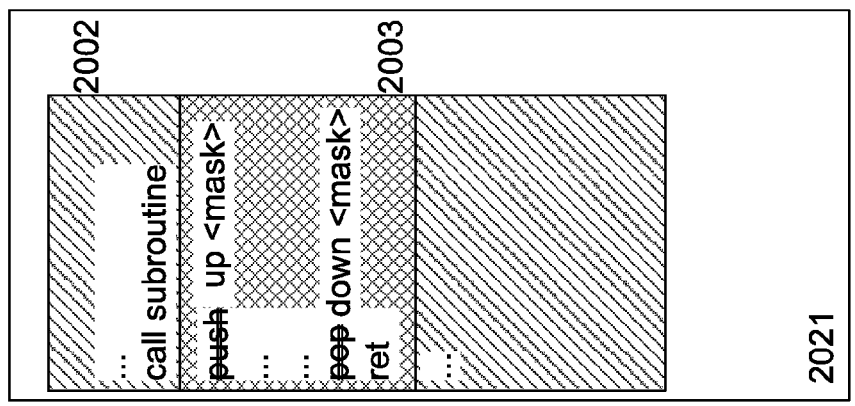
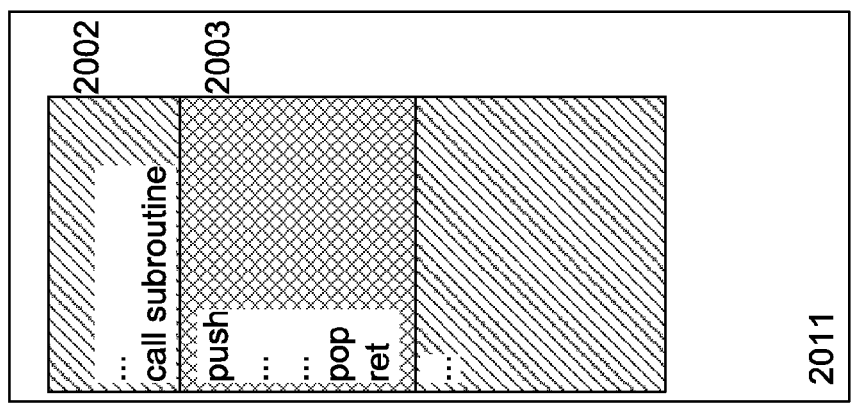
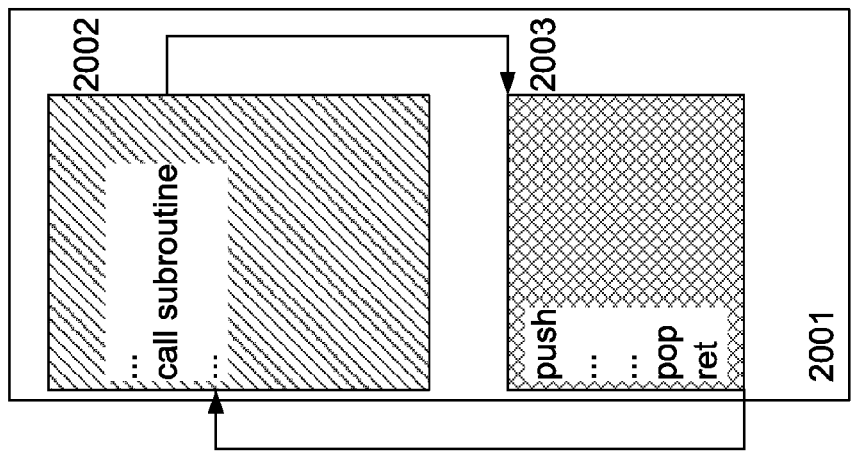
Fig. 20:

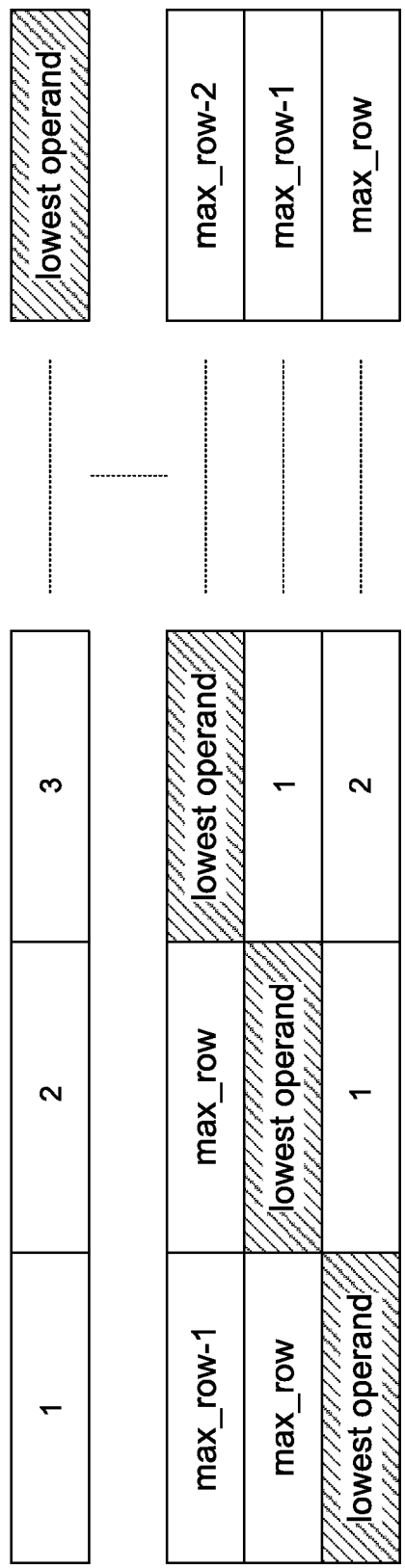

Fig. 23A

```
.L6:
R1  mov    ecx, eax
R2  mov    eax, ebx
.L3:
M1  imul   ebx, LOAD [edx+12+eax*4], 42659
M2  imul   esi, LOAD [edx+8+eax*4], 8407
A1  add    esi, ebx
M3  imul   ebx, LOAD [edx+4+eax*4], 7031
A2  add    esi, ebx
M4  imul   ebx, LOAD [edx+eax*4], 3323
A3  add    esi, ebx
M5  imul   ebx, LOAD [edx+ecx*4], 30124
A4  lea    ebx, [esi+ebx]
S1  STORE [edi+ecx*4], ebx
    lea    ebx, [eax+1]
    cmp    ebx, LOAD [ebp-16]  ⎤
    jne    .L6                  ⎦ → 2399  LP ebx, eax, +1, LOAD [ebp-16], .L6
                                         or: LP ebx, eax, +1, erf5, .L6
```

Fig. 23E

```
      .L6:
R1    mov    ecx, eax
R2    mov    eax, ebx ; LOAD ls0, [edx+12+ebx*4], 42659
      .L3:
M1    imul   ebx, ls0 ; LOAD ls1, [edx+8+eax*4], 8407
M2    imul   esi, ls1
A1    add    esi, ebx ; LOAD ls2, [edx+4+eax*4], 7031
M3    imul   ebx, ls2
A2    add    esi, ebx ; LOAD ls3, [edx+eax*4], 3323
M4    imul   ebx, ls3
A3    add    esi, ebx ; LOAD ls4, [edx+ecx*4], 30124
M5    imul   ebx, ls4
A4    lea    ebx, [esi+ebx]
      lea    ebx, [eax+1] ; LOAD erf5, [ebp-16]
      CMP    flgr, ebx, erf5
S1    STORE  [edi+ecx*4], ebx
      JNE    flgr,.L6
```

Fig. 23B

```
.L6:
R1    mov     ecx, eax ; LOAD ls0, [edx+12+ebx*4], 42659
R2    mov     eax, ebx ; LOAD ls1, [edx+8+ebx*4], 8407
.L3:
M1    imul    ebx, ls0
M2    imul    esi, ls1 ; LOAD ls2, [edx+4+eax*4], 7031
A1    add     esi, ebx
M3    imul    ebx, ls2 ; LOAD ls3, [edx+eax*4], 3323
A2    add     esi, ebx
M4    imul    ebx, ls3 ; LOAD ls4, [edx+ecx*4], 30124
A3    add     esi, ebx
M5    imul    ebx, ls4
      lea     ebx, [eax+1] ; LOAD erf5, [ebp-16]
      CMP     flag, erf0, erf5
A4    lea     erf0, [esi+ebx]
S1    STORE   [edi+ecx*4], ebx
      MOV     ebx, erf0
      JNE     flag, .L6
```

Fig. 23C

```
       .L6:
   R1    mov    ecx, eax
   R2    mov    eax, ebx
       .L3:
   M1    imul   ebx, ls0 ;  LOAD [edx+12+eax*4], 42659 ;
                           LOAD [edx+8+eax*4], 8407
   M2    imul   esi, ls1 ; LOAD ls2, [edx+4+eax*4], 7031
   A1    add    esi, ebx
   M3    imul   ebx, ls2 ; LOAD ls3, [edx+eax*4], 3323
   A2    add    esi, ebx
   M4    imul   ebx, ls3 ; LOAD ls4, [edx+ecx*4], 30124
   A3    add    esi, ebx
   M5    imul   ebx, ls4
         lea    ebx, [eax+1] ; LOAD erf5, [ebp-16]
         CMP    flag, ebx, erf5
   A4    lea    ebx, [esi+ebx]
   S1    STORE  [edi+ecx*4], ebx
         JNE    flag,.L6
```

Fig. 23D

```
.L6:
R1    mov    ecx, eax
R2    mov    eax, ebx
.L3:
      lea    erf0, [eax+1]    2401
      CMP    flgr, erf0, erf5
M1    imul   ebx, ls0 ;   LOAD ls0, [edx+12+eax*4], 42659 ; LOAD ls1, [edx+8+eax*4], 8407 ;
                           LOAD ls2, [edx+4+eax*4], 7031 ; LOAD ls3, [edx+eax*4], 3323 ;
                           LOAD ls4, [edx+ecx*4], 30124
M2    imul   esi, ls1
A1    add    esi, ebx
M3    imul   ebx, ls2
A2    add    esi, ebx
M4    imul   ebx, ls3
A3    add    esi, ebx
M5    imul   ebx, ls4
A4    lea    ebx, [esi+ebx]
S1    STORE  [edi+ecx*4], ebx    2402
      MOV    ebx, erf0
      JNE    flgr, .L6
```

Fig. 24A

```
.L6:
     lea    erf0, [ebx+1]
     CMP    flgr, erf0, erf5
R1   mov    ecx, eax ; LOAD ls0, [edx+12+ebx*4], 42659 ; LOAD ls1, [edx+8+ebx*4], 8407 ;
                      LOAD ls2, [edx+4+ebx*4], 7031 ; LOAD ls3, [edx+ebx*4], 3323 ;
                      LOAD ls4, [edx+eax*4], 30124
R2   mov    eax, ebx
.L3:
M1   imul   ebx, ls0
M2   imul   esi, ls1
A1   add    esi, ebx
M3   imul   ebx, ls2
A2   add    esi, ebx
M4   imul   ebx, ls3
A3   add    esi, ebx
M5   imul   ebx, ls4
A4   lea    ebx, [esi+ebx]
S1   STORE  [edi+ecx*4], ebx
     MOV    ebx, erf0    2402
     JNE    flgr, .L6
```

Fig. 24B

```
fir1:
    push   ebp
    mov    ebp, esp
    push   edi
    push   esi
    push   ebx
    sub    esp, 4
    mov    ecx, DWORD PTR [ebp+12]
    mov    ebx, DWORD PTR [ebp+20]
    mov    edx, DWORD PTR [ebp+8]
    mov    edi, DWORD PTR [ebp+16]
    lea    eax, [ecx-5]
    test   eax, eax
    mov    DWORD PTR [ebx], eax
    je     .L4
    sub    ecx, 4
    mov    eax, 1
LTV STORE [ebp-16], ecx  ; MOV erf5, ecx
                          // LOAD erf5, [ebp-16]
    xor    ecx, ecx
    jmp    .L3
```

Fig. 25

PROVIDING CODE SECTIONS FOR MATRIX OF ARITHMETIC LOGIC UNITS IN A PROCESSOR

INTRODUCTION AND FIELD OF INVENTION

The present invention relates to data processing in general and to data processing architecture in particular.

Energy efficient, high speed data processing is desirable for any processing device. This holds for all devices wherein data are processed such as cell phones, cameras, hand held computers, laptops, workstations, servers and so forth, offering different processing performance based on accordingly adapted architectures.

Often similar applications need to be executed on different devices and/or processor platforms. Since coding software is expensive, it is desirable to have software code which can be compiled without major changes for a large number of different platforms offering different processing performance.

It would be desirable to provide a data processing architecture that can be easily adapted to different processing performance requirements while necessitating only minor adoptions to coded software

BRIEF DESCRIPTION OF DRAWINGS

FIGS. 3A, 3B, and 3C are diagrammatic illustrations of example code and graph for multilevel conditional execution for ALU execution;

FIG. 4A is a diagrammatic illustration of a flow graph illustrating an example of an inner loop of an application and a called function;

FIG. 4B is a diagrammatic illustration of example pseudocode providing a loop effect for called functions similar to FIG. 4A;

FIGS. 9 and 9A are diagrammatic illustrations of example implementations for loading streaming or frequently accessed data using a frequent load register file (FLR);

FIG. 10 is a diagrammatic illustration of another example implementation for loading data using a frequent load register file (FLR);

FIGS. 20A and 20B (part of FIG. 20) are diagrammatic illustrations of example memory structures storing main routines and call subroutines;

FIG. 20C (part of FIG. 20) is a diagrammatic illustration of an example memory structure storing a main routine and call subroutine without context switches;

FIG. 22A is a diagrammatic illustration of an example placement sequence of instructions for the ALU-block structure of FIG. 22;

FIGS. 23A, 23B, 23C, and 23D are diagrammatic illustrations of example portions of code showing moving up of instructions in the code sequence;

FIG. 23E is a diagrammatic illustration of an example of fusion of instructions into a complex instruction;

FIGS. 24A and 24B are diagrammatic illustrations of example code including placing instructions in an instruction sequence;

FIG. 25 is a diagrammatic illustration of example code referencing examples of FIGS. 23 and 24.

Figure 1A:
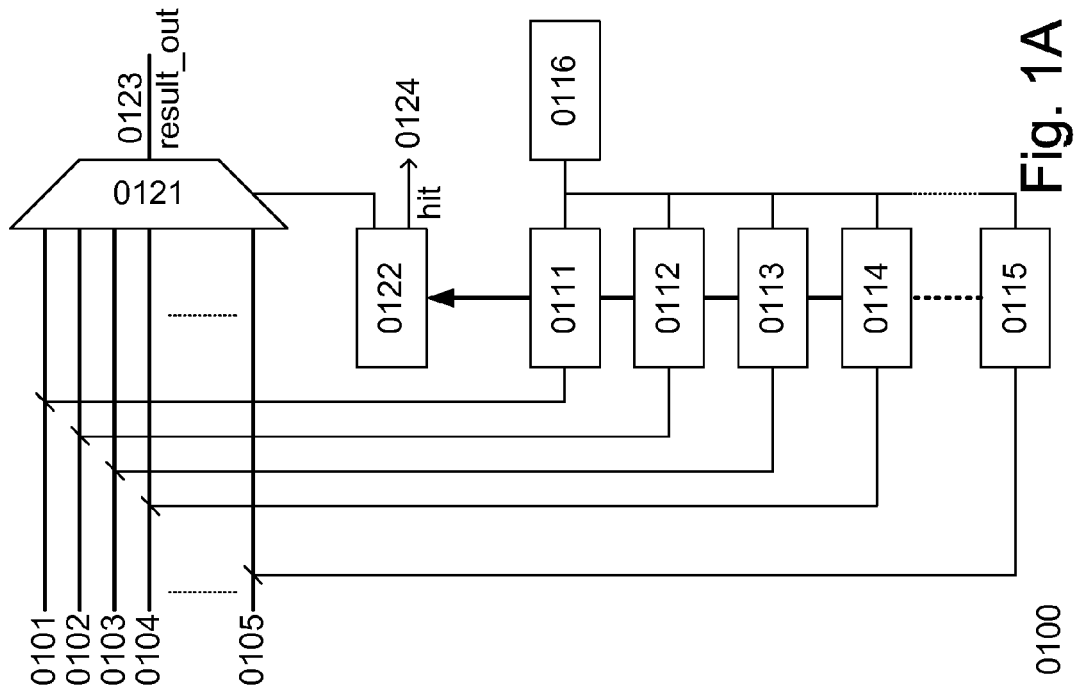
FIG. 1A is a diagrammatic illustration of an example network node of a data network of a processor.

It is an object of the present invention to provide an improvement over the prior art of processing architectures with respect to at least one of data processing efficiency, power consumption and reuse of the software codes.

The present invention describes a new processor architecture called ZZYX thereafter, overcoming the limitations of both, sequential processors and dataflow architectures, such as reconfigurable computing.

It shall be noted that whereas hereinafter, frequently terms such as "each" or "every" and the like are used when certain preferred properties of elements of the architecture and so forth are described. This is done so in view of the fact that generally, it will be highly preferred to have certain advantageous properties for each and every element of a group of similar elements. It will be obvious to the average skilled person however, that some if not all of the advantages of the present invention disclosed hereinafter might be obtainable, even if only to a lesser degree, if only some but not all similar elements of a group do have a particular property. Thus, the use of certain words such as "each", "any" "every" and so forth. is intended to disclose the preferred mode of invention and whereas it is considered feasible to limit any claim to only such preferred embodiments, it will be obvious that such limitations are not meant to restrict the scope of the disclosure to only the embodiments preferred.

Subsequently Trace-Caches are used. Depending on their implementation, they either hold undecoded instructions or decoded instructions. Decoded instructions might be microcode according to the state of the art. Hereinafter the content of Trace-Caches is simply referred as instruction or opcodes. It shall be pointed out, that depending on the implementation of the Trace-Cache and/or the Instruction Decode (ID) stage, actually microcode might reside in the Trace-Cache. It will be obvious for one skilled in the art that this is solely implementation dependent; it is understood that "instructions" or "opcodes" in conjunction with Trace-Cache is understood as "instructions, opcodes and/or microcodes" (depending on the embodiment).

It shall also be noted that notwithstanding the fact that a completely new architecture is disclosed hereinafter, several aspects of the disclosure are considered inventive per se, even in cases where other advantageous aspects described hereinafter are not realized.

The technology described in this patent is particularly applicable on
- ZYXX processors as described in PCT/EP 2009/007415; their memory architectures as described in PCT/EP 2010/003459, which are also applicable on multi-core processors are known in the state of the art (e.g. from Intel, AMD, MIPS and ARM); and
- exemplary methods for operating ZYXX processors and the like as described in ZZYX09 (DE 10 013 932.8), PCT/EP 2010/007950.

The patents listed above are fully embedded into this specification by reference for detailed disclosure.

The ZZYX processor comprises multiple Arithmetic Logic Unit (ALU) Blocks in an array with pipeline stages between each row of ALU-Blocks. Each ALU-Block may comprise further internal pipeline stages. In contrast to reconfigurable processors data flows preferably in one direction only, in the following exemplary embodiments from top to bottom. Each ALU may execute a different instruction on a different set of data, whereas the structure may be understood as a MIMD (Multiple Instruction, Multiple Data) machine.

The ZZYX processor is optimized for loop execution. In contrast to traditional processors, instructions once issued to the ALUs may stay the same for a plurality of clock cycles, while multiple data words are streamed through the ALUs. Each of the multiple data words is processed based on the same temporarily fixed instructions. After a plurality of clock cycles, e.g. when the loop has terminated, the operation continues with one or a set of newly fetched, decoded and issued instruction(s).

The ZZYX processor provides sequential VLIW-like processing combined with superior dataflow and data stream processing capabilities. The ZZYX processor cores are scalable in at least 3 ways:
1. The number of ALUs can be scaled at least two dimensionally according to the required processing performance; the term multi-dimensional is to refer to "more than one dimension". It should be noted that stacking several planes will lead to a three dimensional arrangement;
2. the amount of Load/Store units and/or Local Memory Blocks is scalable according to the data bandwidth required by the application;
3. the number of ZZYX cores per chip is scalable at least one dimensionally, preferably two or more dimensionally, according to the product and market. Low cost and low power mobile products (such as mobile phones, PDAs, cameras, camcorders and mobile games) may comprise only one or a very small amount of ZZYX cores, while high end consumer products (such as Home PCs, HD Settop Boxes, Home Servers, and gaming consoles) may have tens of ZZYX cores or more.
   High end applications, such as HPC (high performance computing) systems, accelerators, servers, network infrastructure and high and graphics may comprise a very large number of interconnected ZZYX cores.

ZZYX processors may therefore represent one kind of multicore processor and/or chip multiprocessors (CMPs) architecture.

The major benefit of the ZZYX processor concept is the implicit software scalability. Software written for a specific ZZYX processor will run on single processor as well as on a multi processor or multicore processor arrangement without modification as will be obvious from the text following hereinafter. Thus, the software scales automatically according to the processor platform it is executed on.

The concepts of the ZZYX processor and the inventions described in this patent are applicable on traditional processors, multithreaded processors and/or multi-core processors. A traditional processor is understood as any kind of processor, which may be a microprocessor, such as an AMD Phenom, Intel Pentium, Core2 or Xeon, IBM's and Sony's CELL processor, ARM, Tensilica or ARC; but also DSPs such as the C64 family from TI, 3DSP, Starcore, or the Blackfin from Analog Devices.

The concepts disclosed are also applicable on reconfigurable processors, such as SiliconHive, IMEC's ADRES, the DRP from NEC, Stretch, or IPFlex; or multi-processors systems such as Picochip or Tilera. Most of the concepts, especially the memory hierarchy, local memories elements, and Instruction Fetch units as well as the basic processor model can be used in FPGAs, either by configuring the according mechanisms into the FPGAs or by implementing according hardwired elements fixedly into the silicon chip. FPGAs are known as Field Programmable Gate Arrays, well known from various suppliers such as XILINX (e.g. the Virtex or Spartan families), Altera, or Lattice.

The concepts disclosed are particularly well applicable on stream processors, graphics processors (GPU) as for example known from NVidia (e.g. GeForce, and especially the CUDA technology), ATI/AMD and Intel (e.g. Larrabee), and especially General Purpose Graphics Processors (GPGPU) also know from NVidia, ATI/AMD and Intel.

ZZYX processors may operate stand alone, or integrated partially, or as a core into traditional processors or FPGAs; it is noted that any such FPGA integrating a ZZYX processor as disclosed hereinafter will be or have coarse granular elements. While ZZYX may operate as a co-processor or thread resource connected to a processor (which may be a microprocessor or DSP), it may be integrated into FPGAs as processing device. FPGAs may integrate just one ZZYX core or multiple ZZYX cores arranged in a horizontal or vertical strip or as a multi-dimensional matrix.

All described embodiments are exemplary and solely for the purpose of outlining the inventive apparatuses and/or methods. Different aspects of the invention can be implemented or combined in various ways and/or within or together with a variety of other apparatuses and/or methods.

A variety of embodiments is disclosed in this patent. However, it shall be noted, that the specific constellation of methods and features depends on the final implementation and the target specification. For example may a classic CISC processor require another set of features than a CISC processor with a RISC core, which again differs from a pure RISC processor, which differs from a VLIW processor. Certainly, a completely new processor architecture, not bound to any legacy, may have another constellation of the disclosed features. On that basis it shall be expressively noted, that the methods and features which may be exemplary combined for specific purposes may be mixed and claimed in various combinations for a specific target processor.

Implementing ALU Arrays in Traditional Processors

One exemplary embodiment of an integration of the inventive ALU array into a processor is described on the basis of the Intel x86 (and IA, IA32, IA64) architecture, other examples are given using the ARM processor architecture (e.g. ARM7, ARM9, ARM11). While most concepts of the inventions are directly applicable some may require modifications. The most important ones are described herein, other modifications are obvious for one skilled in the art. The concepts are particularly well suited for multi-issue processor architectures, which have the capability to issue a plurality of instructions within a clock cycle.

The IA register file is insufficient for transferring enough operands and results per clock cycle for the amount of ALUs in the ALU-Block of the ZZYX core (see e.g. [3] FIG. 4). According to one aspect of this invention, the register file is extended for having a sufficient amount of registers:

Extended Register File (ERF)

ERF is used for expanding the processors register space. It is more efficient than the use of Register Allocation Tables (RAT). But, to implement the described features, the functionality of a RAT can basically be used as well.

The ERF is implemented using a window into the main memory space of the processor. E.g. could a specific value in a segment register or an entry in a Segment Descriptor Table be used for identifying the ERF space.

Actually the ERF is not stored in the memory but the address window it used to identify processor internal registers, which are physically located inside the processor (on the processor chip).

For example the segment value FFFC might be used to identify the ERF window:
  mov es, [FFFC] addresses the ERF All subsequent load/stored are not executed by the load store unit(s). Preferably no data is transferred between the processor and the memory hierarchy. All load/store commands are replaced by register addresses and registers transfers between the data path and the Extended Register File. The replacement is done by (depending on the implementation) one or a plurality of instruction decoders. The accordingly modified micro-codes are entered into the later described Code Analysis Queue (CAQ) or into the later stage Reservation Station (RS) and/or ReOrdering Buffer (ROB) of the processor. For details reference is made to the respective processor documentation. Particularly, reference is made to [2] Chapter 5.
  mov eax, es:0 addresses ER0 in the ERF. All subsequent eax accesses are redirected to ER0.

Using Segment Registers and/or the Segment Descriptor Table

In Real-Mode:
  dedicated masks are used to identify LRM, TRM and ERF memory:
0xFFFF: TCM Space
0xFFFE: LCM Space
0xFFFC: ERF Space Data written or read from ERF memory will not cause a load/store action, but only address the extended physical register set for extending the real register set.

In IA-32 Mode:
  a bit in the segment descriptor table (e.g. Byte6, bit5) may be used to indicate a special memory access, the base addresses are set respectively to the real mode. See page 388 and 389 of [1].

In IA-32e Mode:
  a bit in the segment descriptor table (e.g. Byte6, bit5) may be used to indicate a special memory access, the base addresses are set respectively to the real mode. See page 933 and 934 of [1].

The Register Set

Figure 7:
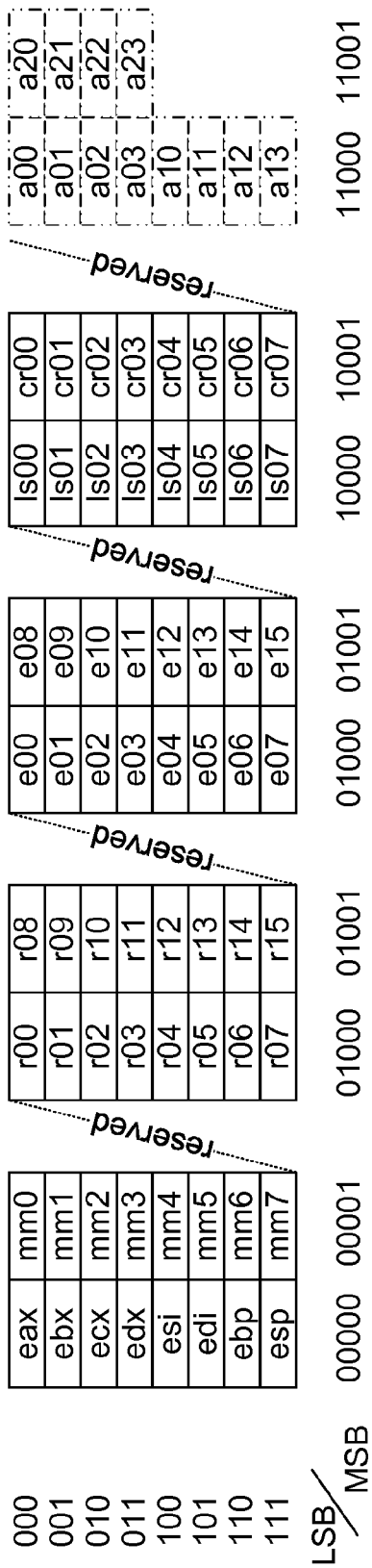
FIG. 7 is a diagrammatic illustration of an example register set arrangement.

The Extended Register File comprises the ZZYX registers r (FDR), e (VDR) and is (LSDR). Additionally, for compatibility the original IA registers might be mapped into the Extended Register File. An exemplary register set arrangement is shown in FIG. 7.

Selecting Registers

For the sake of simplicity the model is explained based on the 8086 real mode. Obvious for one skilled in the art, the disclosed method is applicable on any other processor mode with minor amendments.

The following sequence of 3 instructions selects EFR7 as alias for ebx:
  mov eax, FFFC
  mov esi, eax
  mov ebx, es:7

Subsequent accesses to ebx are replaced in the microcode by the address of ERF7.

Generally the sequence is (reg being any IA register and erf being any Extended Register File register):
mov eax, FFFC
mov esi, eax
mov reg, erf The sequence is required for each alias selection. Ideally esi is loaded with FFFC and not changed. Then, further aliasing requires only the 3rd instruction of the sequence.

In one preferred embodiment, the sequence is replaced by a single instruction:
  alias ebx, 7
or, generally
  alias reg, erf The processor operates on the ERF only. At startup, [EAX, EBX, ECX, EDX, ESI, EDI, EBP, ESP] are aliased (mapped) to ERF0 . . . ERF7.

The method is particularly useful, as IA compilers generate many instructions accessing memory (due to the very limited register set AND the CISC nature of the processor). The memory addresses can be mapped to ERF registers, e.g.: add es:7, eax is addressing ERF7 instead of memory (assuming es is set to FFFC).

Extending the 2 Address Assembler Code

One solution for Extending the 2 address assembler code is to move the result of an operation into the target register after the operation. By doing so, the operation is embraced by the alias code to move the operands and the alias code to move the result. The generalized result alias is:

mov eax, FFFC
mov esi, eax
mov erf, reg
or
   alias erf, reg
   Prior accesses to reg are replaced in the microcode by the address of erf. This may be achieved via a buffer (e.g. the Code Analysis Queue, the ReOrder Buffer (ROB), or the Reservation Station) or Register Renaming; both known in the state of the art. For avoiding backtracking, the result register aliasing might be pulled in front of the operation. However, this is incompatible with processors not having an ERF.
   In matrix mode (i.e. the subsequently described vertical reordering), no result register is defined by the opcode as default. So, the basic operation is:
   op-, src0, src1
   Only if a move to a result register is explicitly defined (e.g. by a mov or alias command), a result register is defined.
   Yet, results produced within the matrix are accessible by other ALUs in the array via the ALU registers a (e.g. a[row, col], with e.g. 0<row<3 and 0<col<3), reference is made to the software model and exemplary embodiment of assembly language of the ZZXY processor described in PCT/EP 2009/007415. Replacing the original source register with a reference to the ALU producing the result obsoletes the need of a ReOrdering Buffer (ROB) or Alias Registers (AR) to handle Out-Of-Order execution (OOO). The physical register, formerly being implemented via ROB or AR is implemented by the output (register) of the ALU in the ALU-Block producing the result being required as operand.

Executing Non- or Partially Optimized Code in the ALU-Block

Processing loops in Matrix Mode in the ALU-Block is provides performance and power benefits. Instruction fetching and decoding is largely reduced by mapping by statically mapping loops or loop partitions onto the ALU-Blocks and keeping the setting static until the loop terminates or the FIFO registers are filled.
   In order to execute non-optimized IA code on the ALU-Block preferably the following steps are performed to transform loops preferably (but not necessarily) in the shown order:

LT1) Register Renaming
   Registers are renamed, preferably using the described ERF in order to have a decent register file. Alternatively for example Register Renaming or Reorder Buffers (ROB) (both known in the state of the art) might be implemented.

LT2) Loop Detection
   Loops are detected by conditional jumps to code sections which have been executed already. Code embraced by the conditional jump instruction and the target of the conditional jump is likely a loop and may qualify for execution in Matrix Mode.

LT3) Horizontal Reordering
   Register independent instructions are horizontally reordered and mapped horizontally on ALUs in the ALU-Block according to the state of the art (e.g. as done in Reorder Buffers (ROB) or achieved by Register Renaming). If more independent instructions than ALUs exist, mapping may continue in with a lower, preferably the next lower ALU row of the ALU-Block.

LT4) Vertical Reordering
   Instructions depending on the results of other instructions are mapped onto subsequently lower ALU rows of the ALU-Block so that the respective results can be fed from the result generating ALU in accordance with the preferred data flow direction to the ALU depending on the result. As described before, no result register is defined by the opcodes as default. Only explicit move instructions (e.g. mov or alias), may transfer an ALU result to a register of the register file (e.g. ERF). Note: Within this specification it is assumed that the preferred data-flow direction is from top to bottom.

LT5) Partitioning
   If the loop body is too large to be mapped onto the ALU-Block it is partitioned into a plurality of Catenae. A partition has the size of all instructions being mappable onto the given resources (e.g. ALUs) in the ALU-Block. If no more resources are available during the mapping process, the respective partition (i.e. Catena) of the loop is processed. In accordance to [3] the results are written into the FIFO register file. If the FIFOs are full or the loop terminates, the next partition (i.e. Catena) is mapped and executed respectively. If more than one ALU-Block is available and allocated to the task, the instructions may be mapped into a plurality of Catenae stretched out over a plurality of ALU-Block immediately for parallel execution in accordance to the previously described inventions.

As described in [3] preferably a Termination-Control-Counter (TCC) is implemented in hardware to compute the termination criterion. Accordingly the loop header and footer are evaluated and TCC is set accordingly. The conditional jump of the loop footer is then controlled by the TCC. The respective code is completely removed and not executed by the ALU-Block.

One exemplary embodiment of a TCC: Three registers are part of the processor's register file (e.g. the ERF), defining i) the current value of the loop counter (CurrentLoopCounter CLC), ii) the step width (STEP) and iii) the limit to be tested (LIMIT). A fourth register defines and controls the loop function (FUNC). This register may reside in the processor's register file or as a separated control register. FUNC defines the function of the loop, the computation of the exit criterion and is used to implement early exits from the loop (e.g. by statements such as break or exit).

The TCC comprises a function processor (fp), which may be an adder and/or subtractor. A comparator (cmp) compares the result of the function processor with the set limit and generates the termination signal (TERM) if the termination criterion is met.

The operations of the function processor and the comparator are defined by the FUNC register.

In advanced embodiments a more complex calculator (e.g. including one or a plurality of multipliers and/or other mathematic and/or logic functions) may be implemented.

In some embodiments an arrangement of comparators may check for complex limits.

In those cases, more than one STEP and/or LIMIT registers may be implemented and the FUNC register may be extended to set the complex functionality.

An exemplary format of the FUNC register is shown below:

| bit position | 4 | 3 ... 1 | 0 |
|---|---|---|---|
| | break | comparison:<br>000: < (less)<br>001: > (greater)<br>010: <= (less equal)<br>011: >= (greater equal) | function:<br>0: + (add)<br>1: − (subtract) |

-continued

| bit position | 4 | 3 . . . 1 | 0 |
|---|---|---|---|
| | | 100: = (equal) | |
| | | 101: ≠ (not equal) | |

The exemplary TCC supports e.g. the execution of loops such as, e.g.:
for (i=0; i<size; i++) {..;}
  CLC is initially set to 0 (according to i=0);
  LIMIT is set to size;
  STEP is set to 1 (according to i++);
  FUNC (function) is set to 0 (add) (according to i++);
  FUNC (comparison) is set to 000 (according to i<size).
i=0; while (i>limit) {..; i-=step; ..;}
  CLC is initially set to 0 (according to i=0);
  LIMIT is set to limit;
  STEP is set to 0 (according to i-=step), step can be dynamically changed during the loop execution by writing the respective value into the STEP register;
  FUNC (function) is set to 0 (add) (according to i-=step);
  FUNC (comparison) is set to 001 (according to i>limit).
An e.g. if ( ) break; statement
  might be embedded in the body of the loop to implement early exits. The while the computation of the condition will not be replaced but processed on in the ALU-Block, the respective conditional exit is replaced in the microcode with an instruction setting the break bit in the FUNC register, causing the issue of the TERM signal via the OR gate.
In advanced embodiments, the TCC is extended to process the comparison for the early exit.

Having the TCC registers embedded in the processor's register file allows other parts of the code to make modifications to the loop control at any time during the execution.

Basically two approaches for detecting loops may be used:
LD1) A first iteration of the loop is executed and the loop is detected during this first execution.
LD2) Loops are detected in advance of their execution using a look-ahead, prefetching and pre-decoding the respective instructions.

In one embodiment, the processor may comprise a Trace Cache, as e.g. known from the Pentium-4 architecture, see e.g. [4] chapter 35. Trace Caches store decoded Microcodes instead of instructions. Preferably, once detected and transformed loops are stored in the Trace Cache, so that they are available the next time for immediate execution without any effort on time and/or energy.

LD2 detects loops at an early stage, preferably even prior to decoding the opcodes into microcodes. This is ideal for e.g. loading the Trace Cache (if implemented) immediately with the correct microcodes. The disadvantage of LD2 remains in required look-ahead. Prior to decoding, a significant amount of instructions needs to be loaded into a buffer (Code Analysis Queue (CAQ)) and analysed in order to detect loops of reasonable sizes. This increases the processors instruction pipeline significantly and may add additional delays on context switches and/or interrupts.

LD1 detects loops during processing. Typically the first loop iteration is processed non-optimized. During processing of the loop the respective transformations are performed. Preferably the code is loaded into a buffer (Code Analysis Queue (CAQ), which is analysed for optimizable code (e.g. loop code). The code is respectively optimized and the optimized code is written (back) into the CAQ. In one embodiment the CAQ could be implemented by the ReOrdering Buffer (ROB) or in a preferred embodiment by the Reservation Station. The TCC is set up with the values after the first loop iteration and with the second iteration, the optimized loop is processed in Matrix Mode. In some slower implementations, more than one loop iteration may be required for transforming the loop and setting up the TCC.

If a Trace Cache is implemented, the modified microcodes might be written back from the CAQ to the Trace Cache, leading to the same positive effect on power and execution time when starting the loop for a second time as it can be achieved using LD1.

It shall be noted, that depending on the chosen approach (LD1 or LD2) the CAQ is located at different position within the processor pipeline.

To explain the invention in detail, a first example is given below:

```
FIR—filter
#define N 5
static const int gFirCoeffs[N] =
{
  0xa6a3, 0x20d7, 0x1b77, 0x0cfb, 0x75ac
};
void fir1(const int inData[ ], unsigned inSize,
    int outData[ ], unsigned *outSize)
{
  unsigned size = inSize - N;
  int i, j;
  int tmp;
  *outSize = size;
  for (i=0; i<size; i++) {
    tmp = 0;
    for (j=0; j<N; j++)
      tmp += inData[i+N-1-j] * gFirCoeffs[j];
    outData[i] = tmp;
  }
}
```

Figure 11A:
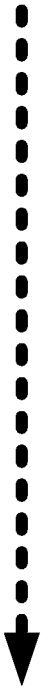
FIGS. 11A and 11B are diagrammatic illustrations of example code showing a combination of conditional and unconditional jump instructions.
Figure 11B:
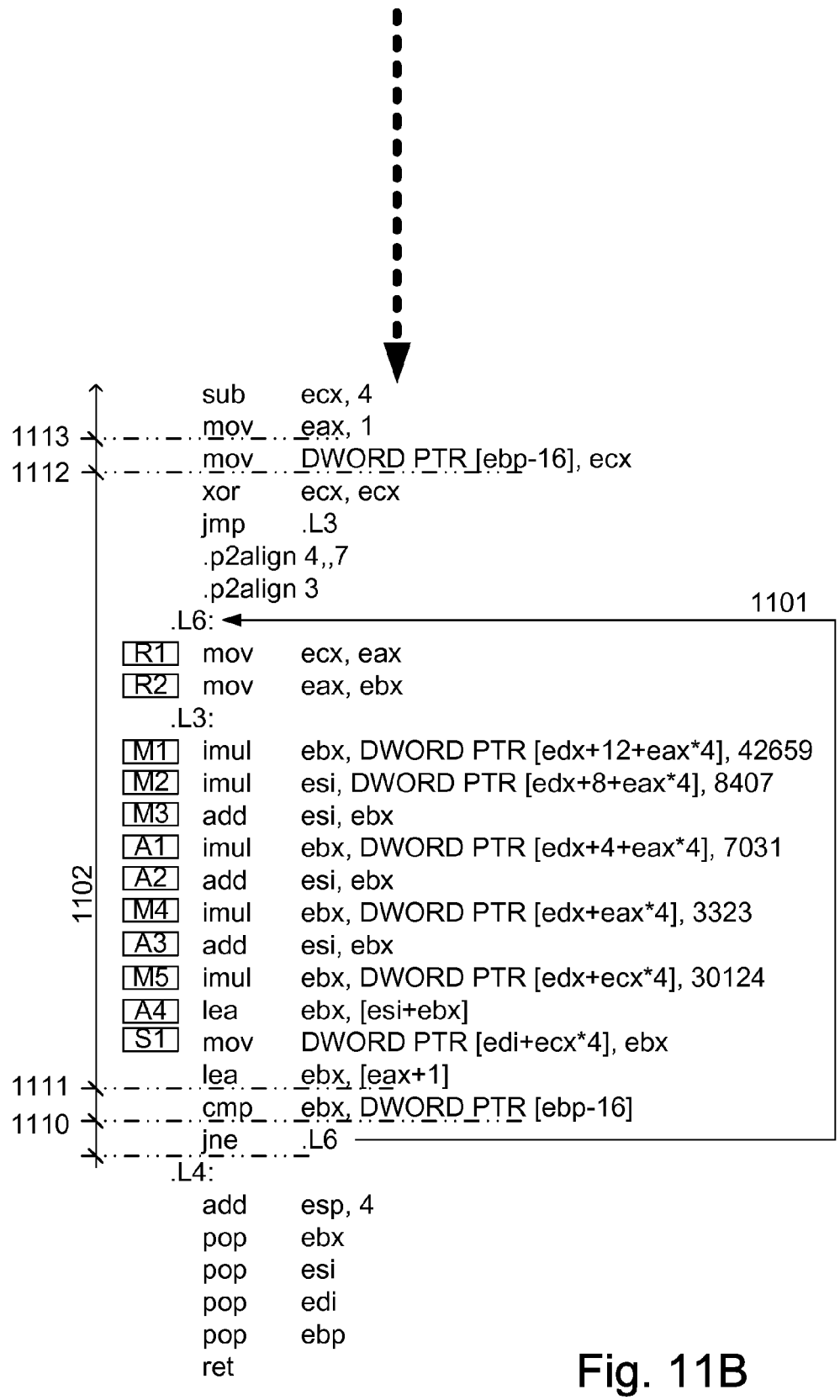

FIGS. 11A and 11B show the assembler code generated by the state of the art GNU GCC compiler.

A loop is detected by a conditional jump backwards in the code to a section which has already been processed.

The jne .L6 opcode fulfils this requirement (1101).

Using a backtracking mechanism (1102) implemented in hardware on the processor the loop counter is analysed for setting up the TCC. Backtracking starts with the instruction setting the flags for the conditional jump, which is cmp ebx, DWORD PTR [ebp-16] (1110). Based on the compare and jump type, the comparator of the TCC is set. In the exemplary case the loop terminates if ebx is equal DWORD PTR [ebp-16], therefore the comparator function is set to equal (FUNC [3:1]=100).

Further backtracking is based on the input variables of the compare, in this example ebx and DWORD PTR [ebp-16]. The variable ebx is modified by the add (lea) instruction lea ebx, [eax+1] (1111), based on which the loop counter is incremented. On this basis the TCC loop function can be set to add (FUNC[0]=0) and the STEP register is set to 1.

Further backtracking is based on the input variables of the compare and the add (lea) instruction.

If backtracking reaches code before the jump target (.L6), the loop header is found. In the loop header the limit (LIMIT) defining the loop termination and the start value of the loop counter (CLC) is defined.

In this example mov DWORD PTR [ebp-16], ecx (1112) sets the limit to the value of ecx. Respectively the LIMIT register of the TCC is set to ecx. mov eax, 1 (1113) sets the start value of the loop to 1 and respectively CLC is set to 1; if the loop is analysed prior to the first execution, e.g. according to LD2. If the loop has been analysed during execution, CLC is set to the current value of eax, when the transformed and optimized loop execution is started. The actual value of CLC then depends on the number of loop iterations prior to the start of the transformed and optimized loop execution.

One exemplary embodiment of a backtracking algorithm (BTA) may operate as such:

BTA1) start with the conditional jump

BTA2) continue with the instruction (e.g. a compare) generating the flag(s) the conditional jump depends on BTA3) continue with instructions modifying the register and/or memory entries the flag generating instruction depends on BTA4) continue following instructions modifying the register and/or memory entries until instructions before the conditional jump's target address (i.e. the loop header)

BTA5) use the settings in the loop header for defining the loop counters start value and the setting of the loop's termination criterion The algorithm is described on an instruction basis. Depending on where the algorithm is performed, e.g. at decoder level or at a later stage (e.g. at execution stage), actual instructions or microcode might be analysed.

Figure 12A:
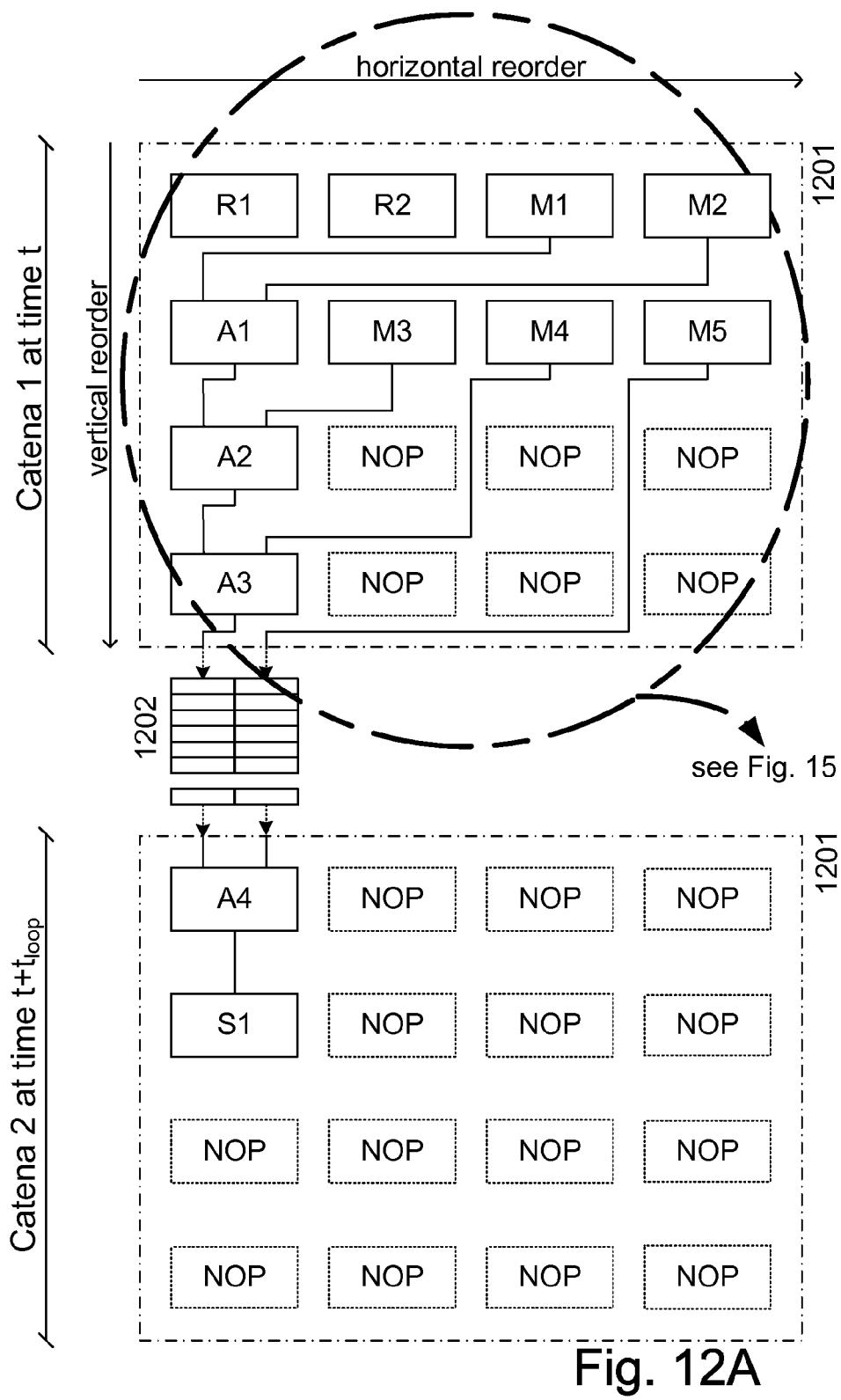
FIGS. 12A and 12B are diagrammatic illustrations of example placements of instructions in ALUs for transformation and optimization of a loop detected in code.

FIG. 12a shows the transformation and optimization of the loop.

One exemplary embodiment of a Catena optimization algorithm (COA) may operate as such:

COA1) place independent instructions in the first row until the row is filled or no more independent instructions are available COA2) place instructions depending on instructions in a previous row in the subsequent row, if there is space left in the row continue with independent instructions if available, else move to next row COA2r) Repeat COA2) until all rows are processed COA3) Process instructions and continue with next Catena after termination Respectively according to FIG. 12a the independent instructions M1, M2, M3 and M4 are mapped into the first row of ALUs in the ALU-Block (1201), until the row is full. In the second row, first instruction A1 is placed which depends on M1 and M2. Then the row is filled with remaining independent instructions; in the given example only M5 remains. In the next row A2 is placed, depending on A1 and M3; no other independent instructions or instructions depending on any previous rows exist. Finally A3 is placed in the last row, depending on A2 and M4; no other independent instructions or instructions depending on any previous rows exist.

The placed Catena is processed, the results are written into the FIFO registers of the register file (1202).

Afterwards, according to BOA the second Catena (Catena 2) is placed. Only A4 and S1 remain. A4 is placed in the first row, the depending S1 in the subsequent row.

Figure 12B:
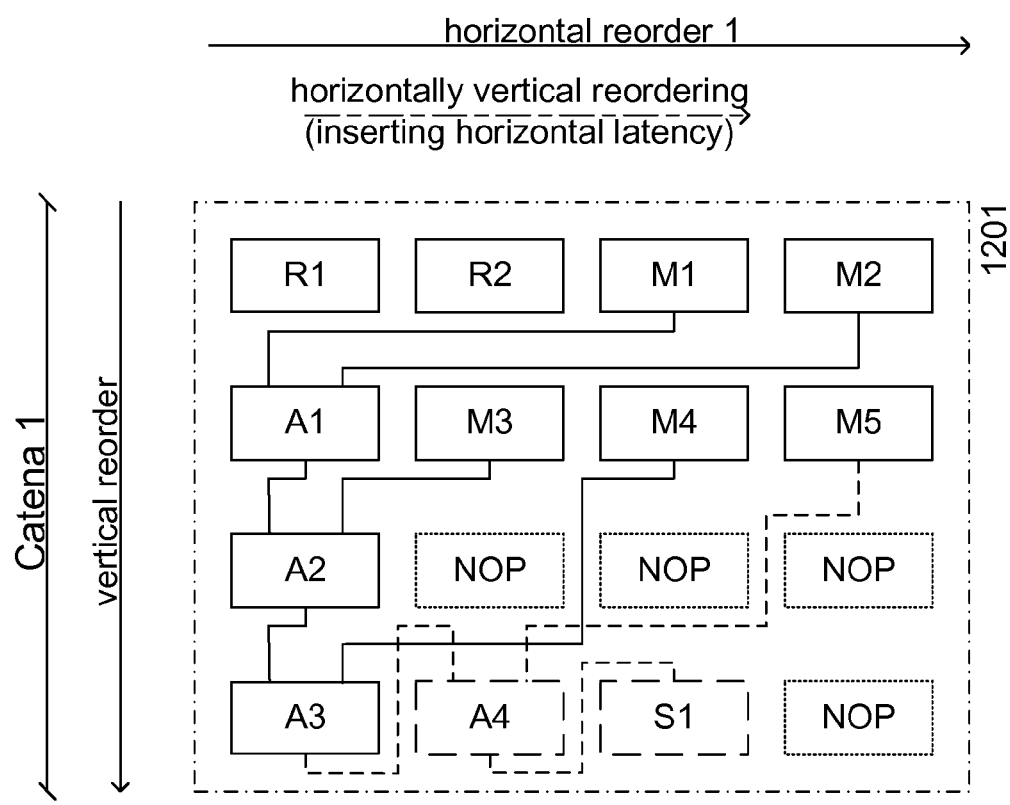

In one advanced embodiment, the number of unallocated resources in a first Catena might be compared with the number of required resources in the subsequent Catena. If enough resources are available in the first Catena the algorithm could try to map the instructions of the second Catena into the empty space of the first, possibly under violation of the timing rules. In that case additional latency could be introduced by streaming data in on other direction than the preferred one, e.g. horizontally as shown in FIG. 12b. A4 and S1 are mapped onto empty ALUs in the last row. The result data from A3 is streamed to A4 with additional latency and from there (again with additional latency) to S1. While the latency of the first Catena increases, overhead for executing the second Catena is saved. The additional latency must be taken in to account, to ensure that all operations are finished in the first Catena, when changing the instructions.

Figure 13:
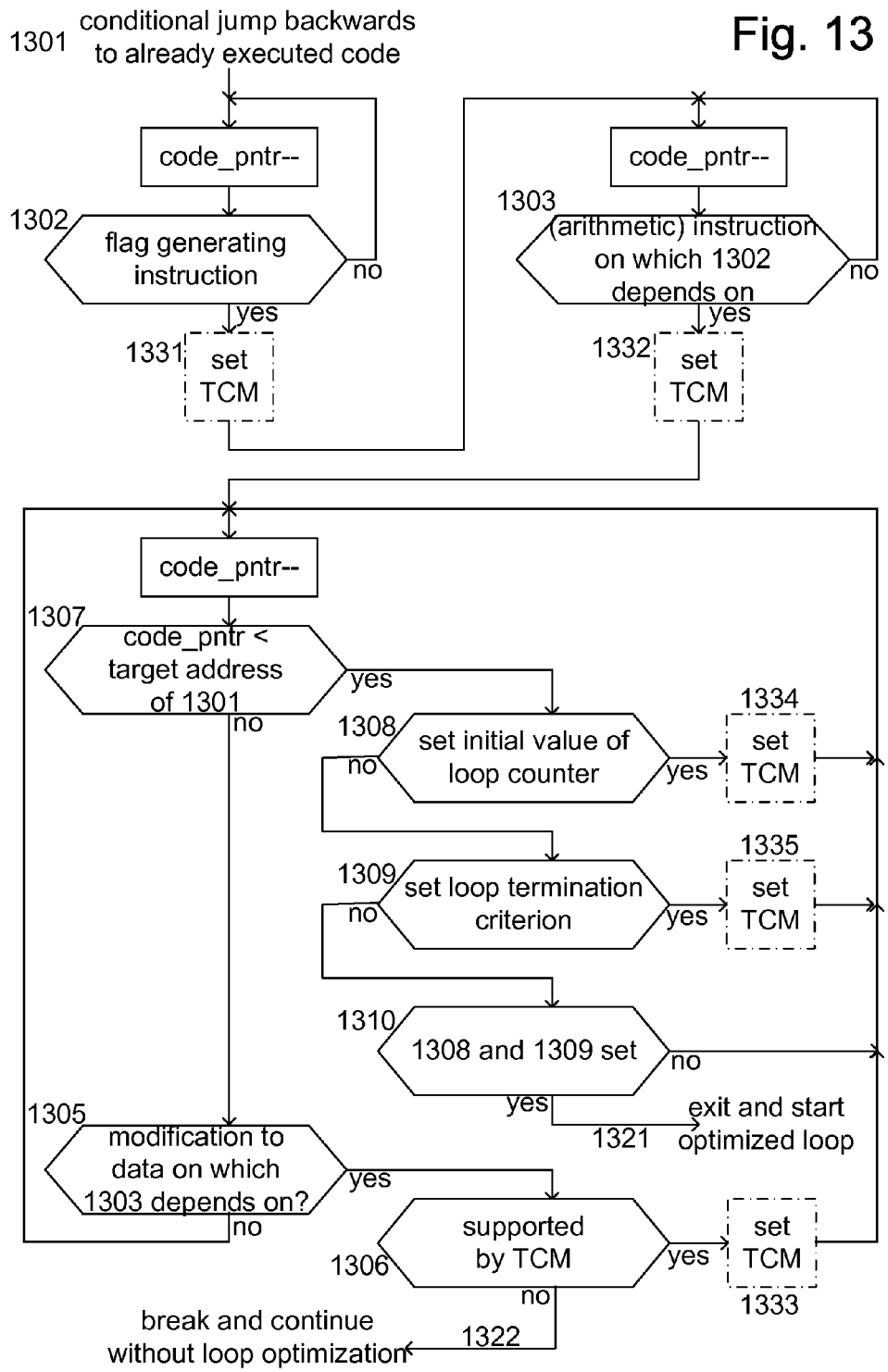
FIG. 13 is a diagrammatic illustration of an example backtracking process for analysing loops.

FIG. 13 shows an exemplary embodiment of a backtracking algorithm (BTA) for analysing loops:

After detecting a conditional jump backwards (e.g. jne .L6 (1101) of FIGS. 11A and 11B) to already executed code (1301), a code pointer (code_pntr) moves backwards and the respective instructions are fetched and read until the instruction is detected (1302), which generates the flags (e.g. by comparison, e.g. 1110) controlling the conditional jump operation (1301, e.g. jne .L6 (1101)). The respective instructions might be fetched from memory (e.g. main memory or code cache (e.g. Level-1 instruction cache)), but are in preferred embodiments preferably fetched from an accordingly large Code Analysis Queue (which could be implemented using a ReOrder Buffer (ROB) (reference is made to [2] Chapter 5 and the "Tomasulo" algorithm know by one skilled in the art) or Reservation Station (reference is made to [2] Chapter 5 and the "Tomasulo" algorithm know by one skilled in the art) or Trace Cache (reference is made to [4] chapter 35) if located there. The TCC compare settings (e.g. FUNC[3 . . . 1]) are set (1331) in accordance with the detected instruction (1302).

The code pointer (code_pntr) moves further backwards and the respective instructions are fetched and read until the instruction is detected (1303, e.g. 1111), which modifies at least one of the variables which are used in the flag generating instruction (1302). Typically the instruction is arithmetic and of the type addition or subtraction. However in some embodiments more advanced instructions may be supported and/or not only one instruction may be supported by the TCC but even more complex operations having a plurality of instructions. The TCC arithmetic settings (e.g. FUNC[0]) are set (1332) in accordance with the detected instruction (1303).

The code pointer (code_pntr) moves further backwards and the respective instructions are fetched and read until further instructions are detected (1305), modifying at least one of the variables on which the flag generating instruction (1302) depends on. If those instructions are supported by the TCC (1306), the TCC is accordingly set (1333); else the instructions might be ignored if possible. If not the loop possibly cannot be optimized. In this case the loop optimization is stopped and the non-optimized loop is processed in the traditional manner (1322).

After the further continuously backward moving code pointer (code_pntr) reached code before the jump target (e.g. .L6 of FIGS. 11A and 11B) of the conditional jump 1301, the loop header has been reached (1307). There the initial value of the loop counter and the loop termination criterion are defined.

If an instruction (e.g. 1113) is detected setting the variable of the loop counter (1308), the TCC initial loop counter value (e.g. CLC) is accordingly set (1334).

If an instruction (e.g. 1112) is detected setting the variable of the loop stop criterion (1309), the TCC stop criterion (e.g. LIMIT) is accordingly set (1335).

If both, the initial loop counter value and the stop criterion have been set (1310), the loop is completely analysed and the TCC set up has been completed. The analysis routine quits and the loop processing is started (1321).

Respectively the backtracking algorithm may be extended in some embodiments to support step widths of the loop counter (CLC) other than 1 (e.g. by setting STEP).

Figure 14A:
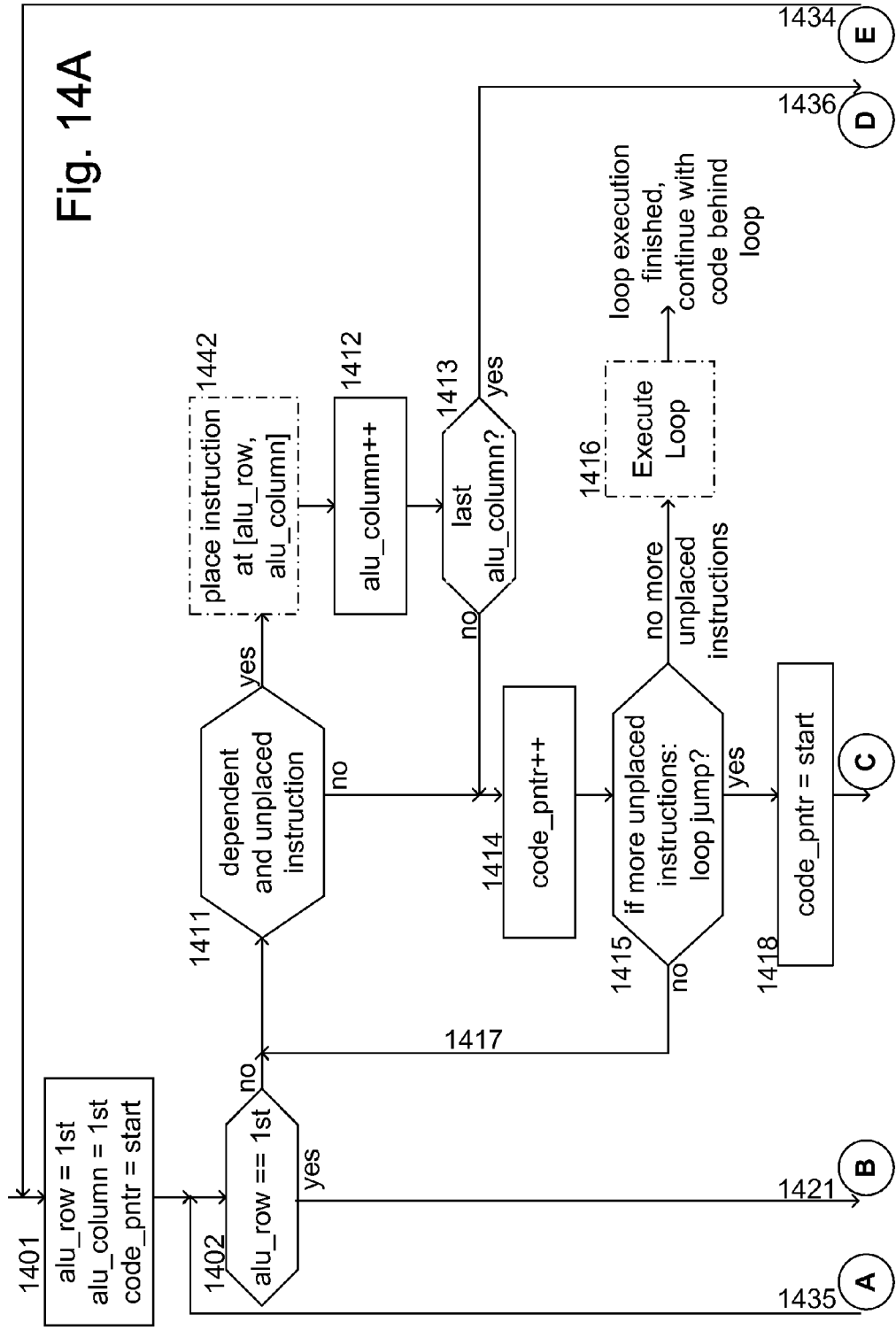
FIGS. 14A and 14B are diagrammatic illustrations showing an example process for placing instructions onto the ALUs in the ALU-block.
Figure 14B:
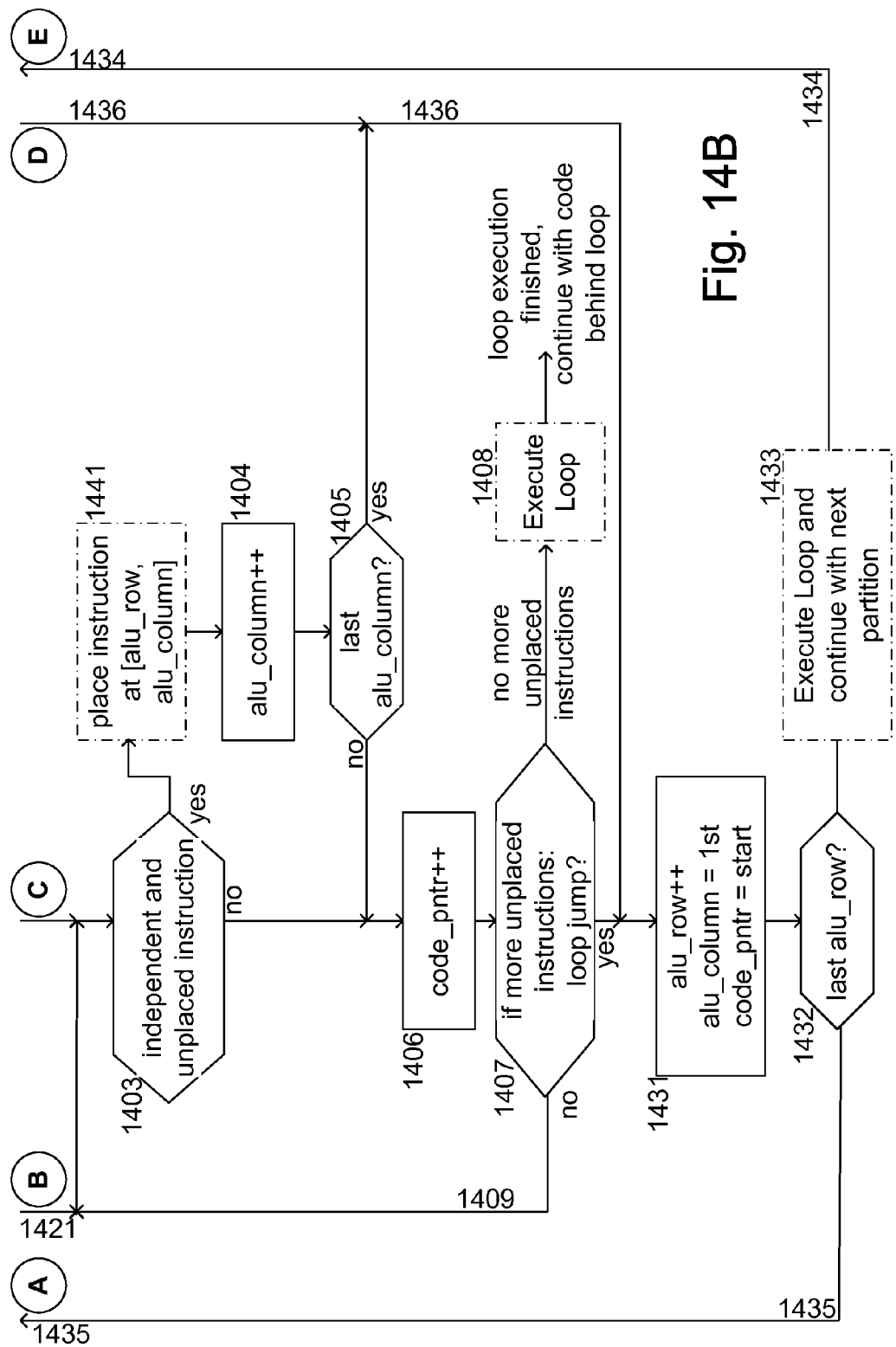

FIGS. 14A and 14B show an exemplary embodiment of a Catena optimization (COA) placement algorithm for placing instructions onto the ALUs in the ALU-Block:

After the detection of a loop the algorithm starts with the first instruction of the loop, the code pointer (code_pntr) points to the start of the loop. The ALU pointers alu_row and alu_column point to the first ALU (in the preferred embodiment the upper left ALU) (1401).

In the first row only instructions can be placed not depending on other instructions placed in the ALU-Block. Therefore the algorithm is continued respectively (1402) with placing independent instructions (1421).

If code_pntr points to an unplaced independent instruction (1403), it is mapped onto the specific ALU in the ALU-Block at the position alu_row and alu_column are pointing at (1441) and the alu_column pointer is incremented (1404).

If the last ALU in the column is not yet reached and further ALUs are available (1405), the code pointer is incremented (1406) and points to the next instruction to be analysed.

If all instructions within the loop are placed and no more unplaced instructions exist (1407), the placed instructions are executed (1408) and afterwards processing is continued with code behind the loop.

If more unplaced instructions exist and the conditional jump backwards is not yet reached (1407), the instruction analysis and placement continues with the next instruction (1409).

If more unplaced instructions exist and the conditional jump backwards is reached (1407), the placement is continued in the next ALU row. The ALU row pointer (alu_row) is incremented, the ALU column pointer (alu_column) is reset to the first column and the code pointer (code_pntr) is set with the start address of the loop code (1431).

If the last ALU row has been placed and no more ALU row is available (1432), the placed instructions are executed (1433) and afterwards the instruction analysis and placement continues with the next unplaced instruction, from the start address of the loop code on (1434).

If the last ALU row has not been placed and more ALU rows are available (1423), the loop analysis continues placing code into the next row (1435).

When continuing, the algorithm restarts the analysis from the first instruction in the loop on.

Now placing ALU rows other than the first (1402), dependent unplaced instructions are searched and placed first.

If code_pntr points to an unplaced dependent instruction (1411), it is mapped onto the specific ALU in the ALU-Block at the position alu_row and alu_column are pointing at (1442) and the alu_column pointer is incremented (1412).

If the last ALU in the column is not yet reached and further ALUs are available (1413), the code pointer is incremented (1414) and points to the next instruction to be analysed.

If all instructions within the loop are placed and no more unplaced instructions exist (1415), the placed instructions are executed (1416) and afterwards processing is continued with code behind the loop.

If more unplaced instructions exist and the conditional jump backwards is not yet reached (1415), the instruction analysis and placement continues with the next instruction (1417).

If more unplaced instructions exist and the conditional jump backwards is reached (1415), the search for placeable independent instructions starts from the first instruction in the loop on (1418).

If the last column has been placed (1413 or 1405) the algorithm continues (1436) placing the next ALU row (1431).

In order to differentiate between place and unplaced instructions, a scoreboard might be used, a table in which each of the instructions in the loop is referencing to a flag indicating whether the instructions has been placed already or not, or any other flag associated to an instruction. Obvious for one skilled in the art, the flags could be implemented in the Trace-Cache or CAQ. For example, a placement information (1602) in the CAQ according to the exemplary embodiment shown in FIG. 16 can be used to determine if an instruction has been placed. Also obvious for one skilled in the art, various other methods might be used, e.g. deleting placed instructions and/or replacing them with a token indicating that the respective instruction has been placed already.

Loop Control

The loop control may depend on data, computed irregularly and/or not predictable within the loop. This prevents automated counters as described before. Typically such loops are not counter based, as e.g. simple for-loops, but are controlled by more complicated conditions.

Loop analysis algorithms (such as BTA or COA) may try to move the computation of the respective data upwards in the code sequence for earlier processing, and correspondingly the loop control. Ideally it is possible to move both into the first Catena produced, so that the number of loop iterations is known a prior.

However, often this is not possible, as the respective data can only be generated late in the loop computation.

In those cases, speculation may be used to ensure optimal loop performance:

Each Catena is processed for n-iterations, until finally loop control is computed. The loop termination may be detected already after m<n iteration. Too many loop iterations (n−m) may have been computed, the loop overshot by n−m cycles. Overshooting causes a variety of problems: E.g. wasted performance and power; but algorithmically worse are wrong results at the end of the loop processing.

One preferred approach for avoiding erroneous results is to buffer all store and register write operations in a loop result pipeline (RSP), which depth is n−1 (assuming that at least one of n cycles has to be processed to detect the loop terminations, else the terminations had been detected already previously).

During loop processing, the output of the pipeline is written into the registers of the register file and analogous memory. This is safe, as the pipeline is deeper than the number of overshoot cycles in the worst case.

In case of the overshoot, the overshot entries are deleted and the remaining pipeline entries are written to the target. If entries are targeting the same address (e.g. the same register or the same memory location) it is sufficient to write the last entry and discard all others.

Obviously, during loop processing, read operations have to receive the data of the addressed register or memory location from the RSP, if the respective address is in there.

To avoid unnecessary performance and power loss, as well as unnecessary hardware overhead for the RSP, it is preferred to limit the number of maximum loop iterations for such kind of loops.

Processing only n=1 iterations, would eliminate all problems, but the pipeline through the array of ALUs (ALU-Block) would frequently stall and bubble.

The minimum number of iterations to keep the pipeline operating under optimum conditions (bubbles or stalls are avoided), the number of iterations n should equal the depth of the pipeline (e.g. the number of rows). E.g. for a 4 rows deep ALU-Block, the number of iterations n should be ideally 4. Thus the optimum performance is achieved and the maximum overshoot is limited to acceptable 3 cycles (assuming that at least one of n cycles has to be processed to detect the loop terminations, else the terminations had been detected already previously). Respectively, a 3 entries deep RSP shall be deemed as an acceptable hardware overhead.

Code Analysis

As described, in a preferred embodiment the code is analysed during first loop execution(s), e.g. the first loop execution, the first two loop executions or within a number of first loop executions.

The benefit of this procedure is manifold, e.g.:

No effort during code decoding, which typically increases the latency and pipeline depth.

In this preferred embodiment the code is dynamically analysed during execution. This allows more thorough analysis as runtime information is available during execution, which would not be accessible at the decode stage.

The Code Analysis Queue (CAQ)

The CAQ is an instruction buffer, storing an amount of instructions large enough to detect, analyse and optimized loops of decent size. While a larger queue size improves the quality of the optimization algorithms, the size is limited by silicon cost. The lower limit of the queue size is defined by the amount of ALUs in the ALU-Block. At least as many instructions as can be mapped onto the ALU-Block should be storable into the CAQ.

The detection, analysis and optimization algorithms read the instructions from the CAQ, and write the optimized instructions either back to the CAQ or forward them to further processing.

The CAQ is a circular buffer. Instructions newly received are written to the beginning of the buffer. Instructions forwarded for further processing are marked as being released. Released instructions might be removed from the CAQ. Released instructions at the end of the buffer are removed freeing space for receiving new instructions.

The CAQ might be located
a) in front of or coupled with the Instructions Decoders: Instructions are received from the Instructions Buffers (e.g. see [4] FIG. 38-2 Streaming Buffer, or [2] FIG. 5-1 IFU1,2,3) and forwarded to the Decoder Stage or Register Allocation Table (RAT) or Register Renaming Stage or Schedulers (e.g. [2] FIG. 5-1, [4] FIG. 38-3);
b) behind the Instruction Decoders: Instructions are received from the Decoders (e.g. [4] FIG. 38-2 IA32/µop Decode, or [2] FIG. 5-1 DEC1, 2) and forwarded to the Reservation Station (RS) (e.g. [4] FIG. 38-3 General Instruction Queue, [2] FIG. 5-1) and/or (Re-Order Buffer (ROB) or the Execution Units (EX).

In preferred embodiments for Out-Of-Order Processors the CAQ might be implemented using the Reservation Station(s) (e.g. [4] FIG. 38-3 General Instruction Queue, [2] FIG. 5-1) and/or the Re-Order Buffer (e.g. [2] FIG. 5-1) of the processor.

In-Order processors typically do not comprise buffer such as ReOrder Buffers (ROB) or Reservation Stations (RS). This type of processors therefore preferably have dedicated CAQ implemented, either in front of or coupled with the Instructions Decoders (see a)) or behind the Instruction Decoders, preferably in front of or in parallel to the Execution Units (EX).

The Trace Cache might be used directly as CAQ. It shall be noted that the Trace Cache (TC) might be implemented in both types of processors, In-Order and Out-Of-Order.

Exemplary implementations are shown in FIG. 19 using simplified processor block diagrams. The used labels are obvious for one skilled in the art: IF=Instruction Fetch stage, ID=Instruction Decode stage, ROB=Reorder Buffer, RS=Reservation Station, EXU=Execution Units. The instructions are transferred from the IF to the ID. Subsequently decoded instructions and/or microcode (e.g. µOps) are processed. In the context of describing the function and/or implementation of the invention, the term instructions may be understood i) as decoded instructions and/or microcode (e.g. µOps) if the invention is applied behind the Instruction Decoder stage (ID); ii) as instructions (e.g. binary opcodes) if the invention is applied before or in the Instruction Decoder stage (ID).

The Analyser and Optimizer stage (AOS) (according to this invention comprising e.g. BTA and/or COA and/or the subsequently described MRA) monitors the instructions transmitted from the RS to EXU. A plurality of Reservation Stations (RS) may exist, e.g. one for each of the Load/Store units, the Integer Units, and the Floating Point units. Alternatively one RS may serve all of said units.

Figure 19C:
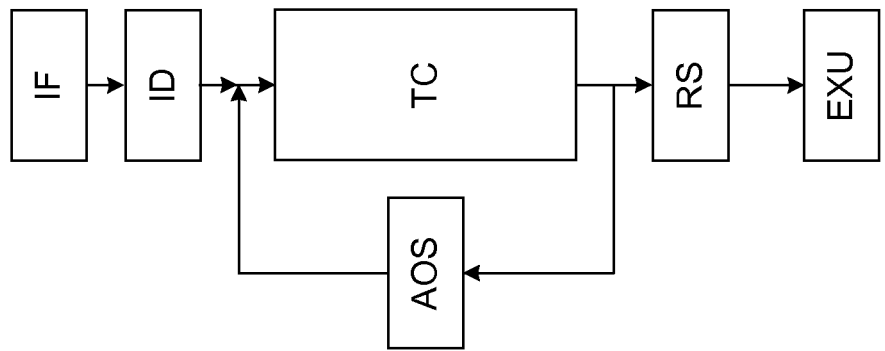
FIGS. 19A, 19B, and 19C are diagrammatic illustrations of example implementations of stages of out-of-order processors.
Figure 19B:
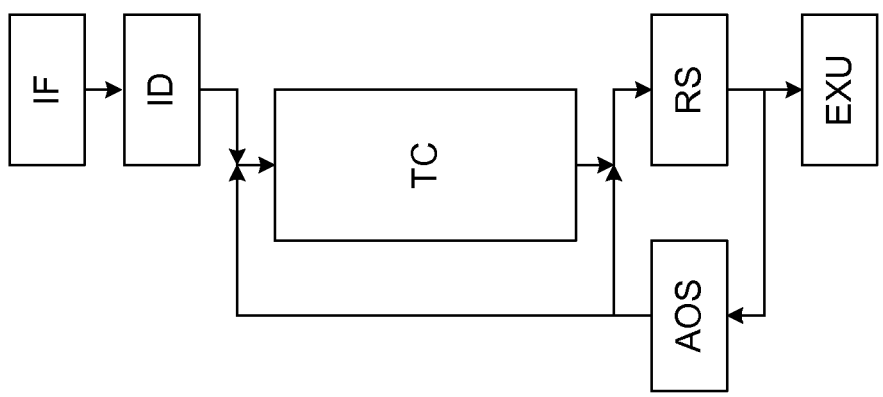
Figure 19A:
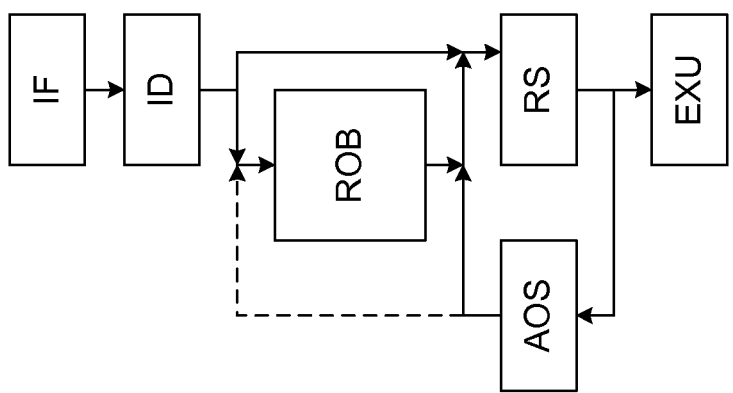

Exemplary implementations for Out-Of-Order processors are shown in FIGS. 19a, 19b and 19c.

FIG. 19a shows a first example of an Out-Of-Order processor (OOO). The instruction stream through one or a plurality of Reservation Station(s) is analysed (RS equals CAQ). The RS receive the instruction from ID. Simultaneously the instructions may be written into the ROB.

In a preferred embodiment, it is assumed that the Reservation Station(s) RS have sufficient depth to keep all instruction entries for the optimized code. The optimized code is written back from AOS directly into the RS and simultaneously into the Trace Cache (TC), so that later executions of the very code immediately have access to the optimized version. As before, the optimized code is subsequently transferred from the RS into EXU again.

In other embodiments, e.g. if the Reservation Station(s) have insufficient depth, the AOS writes the optimized code into the ROB, from which it is subsequently transferred to the RS for being sent to EXU.

FIG. 19b shows a second and more preferred example of an Out-Of-Order processor (OOO), comprising a Trace Cache. In the shown example the basic architecture of the Pentium 4 is used, which did not comprise a ReOrder-Buffer (ROB), but used Register Aliasing. Obviously in other implementations, a ROB could be implemented behind the TC. As in the Figure before, the instruction stream through one or a plurality of Reservation Station(s) is analysed (RS equals CAQ). The RS receive the instruction from TC. Simultaneously the instructions may be written into a ROB if implemented.

In a preferred embodiment, it is assumed that the Reservation Station(s) RS have sufficient depth to keep all instruction entries for the optimized code. The optimized code it written back from AOS directly into the RS and simultaneously into the Trace Cache (TC), so that later executions of the very code immediately have access to the optimized version. As before, the optimized code is subsequently transferred from the RS into EXU again.

In other embodiments, e.g. if the Reservation Station(s) have insufficient depth, the AOS writes the optimized code into the TC, from which it is subsequently transferred to the RS for being sent to EXU.

The Trace Cache typically stores the dynamic instruction stream in order of the dynamic executions (reference is made to [6]). Therefore it is in most cases sufficient to apply the invention on Trace Cache (TC) level, analysing the instructions stream in the Trace Cache (TC equals CAQ) and writing the optimized code back into the TC. A respective implementation is shown in FIG. 19c.

Figure 19F:
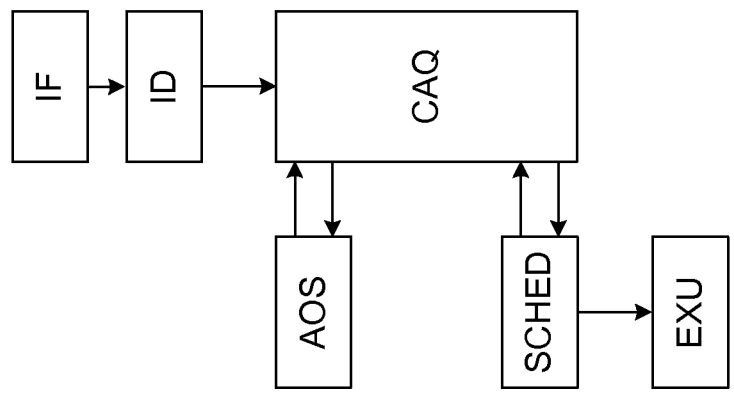
FIGS. 19D, 19E, and 19F are diagrammatic illustrations of example implementations of stages of in-order processors.
Figure 19E:
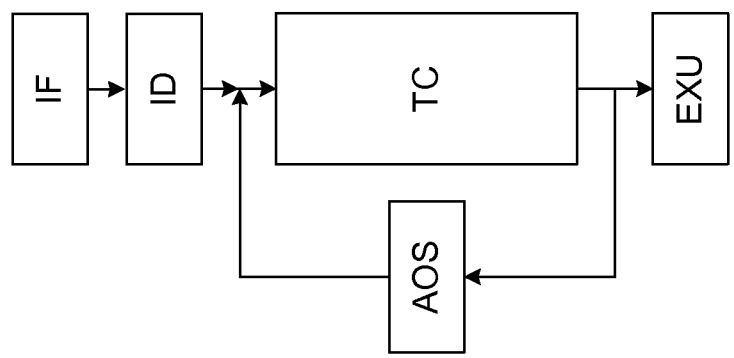
Figure 19D:
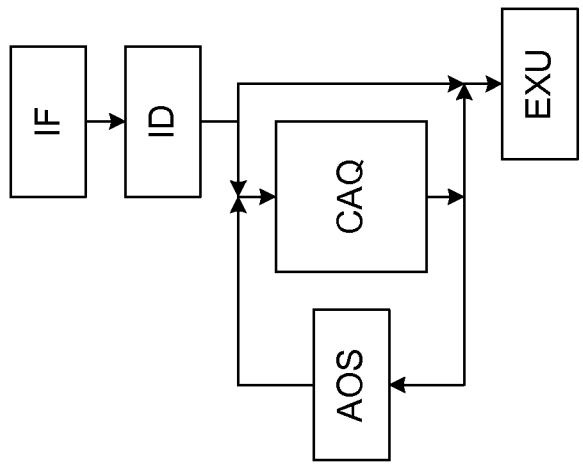

Exemplary implementations for In-Order processors are shown in FIGS. 19d and 19e.

In FIG. 19d the instructions are sent from ID directly to the EXU. A dedicatedly implements CAQ traces the instruction stream and stores the instructions. The analysis and optimization (AOS) is done on the instructions stored in the CAQ and/or directly on the instruction stream to the EXU. The optimized instructions are written into the CAQ, from which they are read if accessed again.

Obviously the CAQ operates very similar to a Trace Cache. Therefore in a preferred embodiment according to FIG. 19e a Trace Cache is implemented between the ID and EXU. The analysis and optimization (AOS) is done on the instructions stored in the TC and/or directly on the instruction stream to the EXU. The optimized or reordered instructions are written into the TC, from which they are read if accessed again. (TC equals CAQ).

In one embodiment, the CAQ's (or Trace-Cache's) data output might be of sufficient width to supply a plurality of ALUs of the ALU-Block, ideally an entire row with instructions in one single clock cycles.

Compiler Support

In an ideal environment, the high level compiler, generating the source code from a high level language might already sort the instructions into an ideal order for placing on the ALU Block. A respectively adapted optimizer path, which uses ideally the same placer algorithm as the processor internal Code Analysis and/or Placer sorts the instructions already into the correct order, so that no reordering has to be done by the processor (e.g. using BTA, COA, etc). The compiler's emitter delivers the instructions already in the optimal order.

In an ideal embodiment, the compiler emits all instructions in the same order as the processor would issue them to the ALU Block. As (in the exemplary embodiment of this patent) the processor places independent instructions within a row from left to right and then moves to the next row, and places dependent instructions in deeper rows, so that results can be transferred by the network from upper rows to lower rows, the compiler will emit the instructions in exactly the right order.

Instructions may be implemented to indicate that the next instructions shall wrap-around and be place in the next deeper row (in case a row cannot be completely filled), and/or instructions may use a bit or flag to indicate a wrap-around, and/or instructions may exist to place a subsequent instruction at an exactly specified location.

However, the most important aspect of this approach is that typically no specific support by the instruction set is required.

The processor internal code analysis wraps around to the next row as soon as

WRPa) the first instruction is detected depending on any other instruction in the current row;

WRPb) code to the last ALU of the current row has been issued and no more ALUs in that row are available.

This algorithm even works if the real processor might have a different architecture than the compiler assumed (e.g. more or less ALUs in a row, and/or more or less ALUs).

If this basic rule is observed, once respectively generated code can easily be used on other ALU-Block shapes and/or processor architectures.

Register Analysis and Handling

Figure 15:
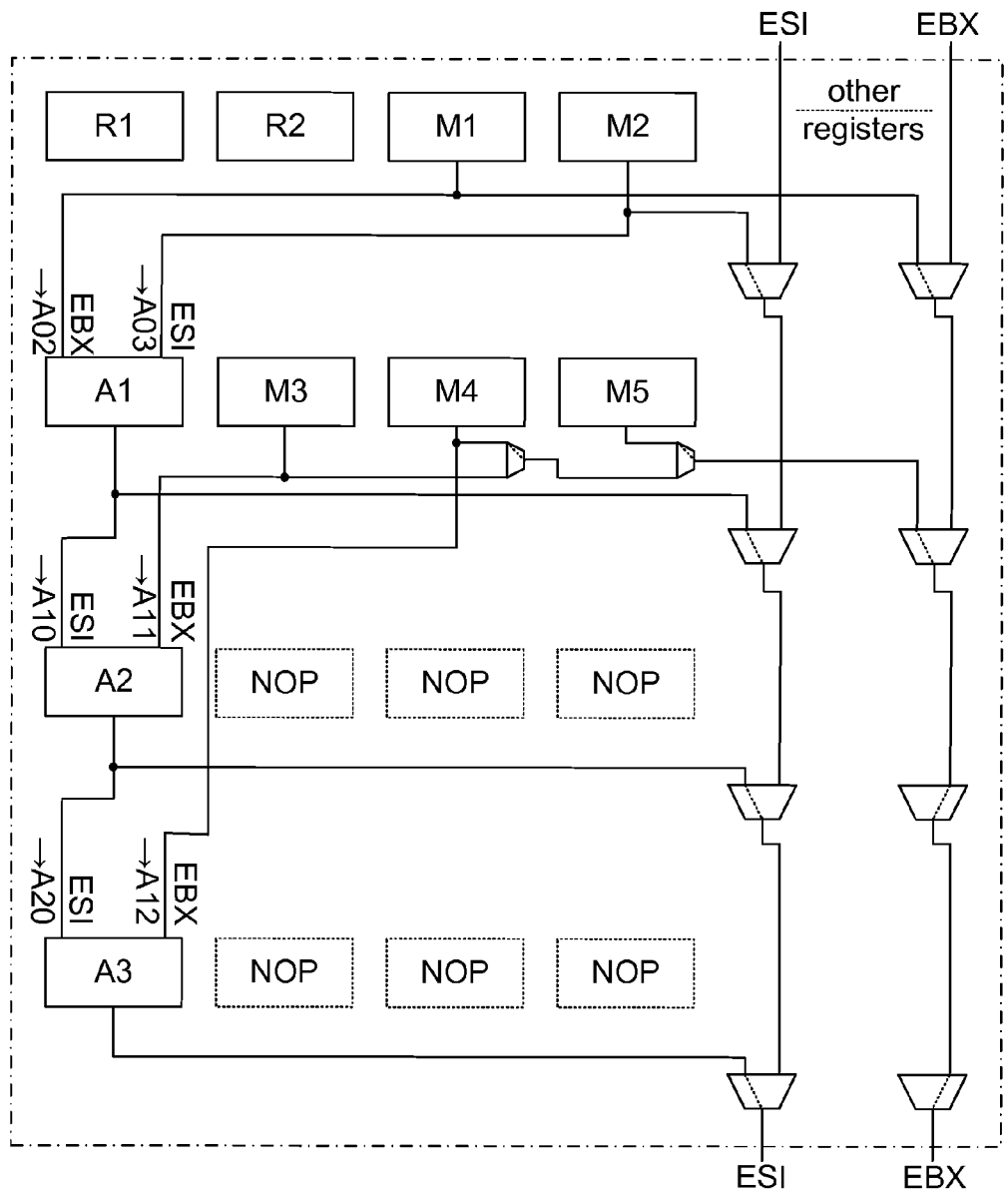
FIG. 15 is a diagrammatic illustration of example management of registers and ALUs.

Based on the exemplary FIR-filter 1, FIG. 15 shows the handling of result registers in an exemplary embodiment according to [3], e.g. FIG. 27. Each of the multipliers M1, M2, M3, M4, and M5 produces a result which is written into register EBX. Equivalently the adding instructions A1, A2, A3, (and A4), produce results which are written into the register esi. It must be ensured, that only and exactly the last instruction according to the original order of instructions actually writes its result into the respective registers. Basically methods known in the prior art, such as combinations of ReOrder Buffers (ROB), Register-Allocation-Table (RAT) and Retirement (RET) stages may be used (see e.g. [2], Chapter 5), e.g. in conjunction with register renaming, to solve this issue.

However, implementing a respectively optimized register write path to write result data into the register file, reduces the managing overhead significantly.

In one preferred embodiment, the source registers are managed by the RAT,ROB or Register Renaming stages, while the access order to the target registers is managed in the datapath.

Figure 16:
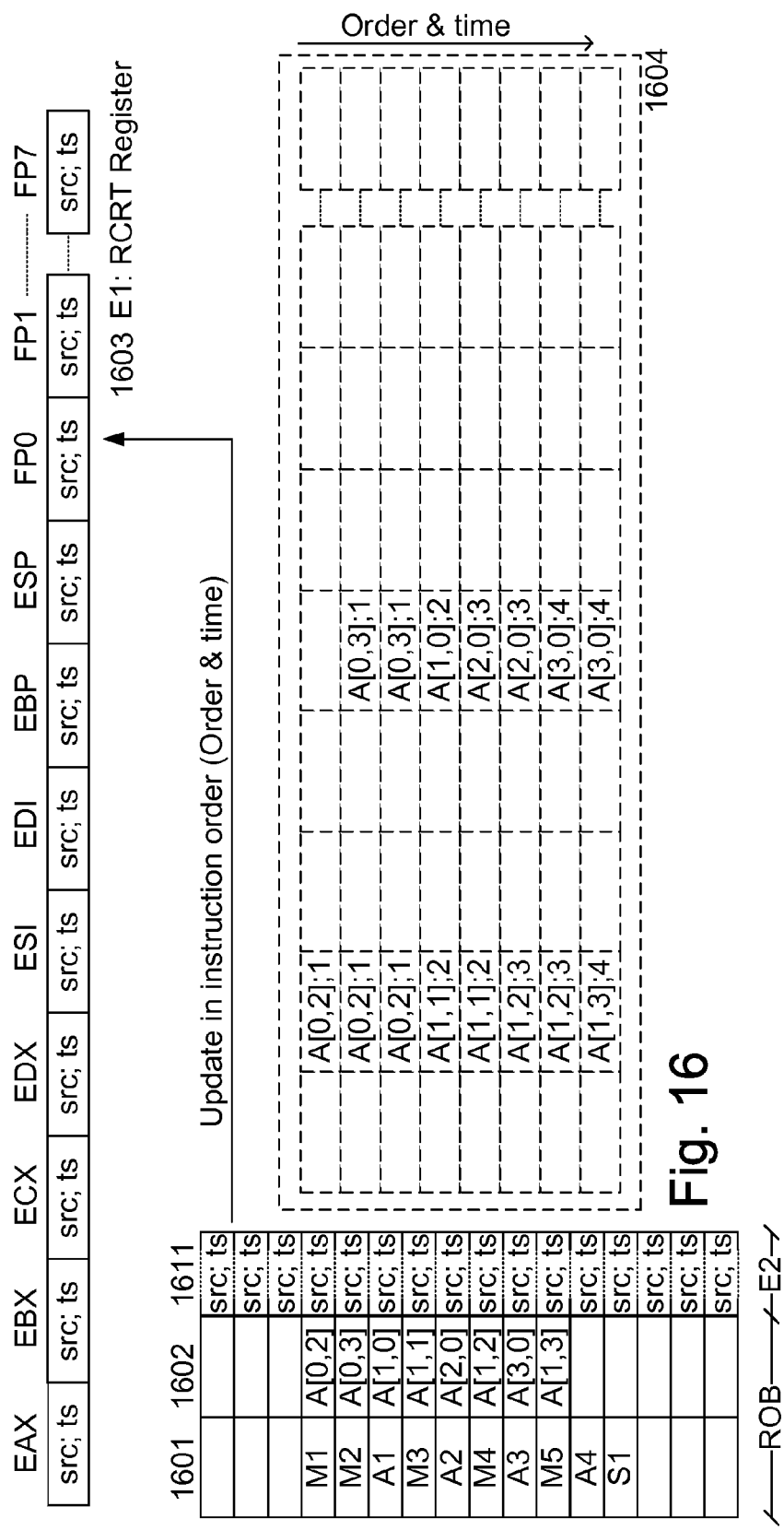
FIG. 16 is a diagrammatic illustration of example reordering of instructions mapped on ALUs, renaming or replacing of registers, and storing timestamps.

FIG. 16 shows the exemplary implementation of the source register assignment. In the Code Analysis Queue (CAQ) (1601) the decoded instructions are placed in program order (1601), according to the state of the art. The exemplary shown CAQ comprises exemplary instruction entries according to FIGS. 11A and 11B, FIG. 12a, and FIG. 15.

Preferably the BTA and COA algorithms operate on the ROB entries.

The CAQ comprises a field (1602) associated to each of the instruction entries indicating for each instruction where it has been placed. This filed can also be used by the COA algorithm as flag information to determine whether the respective instruction has already been placed already (e.g. for 1411, 1415, 1403 and 1407).

A Register Cross Referencing Table (RCRT) (1603) monitors for each target register, where the instruction generating the respective data has been placed within the ALU-Block. The shown exemplary embodiment uses the Intel IA register set (EAX, EBX, ECX, EDX, ESI, EDI, EBP, ESP, FP0, FP1, FP2, FP3, FP4, FP5, FP6, FP7).

In one embodiment (E1) the RCRT exists only once and is updated from cycle to cycle (t) each time a respective algorithm walks through the CAQ. For each subsequent instruction the source register is looked up from the RCRT. The source register address is then accordingly replaced with the respective ALU register (a[row, column), for details see also [3]), so that the source ALU is accessed instead of the actual register. The dashed table 1604 shows the changes made to the RCRT over time (t) in the Order of the instructions in the CAQ.

In one embodiment (E2), not one single RCRT is implemented, but each CAQ entry has an additional field 1611 comprising the RCRT. While this requires a larger CAQ, the maintenance effort for updating the RCRT from instruction to instruction in each of the CAQ walks is omitted. In this case 1604 shows the content of the 1611 field at the position of the exemplary instructions.

FIG. 15 exemplary shows the actual source register addressing and target register management of the exemplary FIR-filter 1 algorithm according to FIGS. 11A and 11B, FIG. 12a, and FIG. 16. The input registers EBX and ESI have been replaced with the ALU addresses according to FIG. 16:

Instruction A1: The EBX source data is directly received from the ALU A03 at position A[0,3], the ESI source data is directly received from the ALU A04 at position A[0,4].

Instruction A2: The EBX source data is directly received from the ALU A11 at position A[1,1], the ESI source data is directly received from the ALU A10 at position A[1,0].

Instruction A3: The EBX source data is directly received from the ALU A12 at position A[1,2], the ESI source data is directly received from the ALU A20 at position A[2,0].

The source connections are implemented by the data network programmably interconnecting the ALUs in the ALU-Block. For details see e.g. [3].

The output to the register file is fed through several multiplexer stages, prioritizing those instructions being later in the original instruction order. This is compliant with the behaviour of the original code.

Two multiplexer structures are supported by the hardware:
a) column multiplexers, feeding the result data from first row to last row of the ALU-Stage. Result data produced closer to the last row supersedes results produced by prior rows (to the top).
b) row multiplexers, feeding the result data from the left to the right, to the column multiplexers. Result data produced closer to the right (column multiplexers) supersedes results produced by prior ALUs (to the left).

The dotted lines in the multiplexer symbols indicate the actual setting of each respective multiplexer according to the exemplary mapped loop of the FIR-filter 1.

Figure 15A:
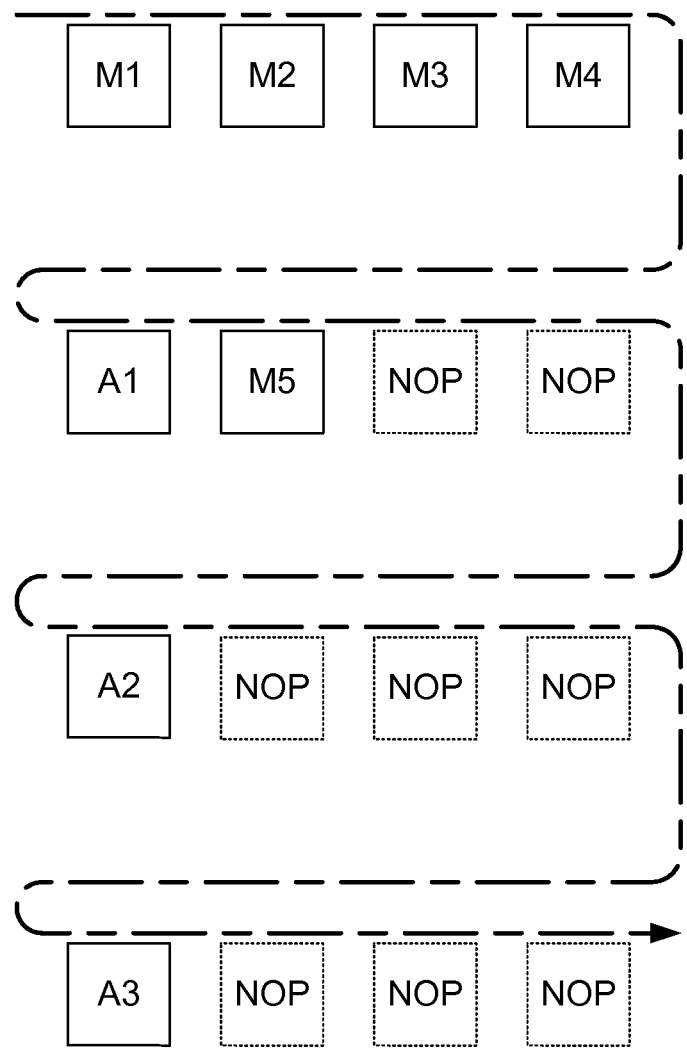
FIG. 15A is a diagrammatic illustration of an example data flow direction for ALUs.

Note: The described multiplexer structure is implemented for the exemplary ALU-Blocks with a preferred dataflow direction from top to bottom and for the exemplary Catena optimization algorithm (COA) starting the placement of instructions in the upper right corner, then moving to the right in the same row and then moving one row down and continuing there with the left ALU (see FIG. 15*a*).

Subroutine Calls

Often loops comprise subroutine calls, which would render any optimization unfeasible. The following solution eliminates subroutine calls in loops:

The CAQ (which can be a Trace Cache), caches the dynamic execution order of the instructions. In other words, a called subroutine is linearly embedded in the code calling the subroutine. Reference is made to FIG. 20.

FIG. 20*a* shows a main routine (2002), calling a subroutine (2003) within a memory structure (2001) (main memory or cache) according to the prior art.

The subroutine call modifies the processor's Program Pointer (PP) and the processing continues with the subroutine. The subroutine first saves (push) registers onto the stack, generating sufficient space for its own data. Before the subroutine returns to the main routine, the saved registers are restored (pop) from the stack, so that the main routine can continue operation unimpaired.

The call-ret and push-pop operations require significant time and memory traffic.

A Trace-Cache (2011) of the state of the art stores the code in execution order, as shown in FIG. 20*b*. Still, the call-ret and push-pop operations are stored and executed.

According to FIG. 20*c*, in the inventive CAQ (2021) the call-ret operations are eliminated. The respective instructions may be simply erased, as the code stored in the CAQ has the subroutine already embedded (in-lined) at the respective position.

Figure 16A:
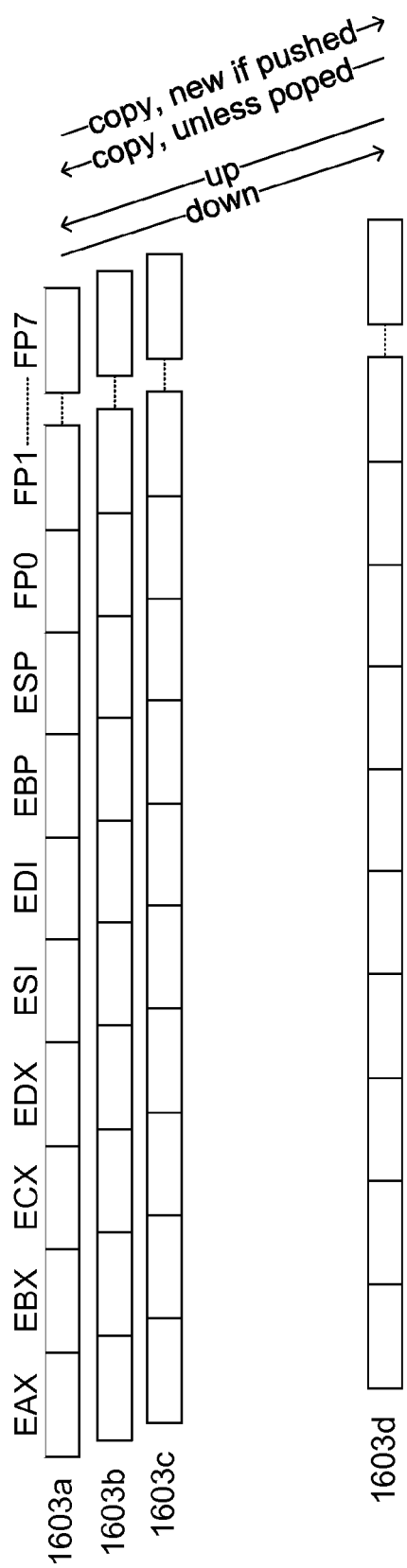
FIG. 16A is a diagrammatic illustration of an example expanded Register Cross Referencing Table (RCRT)

The context switches (push-pop operations) are removed for avoiding e.g. i) wasting resources by placing and executing the opcodes; ii) wasting bandwidth of the memory hierarchy; and slowing down data processing by adding access latency. Instead an expanded version of the Register Cross Referencing Table (RCRT) (1603) is implemented: A plurality of RCRT tables exist arranged in a stack or FIFO structure (RCRTS) see FIG. 16*a*) and within each context exactly one of the sets is active. When switching the context (e.g. by a subroutine call) another set of the table is selected. FIG. 16*a* exemplary shows 4 sets (1603*a*, 1603*b*, 1603*c*, 1603*d*), while the gap between set 3 and 4 indicates, that there might be more sets.

When entering a subroutine the push operations are analysed and condensed into a mask. Each register has an entry in the mask and if pushed, the respective entry is set. Ultimately the push operations are replaced by one single "down" instruction having the mask as parameter.

The "down" operation causes to switch the RCRT set to the subsequent one. The register references for those registers not being masked out (the flag in the mask is not set) are copied into the linearly subsequent "lower" set. For the masked registers references to unused registers of the Register File are generated.

A code example is provided to explain the mask function, for a RCRT according to FIG. 16*a*:
push eax; will set the eax mask bit
push edx; will set the edx mask bit
push fp7; will set the fp7 mask bit
The respective mask is
mask=<1001000000000001>

Executing down <1001000000000001> will copy all register references from the current RCRT set to the next lower RCRT set, but those for EAX, EDX, and FP7. For EAX, EDX, and FP7 new references to unused entries in the Register File are generated. Then the down instruction deselects the current RCRT set and selects the next lower RCRT set.

Respectively an "up" instruction is used to replace the pop operations. Analogously a mask is generated representing the register references to be copied into the linearly next "upper" RCRT set. The up instruction then deselects the current RCRT set and selects the next upper RCRT set.

Without having a negative impact on the loop optimization, as many cascaded subroutine calls as RCRT set exist can be embedded into the loop code. However, it cannot be guaranteed that there is no loop not having more cascaded subroutines than RCRT set exist. In this case, the remaining subroutine calls cannot be optimized and have to be process according to the prior art, which means the call-ret and push-pop operations are actually executed.

It shall be mentioned, that modern compilers often call functions, particularly compiler library functions (e.g. C Library) without saving (and subsequently restoring) the registers or part of the registers to the stack. In that case, no further action respective the described stack management is required and the in-lining of the called function into the main routine is comparably simple. Basically this can be done using the Trace-Cache, as the code is rearranged from the original binary order to the order in which it is actually executed. In the simplest embodiment it is sufficient to either remove the unnecessary jump instruction from the Trace-Cache or to skip its execution.

In advanced embodiments, the described stack management might be used to even implement very deep nesting, e.g. as required for recursive function calls (as e.g. used in the QuickSort algorithm). In those embodiments, the stack or FIFO of RCRT tables (RCRTS) is not limited in hardware. Rather, the set according to FIG. 16*a* is managed like a stack. The oldest RCRT(s) is/are spilled to or from the memory hierarchy, depending whether RCRTs are added or removed from the set. Preferably the RCRTs spilled to or from a memory page which is explicitly reserved for the spilling. Under control of the MMU, the page can be held close to the processor core in the memory hierarchy for fast low latency access. Furthermore, the reserved page is virtually invisible for executed programs and programmer and has no effect. Special debugging mechanisms may be implemented supporting the access of tools (such as e.g. a debugger) or the operating system to this reserved memory page.

In-Lining Functions and Inner Loop Optimization

In the ideal case, a called function is in-lined as previously described and has no further effect on the calling code. Simple functions, such as counters, accumulators, type conversion, etc. may not comprise loops on their own, so that the optimization of a calling loop is not effected.

However, if the called function comprises loops, inner-loop-optimization might be effected, at least in terms of performance and worst-case even deranged.

FIG. 4a shows a respective flow graph. Shown is the inner loop (0401) of an application, which ideally can be optimized using inner loop optimization technics, e.g. such as the loop optimizations described in this patent. However, the application loop calls another function (0402), which comprises a loop by itself. This loop becomes (by calling) the real inner loop, anticipating the optimization of the calling loop.

Exemplary, the Quicksort pseudocode in FIG. 4b shows this effect. Ideally the while-loop 0411 should be optimized as inner loop. However, possibly already the while-loops (0412, and 0413) prevent this. Even then it would be ideal to optimize those two loops as inner loops. As long as the processed data is numeric (e.g. integer data) the compare functions are simple and no loops are required. However, assuming strings or complex structs are compared, loops are very likely required for doing the compare functions (array[leftIdx]<array[pivot] and leftIdx<=pivot) and (array[rightIdx]>array[pivot] and rightIdx>=pivot). In this example the compare function(s) comprise inner loops at their own (see 0402).

If the algorithm permits, it is preferred to rewrite the algorithm into code avoiding such problems. A respective example is given in FIG. 5.

The critical while-loops are replaced by a for-loop. for-loops are preferred compared to while-loops or until-loops as their iteration value and exit criteria can be determined at the start of each loop iteration in most cases.

This allows splitting the graph into at least two, typically three partitions: first partition with the for-loop first half (0501), a second partition (0502) with the function comprising at least another loop and (possibly) a third partition (0503) with the second half of the loop.

It is now possible to loop each partition independently of each other. Each of the partitions is able to be optimized as an inner loop using the respective loop and inner loop optimization methods for compilers known in the state of the art. Particularly useful are optimizations such as Loop Interchange and Vectorization; Scalar and Array Renaming; Node Splitting; Index Set Splitting, Loop Peeling; Loop Skewing. Some optimization may be applicable in hardware, e.g. in the CAQ, or AOS, all of them are useful in the compiler generating optimized code for ALU Blocks. The optimizations above are well known to one skilled in the art. Those and other applicable loop optimizations are e.g. described in [5] and particularly in [10], Chapter 5.

For this optimization and transformation it is important that no partition depends on the results of a later partition. Only later partitions receive operands from prior partitions. In other words, 0503 receives data from 0502, which receives data from 0501. 0501 has to calculate both the loop counter and the termination condition self-contained, without any input from the lower partitions 0502 and 0503.

This conditions are not only applicable on for-loops (but rather typical for them), but may also apply on other type of loops (e.g. while- and until-loops) if they are respectively designed. Graph analysis of the control-flow (CFG) and/or data-flow (DFG) graphs even allow compilers in a large number of cases to rearrange the computations in loops such, that the above described conditions are met and the loop becomes respectively optimizable.

Each loop (0501, 0502, 0503) iterates the number of iterations (0504) defined by the first loop partition 0501 calculating the loop counter for each of the iterations and the termination condition. By such, each partition form an inner loop by itself.

The function 0502 iterates internally the number of iterations (0505) required to perform the function. After the function terminates, it is restarted for the number of iterations defined by 0504, or in other words: 0502 is a nested loop comprising two loops.

According to the ZZYX processor model, the data is passed from one partition to another via the FIFO register file, reference is made to [1]. With respect to [9], each of the partitions form a Catena, for which the specification of [9] may apply.

Figures 5A, 5B:
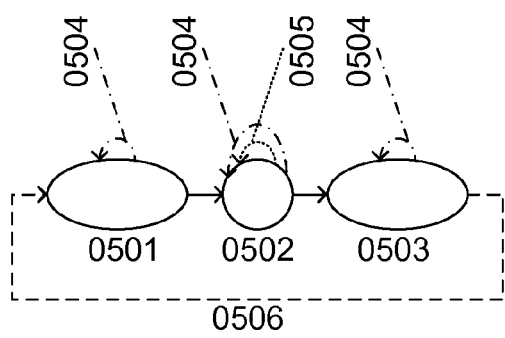
FIG. 5A is a diagrammatic illustration of a flow graph illustrating an example of splitting code into different partitions.
FIG. 5B is a diagrammatic illustration of example pseudocode providing a loop effect for the split graph of FIG. 5A.

FIG. 5b exemplary shows a respectively redesigned Quicksort algorithm. The calculation of the iteration counter (i) and the termination criteria (i=right−1) of the for-loop 0511 form the first partition (0501) according to FIG. 5a.

The compare function (0512) forms the second partition (0502) returning the result of each compare operation. Based on the result for each compare operation, the code (0513) in the body of the if-operation (and the remaining code of the for-loop) form the third partition. In each iteration, the code belonging to the if-operation is conditionally executed, depending on the result of the compare function. Details on conditional execution within optimized loops are subsequently described.

The loop header processed in 0501 sets the number of iterations for each run through the partitions 0501, 0502, and 0503 in accordance to the hardware capabilities and/or resources of a processor (e.g. the depth of the FIFOs of the register file (FDR)). For example if the loop had to be processed for 100 cycles. The processor only provides 16 entries in the FIFOs of the register file, setting the maximum number of iterations of 0504 to 16. The loop has to be subdivided into 100 divided by 16 equals 6 remaining 4 main iterations (0506). Obviously the remainder of the division requires an additional iteration through 0506, but this last time 0504 is iterated only 4 times.

Reference is made to FIG. 5 of [3], wherein the basics of loop processing are described (e.g. compare 0530 of [3] to 0506, 0510 of [3] to 0501 and 0520 of [3] to 0502).

Load/Store Analysis

For details on IA addressing modes reference is made to [1], e.g. Chapter 7 (e.g. FIG. 7-17) and Chapter 8.

Stack, Spilling and Memory-Located-Register-Values (MLRV)

This analysis and optimization is focusing on memory access for spilling registers. For details on spilling reference is made to [5] chapter 10.2.4.

Memory-Located-Register-Values (MLRV) are understood as memory locations used as registers or register-like. Those are typically values which are not as frequently used or not as performance critical as those other values preferably kept in registers. RISC processors following a rather strict load/store model would spill those values. CISC processors (such as Intel's IA/x86 architecture) supporting memory addressing in a wide variety of instructions, may place those values directly in the memory and access them through respective instructions (e.g. cmp ebx, DWORD PTR [ebp-16] (1110), see also FIG. 1). Memory-Located-Register-Values (MLRV) may originate for example from pseudoregisters (variables which theoretically can be allocated to registers), which actually could not be allocated to registers due to limitations of the register file. For details on pseudoregisters reference is made to [5] chapter 10.2.3.

According to this invention, Memory-Located-Register-Values (MLRV) are replaced by actual physical registers in the processor, the Pseudo-Register-File (PRF), which is preferably located close to the register file.

One exemplary embodiment of a Memory Register Algorithm (MRA) may operate as such:

MRA1) Defining a Vicinity

A vicinity is defined, in which Memory-Located-Register-Values (MLRV) are replaced by a Pseudo-Register-File (PRF).

Ideally a vicinity may be defined as i. analysable block of code (e.g. a loop, a subroutine, etc); and/or ii. code without interaction with other code (e.g. other tasks, threads, etc.; e.g. via globally shared resources such as memory or periphery).

For example, a subroutine vicinity may be code from a call target to the return instruction (ret); or loop code from a target of a conditional jump to the conditional jump instruction (referring e.g. to FIGS. 11A and 11B: the code section from the label/address .L6 (the target of jump 1101) to the jump instruction jne .L6.

MRA2) Selecting Base Pointer(s)

One or more base pointers and/or base addresses are selected defining the address window into the memory space to be optimized. Typically and preferably the stack pointer register (e.g. esp) is selected, and/or other register whose values are derived from the stack pointer register (e.g. ebp in the FIR-filter 1 example, see FIGS. 11A and 11B: mov ebp, esp (1121)).

MRA3) Replacing Memory Addresses by Register References

Within this vicinity memory addressing/addresses of the Memory-Located-Register-Values (MLRV) is replaced by register referencing/references to the Pseudo-Register-File (PRF).

The most simple and save approach is first to copy Memory-Located-Register-Values (MLRV) to the Pseudo-Register-File (PRF). If analysis can guarantee that a value is written for the first time in the respective vicinity the respective copy operation may be omitted. If within the preceding vicinity a Memory-Located-Register-Value (MLRV) has been replaced with the same register of the Pseudo-Register-File (PRF), the respective copy operation may also be omitted.

MRA4) Write Back

When the execution (i.e. the program pointer PP) leaves the vicinity, the Pseudo-Register-File (PRF) is written back to the memory, so that it is guaranteed, that all Memory-Located-Register-Values (MLRV) are updated and correct. The MRA may continue with step MRA1).

Figure 17:
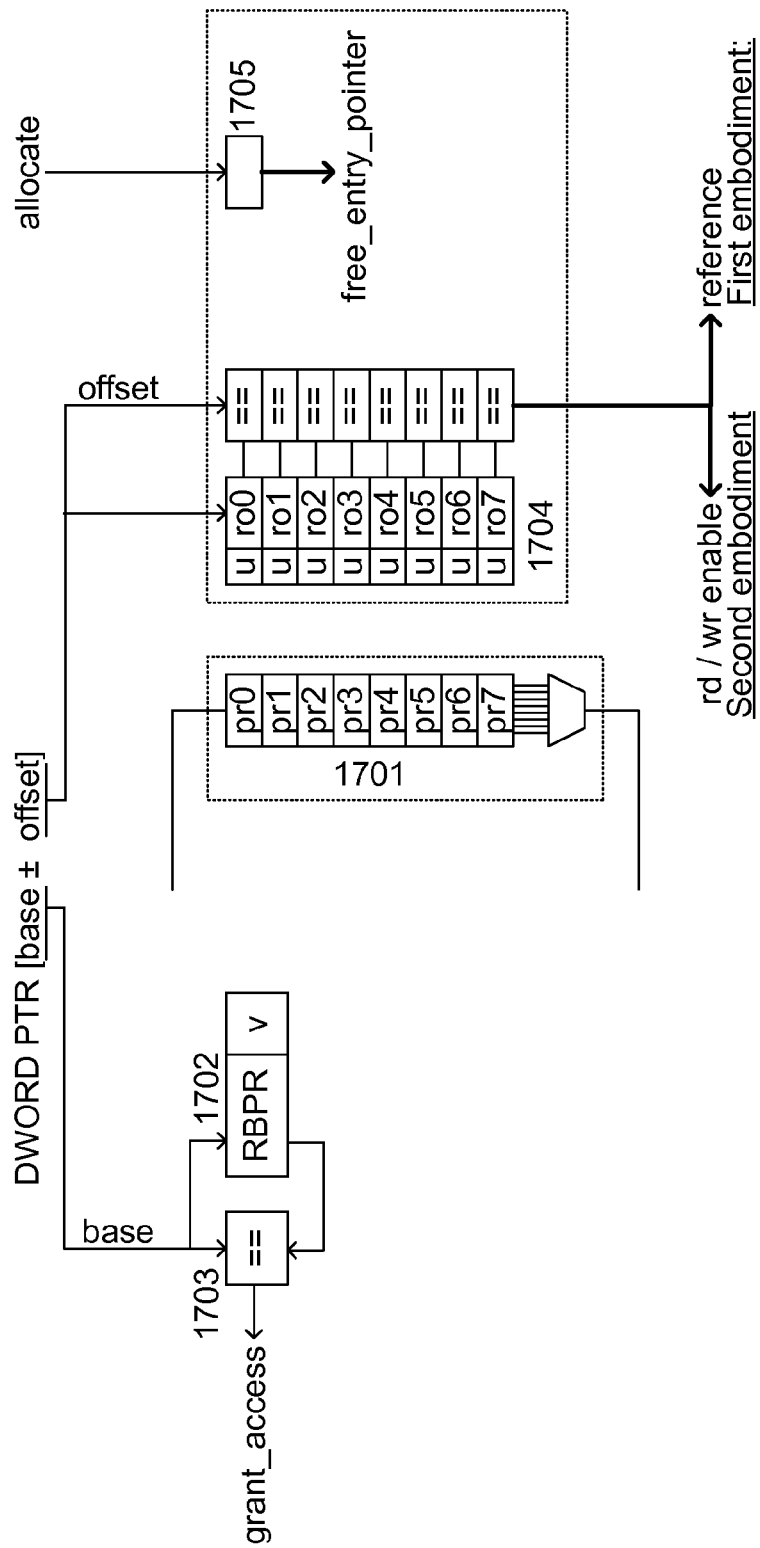
FIG. 17 is a diagrammatic illustration of an example Pseudo-Register File (PRF)

FIG. 17 shows an exemplary embodiment of a PRF, comprising 8 pseudo-registers pr0 . . . 7 (1701).

The example uses a 32-bit address pointer (DWORD PTR [base±offset] according to the Microsoft MASM assembler.

When initializing the PRF for a new vicinity, the base address (base) is stored in step MRA2) in the Reference Base Pointer Register (RBPR, 1702). The RBPR may comprise a valid tag (v) for allowing the control state-machine to check whether the register has been set and the PFR is in use. After writing back the PFR contents (flushing), the valid flag might be reset.

At each memory access (e.g. via an address pointer such as DWORD PTR), the value in the RBPR register is compared (by the comparator (1703) with the current base address (base). Only if the values are identical, access (read, write and/or modify) to the PRF is granted (grant_access). This mechanism ensures that the correct address space is managed and mapped to the PFR. Access is denied for incorrect base addresses. In one embodiment, a plurality of PFR might be implemented in hardware. Some of the PFR might be used for managing different base addresses, such allowing for optimizing a variety of base addresses. Others might be used for extending the space of other PFR: If a PFR is full and has no more free entries, the next PFR is used, having the same base address.

A lookup table might be used to reference the offset of an address to the respective register in the PRF. One exemplary embodiment (1704) uses an associated reference-offset register (ro$_n$, i.e. ro0 . . . 7 in FIG. 17) for each pseudo-register (pr$_n$). Each reference offset register has an associated comparator (=), comparing the register's content with the current offset (offset). If the current offset matches the value in a reference-offset register (ro$_n$), the associated pseudo-register (pr$_n$) is selected for data access.

In a first exemplary embodiment, memory accesses are replaced, e.g. in the Code Analysis Queue (CAQ), Register-Allocation-Table (RAT), Reorder Buffer (ROB) and/or Trace Cache, with references to the PRF. The replacement might be done at the decoder stage or the Register Allocation Table stage (RAT) of the processor. For details on the Decoder and Register Allocation Stages, reference is made to [2], chapter 5, e.g. FIGS. 5-1 and 5-6. For generating the reference, each memory access is looked up in 1704. If both, the base address matches (grant_access) and 1704 detects that the offset is stored in one of the reference-offset register (ro), the memory access is replaced with a reference to the respective reference-offset register. If the access is granted (grant_access), but the current offset does not yet exist in the lookup-table 1704, a new entry might be generated if there is space left in the PRF.

In a second exemplary embodiment, memory accesses are not replaced, but for each memory access the lookup-table (1704) is checked during execution. If both, the base address matches (grant_access) and the current offset is found in the lookup-table (1704), access to the respective pr register is enabled. If the access is granted (grant_access), but the current offset does not yet exist in the lookup-table 1704, a new entry might be generated if there is space left in the PRF.

For allocating a pseudo-register for the new entry, two exemplary methods might be used:

a) each reference-offset register (ro) might have an associated used flag (u). For the new entry, a priority decoder may select for allocation one of those registers pr and ro not having the associated used flag set. Consequently the associated used (u) flag is set.

b) a free-entry-pointer (1705) may point to the next free entry in the PRF (free_entry_pointer) to be allocated. The free-pointer might be reset to the first register (e.g. pr0), e.g. during reset and/or flushing of the PFR (e.g. during MRA4)). With each new allocation of a register of the PFR (allocate), the free-pointer is moved (e.g. incremented) to the next free register.

Repetitive, Stream-Like Access Patterns, Prefetching

Another inventive optimization focuses on repetitive, stream-like memory accesses patterns as they may be generated in loops, e.g. for reading constant values (such as parameters), input data or writing output data. For such memory accesses dedicated Address Generators and/or Load/Store Units are implemented loading the data in advance (prefetching) and/or storing the data in the background. The code may have overlapping address patterns, which are managed by the Address Generators and/or Load/Store Units, so that the amount of memory accesses and the necessary bandwidth is reduced. An exemplary embodiment is shown in FIG. 18.

Exemplary code is shown in FIGS. 11A and 11B, within the loop from the label .L3 to the conditional jump jne .L6 (1101).

The decoder stage or the Register Allocation Stage (RAT) of the processor and/or the previously describe loop optimization algorithms (e.g. LT, BTA, COA) may analyse the code for memory accesses which addresses depend on the loop counter, either directly or in advanced embodiments indirectly. In the exemplary code of FIGS. 11A and 11B, the instructions (M1), (M2), (M3), and (M4) access the memory and are using the loop counter value in register eax for generating the memory address (Note: lea ebx, [eax+l] (1111) and mov eax, ebx (R2)).

Figure 18:
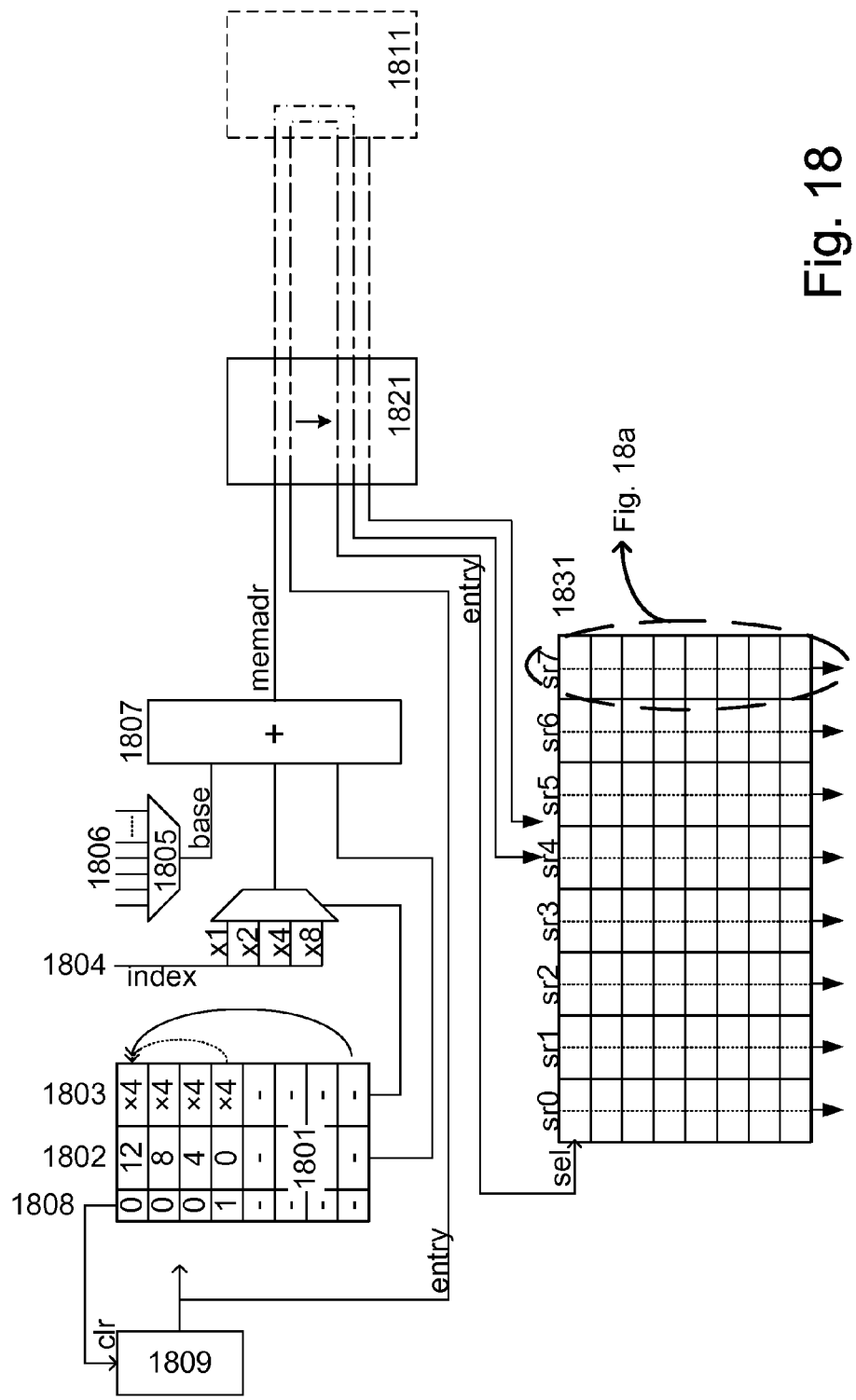
FIG. 18 is a diagrammatic illustration of an example memory interface unit.
Figure 18A:
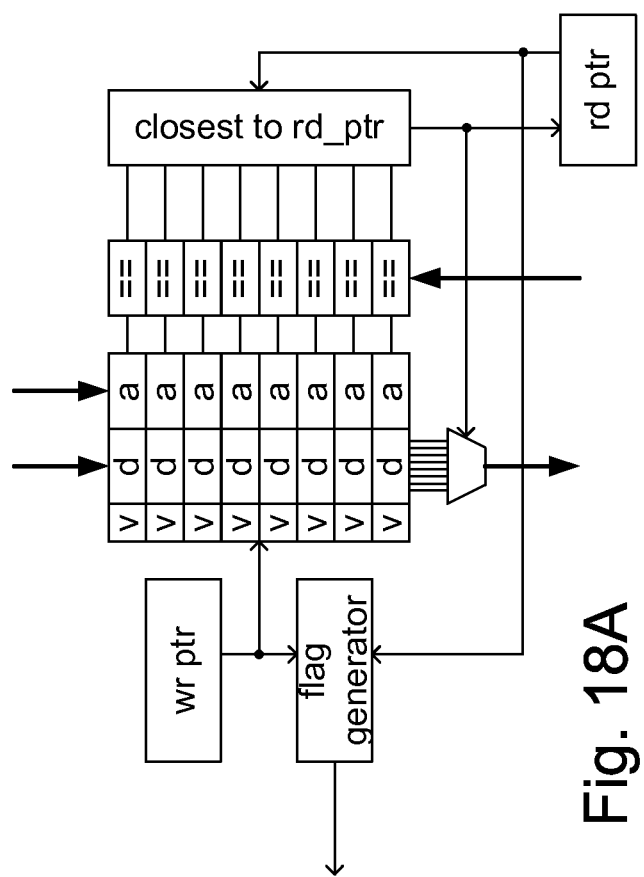
FIG. 18A is a diagrammatic illustration of an example stream register of the stream register file (SRF) of FIG. 18.

An exemplary memory interface unit is shown in FIG. 18: When analysing the loop code, the detected memory accesses are mapped into a memory access pattern table (MAPT, 1801). The algorithm of each memory access is (preferably linearly) written into the MAPT in (preferably strict) program order. The exemplary used Intel x86/IA processors support a base address (base), an offset constant (offset), an index (index) and a multiplier (.times.1, .times.2, .times.4, .times.8) to compute e.g. DWORD PRT [base+offset+index.times.multiplier). A respective MAPT comprises the fields offset (1802) and multiplier (1803). According to the exemplary code of FIGS. 11A and 11B, the following entries are written into the MAPT:

1. entry: offset=12, multiplier=×4 according to (M1)
2. entry: offset=8, multiplier=×4 according to (M2)
3. entry: offset=4, multiplier=×4 according to (M3)
4. entry: offset=0, multiplier=×4 according to (M4)

The MAPT further comprises a last-flag (1808), indicating the last entry in the table, which is respectively set (1) for the $4^{th}$ entry according to the shown exemplary code.

The address generator has an input from a loop counter providing the index (1804). Further details in the loop counter are subsequently described. The base address is provided directly from the base register. The base register is retrieved from the memory accesses during analysis, according to the exemplary code, the base address register is edx. The selector setting of a multiplexer (1805) is respectively set, to feed the base address register from the processors register file (1806) to the address computation. In one embodiment, the correctness of the base address might be checked during operation using hardware similar to 1702 and 1703 of FIG. 17.

The memory address (memadr) is computed by adding (1807) all values and fed to the memory (1811). Located between the address generator and the memory might be a unit (1821) checking for the same addresses previously generated. If the same address has been previously access, read accesses might be bypasses in that unit (1821) without accessing the memory (1811).

Read data is stored in a Stream-Register-File (SRF, 1831). There is one Stream Register (SR0 . . . 7) for each of the entries in the MRPT. Each of the Stream Registers is implemented as a FIFO for prefetching a plurality of addresses. Each memory access is replaced, e.g. in the Code Analysis Queue (CAQ), Register-Allocation-Table (RAT), Reorder Buffer (ROB) and/or Trace Cache, with a reference to the SRF. The replacement might be done at the decoder stage or the respective stages of the processor. For details on the Decoder and Register Allocation Table Stages, reference is made to [2], chapter 5, e.g. FIGS. 5-1 and 5-6. Each entry in the MAPT has an associated SRF register, MAPT[entry] is associated with $sr_{entry}$ (e.g. MAPT[2] is associated with sr2).

The operation of the exemplary address generator is now described:

A counter (1809) is selecting entries in the MAPT. The counter (1809) starts with the first entry and selects the following entries one by one in preferably strict program order. After reaching and selecting the last entry, which is the one having the last-flag (1808) set, the counter restarts with the first entry. Thus, the MAPT is a circular memory. The address according to the entry the counter (1809) is pointing at is generated and issued.

The counter value (entry) is transmitted together with the generated address to the memory subsystem for indicating to which memory access the respective address belongs to. Ultimately the counter value selects (sel) the associated register in the SRF (1831).

The read address generation is synchronized with the register file 1831. If one or more FIFO registers are full (or almost full) the address generation is stopped until sufficient free entries in the SRF are available again.

The write address generation is synchronized with the availability of write data.

The index value (1804) might be provided in at least two ways:
1. If the sequence of the index can be analysed and guaranteed, the index might be generated by respective hardware, e.g. a counter. The start value and step width of the counter is set according to the analysis. If possible an end value might be provided by the analysis and set.
2. If it is not possible to determine and/or guarantee the index sequence, the original index value is used, in case of the exemplary code eax. The address generation is synchronized with the loop execution: it stops after each run through the MAPT when resetting the counter 1801 and continues only when the eax value is updated (mov eax, ebx (R2)).

Loading Streaming or Frequently Accessed Data

Many algorithms operate on streaming data (e.g. video, audio, radio and/or other DSP algorithms) or use data or data fields which are frequently accessed (e.g. sorting data, linear algebra (e.g. matrix multiplication).

Frequent access to the same data (e.g. same address) is optimized in the state-of-the-art using caches. However, even the access to a Level-1 cache is comparably slow and power consuming. Therefore Frequent Load Register file (FLR) might be implemented in between the memory hierarchy (preferably the Level-1 cache) and the execution units of a processor (e.g. the EX stage, the ALUs or the ALU Block). The Frequent Load Register file might be implemented in parallel to the normal processor register file. The FLR can either be accessed using dedicated register addresses, so that the normal register identifiers are extended. Preferably the FLR is accessed using the normal Load instructions, so that no significant modification of the instruction set is necessary.

One embodiment of an optimized memory interface has been previously described and is shown in FIG. 18. The basic concept of yet another embodiment is demonstrated in FIG. 9 (and FIG. 9*a*) from a logical perspective. ARM7 (see [8]) load instructions are exemplary used. The FLR (0901) comprises a plurality of register (e.g. 8, 16, 32). The distance between two 32-bit data words is $2^2$=4, allowing byte wise access to the memory. Q represents the number of register in the FLR. Each register has preferably the same width as registers of the normal register file, e.g. the width of a data word. Register content is selected (e.g. as operands) using a multiplexer (0902). Processors comprising a plurality of ALUs and/or execution resources may have a plurality of multiplexers (0902 *a,b,c*) for selecting the respective operands.

A Reference Base register (RefBase, 0903) stores the base address for the contents of the respective FLR. In one embodiment multiple FLR might be implemented, each FLR being used for another base. RefBase (0903) is set by instructions modifying the base or the first instruction using the FLR with a new base. Exemplary shown is an ARM7 load instruction adding an offset (#offset) to the base [base] (0904). The base plus offset ([base]+#offset) add operation is performed in an adder (0905), which result is written into the RefBase register. Instructions not modifying the base (e.g. 0906) check if the base used in the instruction is equal to RefBase (e.g. using a comparator (0907)). If the base is equal RefBase (hit), access to the register file is granted, else a 'miss' is generated which triggers actual loading of the data from the memory hierarchy (e.g. the Level-1 cache). In case of 'hit' data is directly retrieved from the FLR, no data load from the memory hierarchy (e.g. the Level-1 cache) is performed. The offset (#offset) is used as selector input of the multiplexers (0902*a,b,c*) to select the respective register entry.

Associated with the data entry in each register of the FLR is a valid token 'v' indicating the validity of the data stored in the register. If the register contains no valid data, a read access initiates actual loading of the data from the memory hierarchy (e.g. the Level-1 cache).

If the base address is adjusted, e.g. using an instruction as shown in 0905, the contents of the FLR are shifted. In this example the base value can only be increased. Therefore a shift right operation of the data in the FLR adjusts the content of the FLR to the new base. The shift moves as many registers to the right as the base is increased. For example increasing the base address by 4, initiates a shift operation to the right by one register position; increasing the base by 16 triggers a shift right operation by 4 positions. (Note: The distance between two 32-bit data words is $2^2=4$, allowing byte wise access to the memory). Each shifting step invalidates the top register of the register file, e.g. a shift by 1 position to invalidates the most left register (containing address base+4×(Q−1)); shifting by 4 positions invalidates the 4 most left registers (comprising base+4×$2^Q$ to base+4×(Q−1)).

In this example the base address can only be increased. Embodiments allowing subtraction from the base or negative offsets will use shift left operations when the base decreases. If the offset altering the base is larger (or smaller) than Q, the whole register file is shifted out, which has the same effect as a flush operation clearing the register file.

The FLR might be implemented as read-only register file or in one embodiment as read/write register file in which store operations can write data into the register file. Similar to a cache, a read/write register file may use different write back strategies. For example a store instruction might trigger the immediate write through of the data to the memory hierarchy (e.g. the Level-1 Cache); data might be written back in spare memory cycles if no other memory operations take place; and/or a write-back strategy might be used in which data is written back when the FLR is flushed and/or shifted out, e.g. initiation by a change of the base address (e.g. 0903). Read/write register files may use respective mechanisms to control the data write-back and consistency. For example 'dirty'-flags (e.g. see FIG. 9*a* and FIG. 10 dirty token 'd') might be associated with each entry, indicating modified but not yet written back data.

It shall be noted, that theoretically the full address (base and offset) could be checked for selecting a register entry. However, in a preferred embodiment base and offset are treated differently (as described in FIG. 9): While the base address is compared with a reference base, offset is used for directly selecting the register within the FLR. This improves access time and reduces power consumption.

Data is transmitted to the memory hierarchy using the channel 0908 which might be a separated, dedicated address and data bus or be fed through the execution units (e.g. one or a plurality of ALUs and/or the ALU Block).

Figure 9:
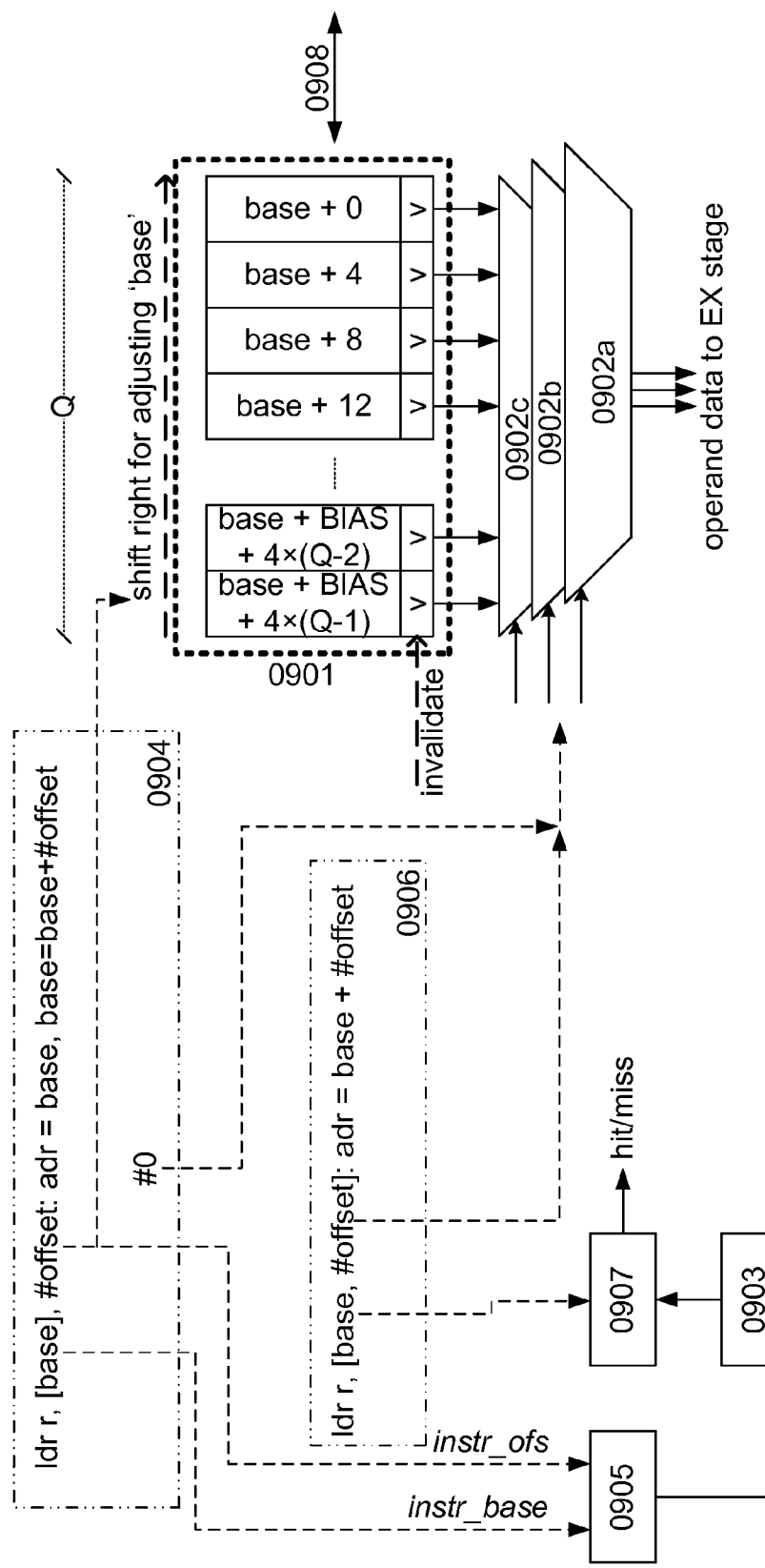
Figure 10A:
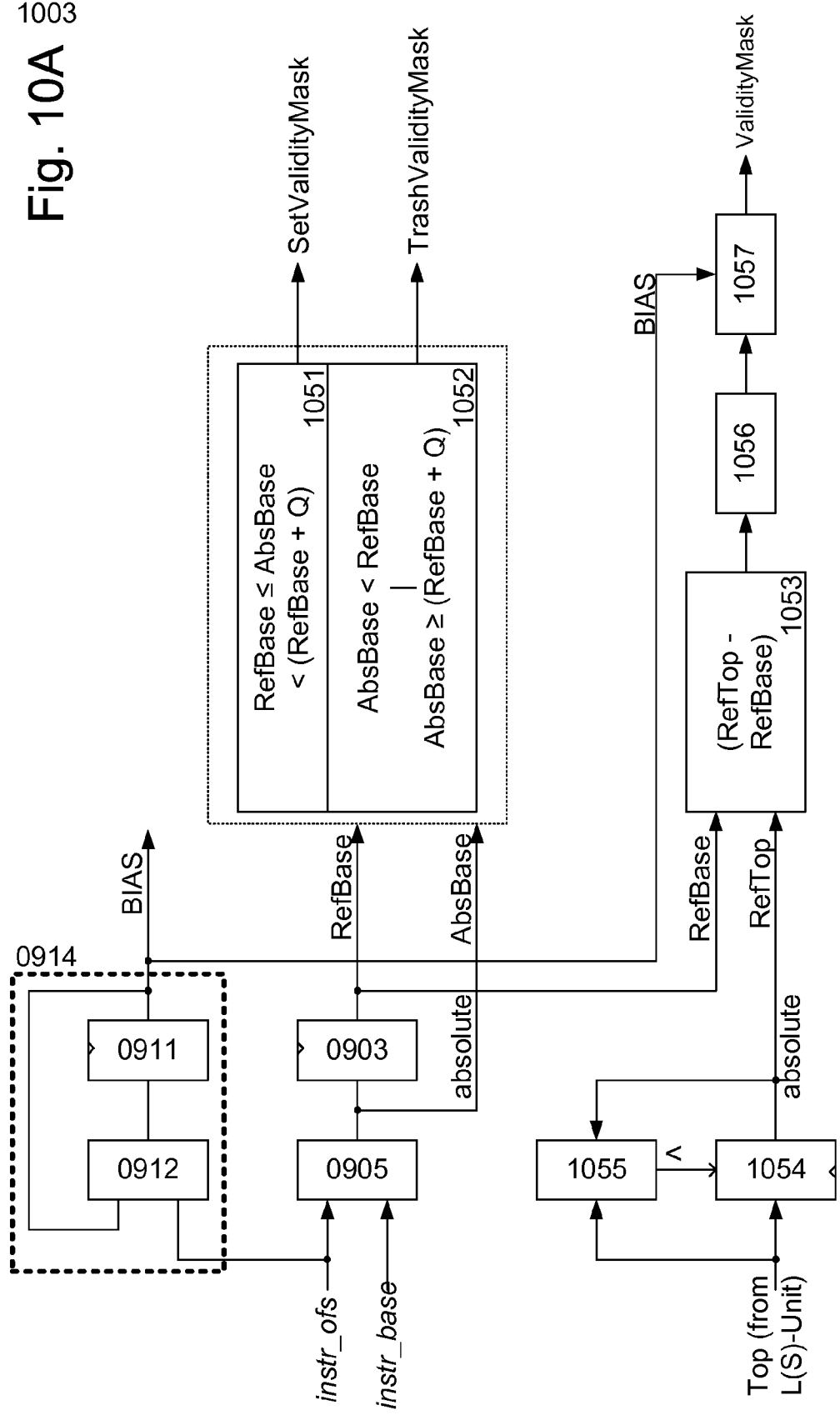
FIG. 10A is a diagrammatic illustration of an example implementation of a BASE control unit of the implementation of FIG. 10.

The embodiment shown in FIG. 9 is one example to explain the functionality of the FLR. In a preferred embodiment data is not actually shifted within the FLR in case of a base change, but the selection of the registers is modified. This greatly reduces the hardware overhead and the power dissipation required for shifting the register content in the FLR. A respective implementation is shown in FIG. 9*a*. BIAS Control Unit (0914) records the modifications of the base address and emits a correction factor (BIAS) for the offset. In this exemplary embodiment an accumulator is used, accumulating all changes of the base address. The accumulator comprises a register (0911) and an adder for adding (0912) the offset of the address change.

The correction factor (BIAS) is than added (0913, 0913') during load (or store) accesses to each of the respective offsets, so that the virtually shifted (by the correction factor (BIAS)) register content is accessed.

The correction factor allows for virtually shifting the register contents without actually performing a shift operation. A bit mask (MASK) is required to set the valid bits of the registers when the content is shifted.

FIG. 10 shows an architectural view of an exemplary embodiment. The FLR (1001) comprises Q register, each register having an associated valid-flag 'v' indicating valid content and a dirty-flag 'd' indicating that the register content has been changed, e.g. by a store or write instruction, but the respective data has not yet been written back to the memory hierarchy (e.g. Level-1 cache). The registers comprise data from the address range base+0 to base+4×(Q−1).

The FLR register's content is fed to one, two, or a plurality of operand input multiplexers (1002), depending on the respective execution stage (EX) and/or ALU architecture, selecting the respective register for read (data load) access. If the processor comprises multiple ALUs (e.g. VLIW, Superscalar, ZZYX, Hyperion) each ALU may have respective operand input multiplexers (1002*a*, 1002*b*, . . . 1002?).

Memory access operations modifying the base address (e.g. initiated by an ARM ldr r,[base], #offset instruction) are processed in a BASE Control Unit (1003), which computes the new base and issues the reference base (RefBase). In one embodiment, the base computation may comprise the adder (0905) register (0903) coupling as described in FIG. 9 and FIG. 9*a*. In some embodiments a BIAS Control Unit may adjust the base according to FIG. 9*a* and issue the respective Bias. In one embodiment, the BIAS Control Unit might be based on an accumulator, e.g. comprising an accumulator register (e.g. 0911) and an adder (e.g. 0912). The BIAS Control Unit might be embedded in or combined with the BASE Control Unit.

In a preferred embodiment only one operation modifying the base address is supported per cycle (e.g. ZZYX Catena, VLIW instruction or Superscalar cycle). The respective instruction control signals (control signals according to the instruction being executed) (1004) are fed to the BASE Control Unit (1003). In embodiments supporting multiple base address modifications per cycle, a plurality of instruction control signals 1004*a* . . . 1004? are fed to an arbiter (1005) which selects one instruction at a time for being performed, so that step by step all pending request are served. The respective execution cycle might be delayed until all instructions have been selected are performed.

In a preferred embodiment a plurality of operations not modifying the base address might be performed within the same cycle (e.g. ZZYX Catena, VLIW instruction or Superscalar cycle). Typically each operation is performed in a respective execution unit (EX), e.g. an ALU, e.g. of an ALU-Block. Depending on the specific embodiment all execution units or only a subset support access to the FLR. The supporting execution units comprise an Access Control Unit (1006), which checks the validity of the base address and computes the selector for the multiplexer (1002). The validity of the base address might be checked using a comparator (e.g. 0907) comparing the reference base (RefBase) with the base address of the current memory access operation. The Selector might be computed using an adder (e.g. 0913) adding the BIAS to the offset of the current memory operation.

In case of a mismatch between RefBase and the base address of the current operation and/or the offset of the current operation exceeding the range of the register file and/or accessing invalid register content a request to a Load-(and, depending on the implementation, Store) Unit (1008) is generated (load request) by the respective Access Control Unit (1006) or BASE Control Unit (1003). An arbiter (1007) selects one request at a time for being performed, so that step by step all pending request are served.

The Load (and Store) Unit (1008) loads the requested content from the memory hierarchy (e.g. Level-1 Cache) (1009). If writing to the FLR is implemented, content marked dirty with the dirty-flag 'd', is written back to the memory hierarchy (e.g. Level-1 Cache), depending on the write back-strategy or when register content is overwritten with other content from another address or shifted out due to changing the base address.

Vicinities

The describe algorithms for optimizing load/store accesses are preferably used to optimize code sections within vicinities. In the following, details about vicinities are provided:

Vicinities are code sections, which are rather frequently executed:

Local vicinities are code sections which are frequently executed within a thread. The most obvious for example Local Vicinity (LV) is an inner loop, and in the second place an outer loop. Another example of a LV is a frequently called subroutine.

Typical for Local Vicinities (LV) is that ideally the original code is replaced with an optimized code in a Trace Cache or rather local instruction memory (e.g. a Level-1 cache).

Global vicinities (GV) are code sections which are frequently executed at system level. The most obvious Global Vicinities (GV) are for example system calls or frequent library calls.

Typical for Global Vicinities (GV) is that usually the original code cannot be replaced with an optimized code in a rather local instruction memory (e.g. a Trace Cache or a Level-1 cache), but within more remote memories, such as a Level-2, or -3 cache, the main memory, or even a mass storage media (e.g. a disk drive)).

Preferably only those load/store accesses are optimized, which are repeatedly read within a vicinity. Pure store accesses, with no related read access, are preferably not optimized.

Managing Constants

Some processors (or instruction set architectures), such as e.g. the ARM (e.g. ARM7) architecture, do not support large and/or random constants directly in the instructions (e.g. mnemonics).

Constants are loaded from memory, typically using load instructions. This approach has at least two problems:

a) Loading a constant repeatedly, e.g. within a loop, adds unnecessary memory load cycles and is therefore wasting processor performance and energy.

b) Depending on the memory model, unnecessary effort, mainly in terms of energy consumption, might be necessary for coherence management.

It is therefore proposed to use special dedicated load-constant instructions (e.g. ldc). Such instructions indicate per se that the loaded value is constant and no instance (e.g. another processor or processor core) may possibly modify the value. On this basis, no coherence measurements are necessary.

In a preferred embodiment, loaded constants are written into a dedicated constant register file, assigned by a register optimizer, as e.g. shown in FIG. 7 and/or FIG. 16. If an once loaded value is accessed again, actually no load instruction is executed. Instead the load instruction is ignored and subsequent access to the value is directed to the dedicated constant register (CR: e.g cr00, cr01, . . . , cr07) and the constant data is actually taken from there.

Experiments showed that this approach of loading data is not only performing with constants, but also ideal for accessing regular variables which do not change by definition during the runtime of a subroutine, e.g. a loop. If it is known that input data to a routine is constant within the scope and/or runtime of the subroutine, the respective data load accesses might be treated as constant loads and accordingly optimized.

For example, a first thread is writing data into memory, a second thread is reading that data and operating on it. It is known per se, that at least the data section the second thread is working on will not change during the runtime of the second thread. Therefore the second thread may load the data as constants and by such significantly increasing the access time.

In one embodiment, a load constant instruction may be implemented operating as a pre-instruction (Load Constant Pre (LCP)). Pre-instructions may provide additional information for subsequent instructions. An exemplary embodiment is described in [3], however we prefer a slightly different implementation: LCP is actually executed as a stand-alone instruction. It is placed at the lower right ALU in the ALU-Block, so that it does not disturb the placement of other instructions in the ALU-Block. LCP is executed and the loaded constant is written into the register file. In a preferred embodiment no dedicated constant register file is used, but the loaded value is stored in the normal register file. A flag is associated with the value and might be stored within the register file indicating that the value is a constant loaded by a pre-instruction. When an ALU of the ALU Block executes a subsequent instruction reading the constant from the register file the constant value will be transferred into a local register within the ALU. During further operation the ALU will derive the constant value from the local register.

This method provides many benefits: Memory access cycles are saved reducing power dissipation and improving the performance. The hardware overhead is minimal, LCP is implemented using the normal load instruction and no additional register file is necessary. Simultaneously the register is freed for other data, once the constant value is transferred into the local register of the ALU. The constant data is kept local, reducing the power dissipation of the operand multiplexers.

Out-Of-Order Processing

This invention is as previously described applicable on In-Order (IO) and Out-Of-Order (OOO) processors. But, in addition to integration into existing processor architectures, the invention enables a novel approach to out-of-order processing.

As shown e.g. in FIG. 10*a*, FIG. 12, FIGS. 14A and 14B, FIG. 15, and FIG. 16 the invention reorders instruction when scheduling (mapping) them onto the array of ALUs (ALU-Block). Registers are renamed or respectively replaced as e.g. shown in FIG. 16.

On this basis, comparably simple and cheap In-Order processors can implement Out-Of-Order processing capabilities, e.g. see FIG. 19d or FIG. 19e.

Operations depending on previous results (those operations which can only be processed sequentially) may be mapped into a column of operations. Other operations not depending on such previous results, may be positioned horizontally; all horizontally placed operations are executed in parallel.

Using the array of ALUs (ALU-Block) various implementations are feasible:

shifted-OOO: According to the algorithm in FIG. 14, dependent instructions are vertically placed, independent instructions horizontally. The instruction scheduler and the instruction execution shifts from top to the bottom of the ALU-Block. Operands are supplied from the register file to the top row and the bottom row returns the processing results to the register file. As disclosed before, dependencies within the ALU-Block are solved within the data network, by replacing the operand source with the ALU coordinates of the producing ALU. After all operations in the ALU-Block have been processed, the results are collected, the ALU-Block is cleared of all operations and the next part of the code is scheduled (placed) onto the ALU-Block. The scheduling (placement) stalls, until all operations are finished and all results are generated. This approach is simple to implement and requires very little hardware overhead, but shows already great speedup compared to In-Order processing.

collapsed-OOO: Instead of spreading the operations over the complete array of ALUs (ALU-Block), only one row of ALUs are used. Similar to Reservation Stations, each ALU has an operation buffer (OPB), buffering the scheduled operations. However, dependencies cannot be replaced via the data network by retrieving the operands directly from the previously producing ALU. This network function may be replace by a time stamp, indicating at which processing cycle the respective result is produced. All results may be buffered in FIFO stages (Result History Buffer (RHB)), including the timestamp when they were produced. When processing an operation, the FIFO is checked for an entry with the required time-stamp and if available the entry is retrieved and processed, else the respective operation stalls. This approach has similarities with OOO processing in the state of the art. Each ALU has a Reservation Station like operation buffer (OPB) supplying the operations. But, the operations in the buffer (OPB) are processed in order. Independent operations are dedicatedly scheduled to other operation buffers (OPB), e.g. according to the algorithm shown in FIG. 14. In other words, the horizontal scheduling is as described in FIG. 14 mapped to a plurality of ALUs in the row, while the vertical scheduling is collapsed into the operation buffers (OPB) for each of the ALUs.

Each register of the register file has an associated FIFO structure (Result History Buffer (RHB)) for storing the history of produced results, together with the timestamp. The scheduler produces and keeps track of the timestamp such that each processed result gets a timestamp associated, which is equal or similar to the vertical and preferably also horizontal address of the operation (if it had been placed onto the array of ALUs (ALU-Block)). The method of FIG. 16 can be adapted to handling timestamps, mainly by storing the timestamp instead of the ALU address in the table (1604). If the timestamp stored as a reference in the RHB meets the timestamp required for the operand for processing in an ALU, the associated data is transferred from the RHB to the respective ALU for processing. If no data with the required timestamp is available yet, processing in the respective ALU stalls.

The RHB can be understood as some replacement for the ROB known in the prior art.

This approach is more complicated to implement and requires some more hardware overhead than the shifted-OOO implementation. But, depending on e.g. the silicon process, final system or product it may require lesser power. As the shifted implementation it shows already great speedup compared to In-Order processing.

cyclic-OOO: In one embodiment, the instruction scheduler and the instruction execution place instructions from top to the bottom of the ALU-Block. Operands are supplied from the register file to the top row of a first placement cycle. In each subsequent cycle, operands may be received directly from previous processing results or, if none are available, from the respective register of the register file. If processing is terminated, e.g. finished or a context switch occurs, the bottom row returns the processing results to the register file. As disclosed before, dependencies within the ALU-Block are solved within the data network, by replacing the operand source with the ALU coordinates of the producing ALU. In difference to the shifted-OOO implementation, data is also transferred over time from one placement cycle to the next. Or, in other words, the buses of the last row are fed back to the first row, so that in a subsequent cycle the results of the last row are accessible as well. This is a major change in the ALU-Block architecture, as operands cannot only be received from ALUs above, but also from ALUs below. However, data from ALUs below originates from a previous processing (i.e. placement) cycle. If all ALUs are stalled and no more new instructions can be placed on free ALUs, scheduling (placement) stalls, until operations are finished and ALUs are available for new instruction processing again.

If, during a placement cycle an ALU operation is not executed, the ALU stalls. However, in the subsequent placement cycle (after the scheduler restarted at the top of the ALU array (ALU-Block)) the stalled ALU keeps its function and is spared when placing new instructions, until the stalled ALU is capable of executing its instruction.

Any ALU requiring that very result as an operand, remains connected to the stalled ALU, and will stall too.

To avoid deadlocks, preferably all instructions are issued in strict program order. This requires modification of the algorithm of FIG. 14:

Each ALU provides its state (e.g. unused, finished, stalled) to the scheduler. In one embodiment, priority decoders may be used such that for each row and for each column the next available ALU is referenced to by the decoder. A respective algorithm is exemplary described in FIGS. 21 (21a and 21b).

FIG. 19f shows an exemplary implementation of the inventive Out-Of-Order processing (OOO) on the basis of a simple In-Order Architecture Instructions are fetched (IF) and decoded (ID) and forwarded into a CAQ (which might be a Trace Cache, or in the most preferred embodiment an advanced Trace Cache). A scheduler (SCHED) takes decoded instructions from the CAQ and places them into ALUs of the ALU-Block for execution. The scheduler may alter the instructions stored in the CAQ for optimization purposes. Alternatively and/or additionally an Analyser and Optimized (AOS) may alter the instructions stored in the CAQ for optimization purposes.

ALU-Block Adapted to Out-of-Order Processing (OOO)

Figure 22:
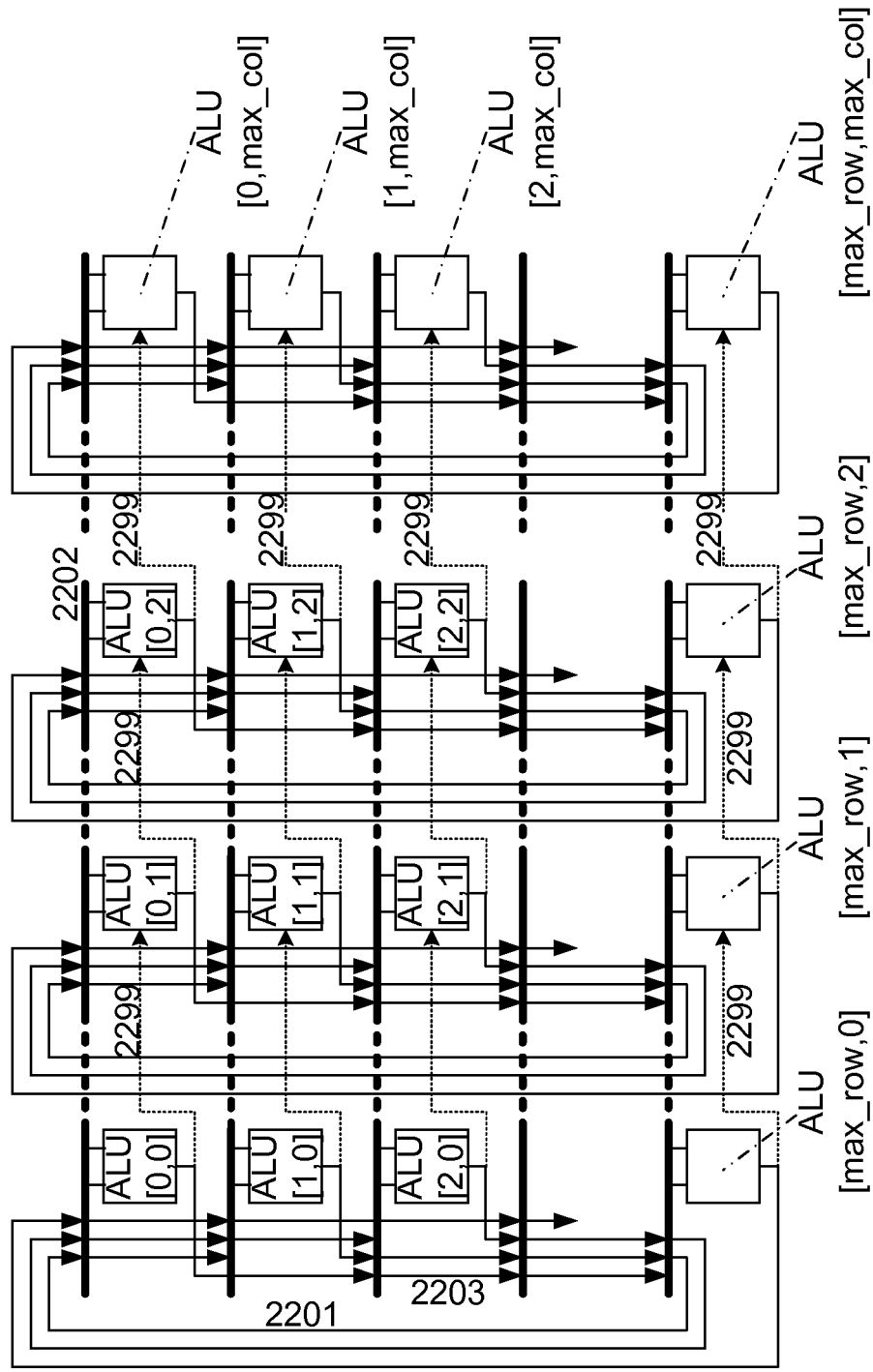
FIG. 22 is a diagrammatic illustration of an example ALU-block structure having features for out-of-order processing.

The ALU-Block as e.g. known from [3] may be optimized for Out-Of-Order processing (OOO). Some modifications are shown in FIG. 22.

The ALUs are arranged in a matrix, having max_col+1 columns (0 . . . max_col) and max_row+1 rows (0 . . . max_row).

Each ALU produces a status, which may be checked by the scheduler placing the instruction onto the array of ALUs (ALU-Block). The status provides information indicating the operational status of an ALU, e.g. such as stalled (waiting for operand data), busy (processing), free (no instruction placed), done (processing completed).

The ALU-Block according to [3] transfers data preferably from top to bottom of the ALU-Block. The top ALUs are preferably connected to the register file only, but not ALUs below. However, the preferred structure for OOO processing, particular cyclic-OOO, limited feeds back data from the bottom to the top. Still, the preferred dataflow direction is ensured, data is not transferred from bottom to top (bottom up) in the ALU-Block. From the bottom ALU row a connection is made to the top ALU row, so that the data buses form a ring. However, the ring is cut open at exactly the ALU supplying the data output to the bus, i.e. the ALU driving the bus.

The rings are exemplary shown in FIG. 22. E.g. bus 2201 is the output of ALU[1,0], being provided as an operand input to ALU[2,0], . . . , ALU[max_row,0], ALU[0,0]. The bus does not supply ALU[1,0] with operands. (While, in one embodiment, the ALU[1,0] may have access to its own results via the bus).

The wide buses (e.g. 2202) indicate the horizontal multiplexer structure: Each operand input of each ALU receives all buses available at a level and may selectively feed one bus per operand input to a respective ALU. Reference is made to the multiplexer structure of [3], see e.g. [3] FIG. 4 0402, FIGS. 27 and 27a.

The data transmission on the buses is pipelined, and balanced with the latency of the ALUs. E.g. if ALU[2,0] operates with 1 clock cycle latency, the respective bus connection (2203) of bus 2201 has one pipeline register stage generating 1 clock cycle latency.

According to the interconnection structure of FIG. 22, each ALU has access to the register file (RF), all ALUs above and all ALUs with the following timing:

Operand inputs from other ALUs of the ALU-Block to ALU[n,m] at time t (@ t):

| Output of ALUs of row | from time | Note: |
|---|---|---|
| [n − 1] | t − 1 | if n − 1 ≥ 0 |
| [n − 2] | t − 2 | if n − 2 ≥ 0 |
| [n − 3] | t − 3 | if n − 3 ≥ 0 |
| ... | ... | ... |
| [n + 1] | t − (max_row) | if n + 1 ≤ max_row |
| [n + 2] | t − (max_row-1) | if n + 2 ≤ max_row |
| [n + 3] | t − (max_row-2) | if n + 3 ≤ max_row |
| ... | ... | ... |

In one advanced embodiments, ALUs may receive data from other ALUs in the same row. This enables a more efficient usage of the ALU matrix, particularly for very sequential code blocks in which results of ALUs are immediately used as operands in the directly subsequent ALUs. The exemplary shown code section below is part of a string compare function for ARM processors and implements such behaviour via the r3 register:

| 8108: | e28234ff | add | r3, r2, #−16777216 | ; 0xff000000 |
|---|---|---|---|---|
| 810c: | e2433801 | sub | r3, r3, #65536 | ; 0x10000 |
| 8110: | e2433c01 | sub | r3, r3, #256 | ; 0x100 |
| 8114: | e2433001 | sub | r3, r3, #1 | ; 0x1 |

-continued

| 8118: | e3c3347f | bic | r3, r3, #2130706432 | ; 0x7f000000 |
|---|---|---|---|---|
| 811c: | e3c3387f | bic | r3, r3, #8323072 | ; 0x7f0000 |
| 8120: | e3c33c7f | bic | r3, r3, #32512 | ; 0x7f00 |
| 8124: | e3c3307f | bic | r3, r3, #127 | ; 0x7f |
| 8128: | e1d32002 | bics | r2, r3, r2 | |
| 812c: | 0a000002 | beq | 813c <strcmp+0x54> | |

In one such embodiment, an ALU in a row may receive the results of all other ALUs or all left-hand ALUs as operands. However, such an implementation increases the hardware complexity unnecessarily. Therefore it is preferred if ALUs in a row can (only) receive the results of the one neighbouring ALU to the left as operands, as indicated by 2299.

In some (albeit not preferred) embodiments, 2299 may form a ring by connecting ALU[n,max_col] to ALU[n,0], e.g. ALU[1,max_col] to ALU[1,0]. The result of the most right ALU can be used as operand in the most left ALU. However, in typical embodiments this is not preferred, as may become too complex to decide when the data processing in a row has been terminated and new instructions can be issued to the row (e.g. in loop acceleration mode).

In some (albeit not preferred) embodiments the horizontal connection (e.g. 2299) may not only support data transmission from left to right ALUs but additional horizontal connections may be implemented for supporting data transmission from right to left ALUs.

FIG. 22a shows the placement sequence of instructions depending on the position of the lowest ALU (the ALU closest to the bottom of the ALU-Block) providing an input operand for the instruction to be placed. Preferably the placer positions an instruction as close to the lowest ALU providing an input operand in order of the data stream through the interconnect structure. The first preferred position is in the row directly below, then the second row directly below, and so on; until the lowest row (max_row) is reached and the placement order wraps around and continues with the first row from the top, the second row from the top, and so on, until the row of the lowest ALU providing an input operand is reached.

Scheduler

Figure 21A:
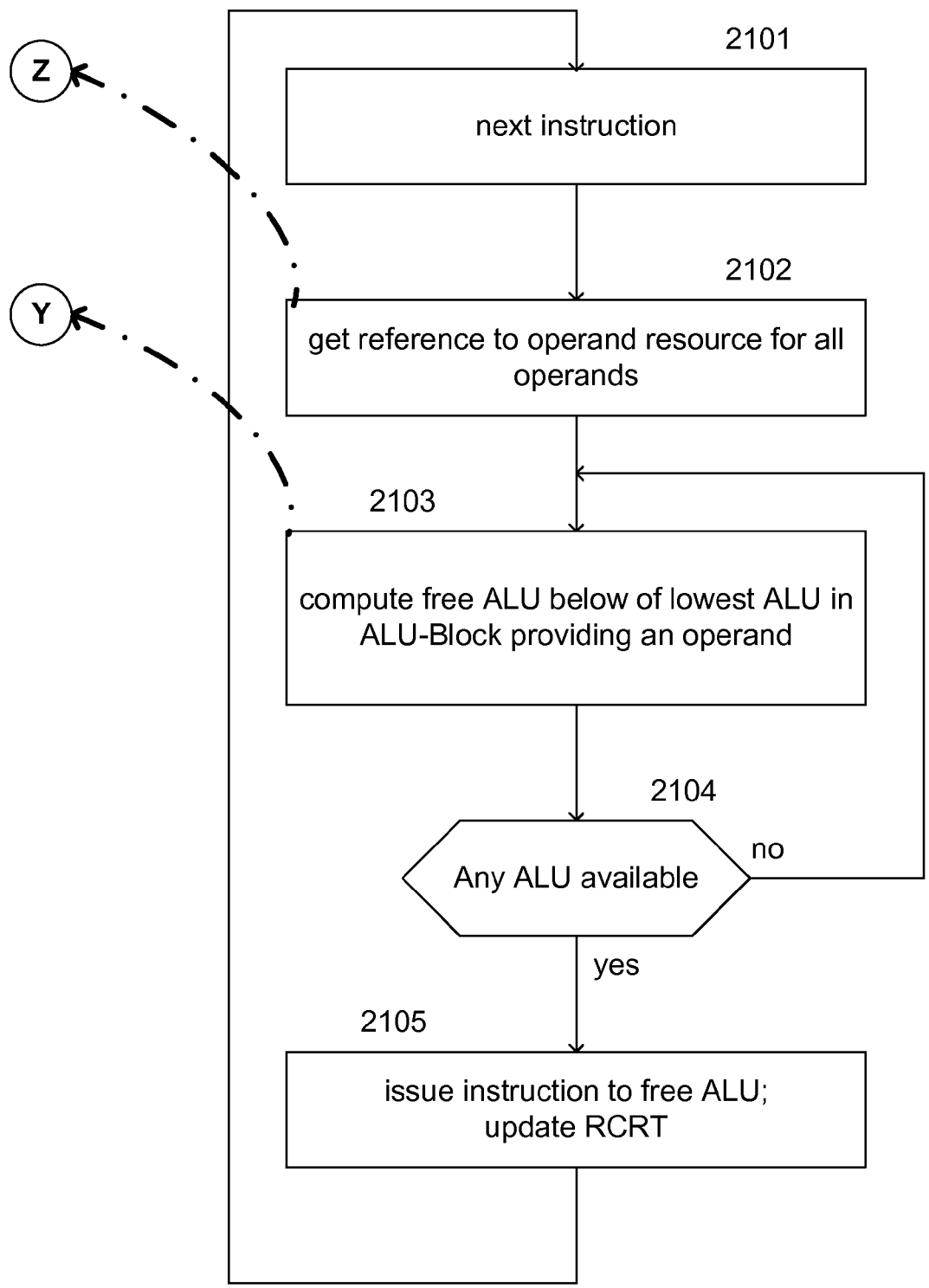
FIGS. 21A and 21B are diagrammatic illustrations of example implementations of a scheduler placing instructions from a Code Analysis Queue (CAQ) into ALUs.
Figure 21B:
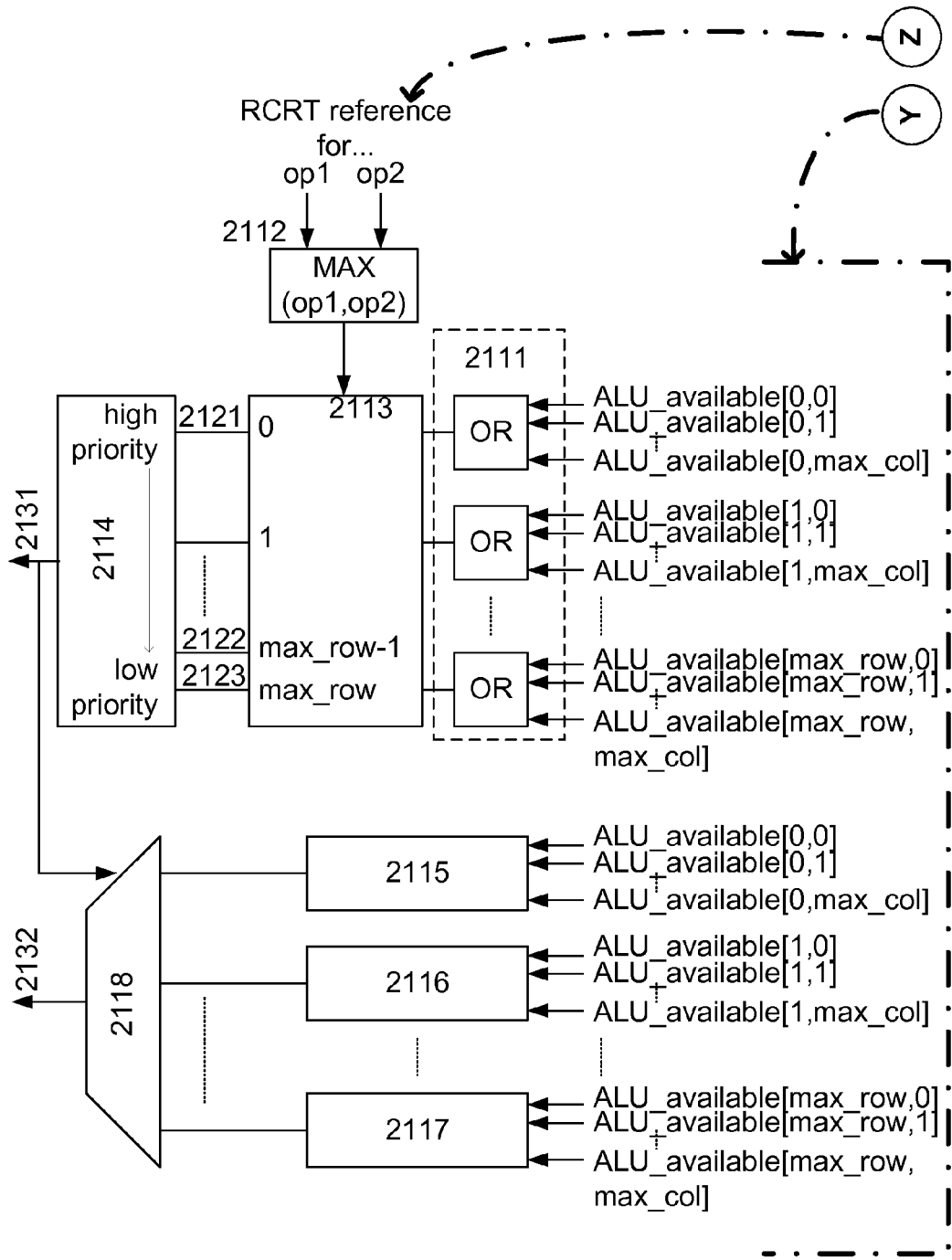

FIG. 21a and FIG. 21b describe a scheduler placing the instructions from the CAQ into ALUs of the ALU-Block in order of the instructions in the CAQ. This scheduler may replace and be used instead of the COA algorithm described in FIG. 14.

In each clock cycle one or a plurality of decoded instructions (also called instructions) are read from the CAQ for being issued to (placed in) ALUs of the ALU-Block for execution.

The exemplary scheduler according to FIG. 21a gets an instruction (2101). The RCRT is read for each operand (2102) to determine the position of the operand source (ALU or register supplying the operand), so that the instruction can be placed in optimal position and distance to the source(s). Positioning the instruction close to the source(s) avoids data transfer latencies. As described above, preferably instructions are placed directly in the next row below the source(s), or if this is not possible (e.g. the source is placed at row max_row), in the top row.

Based on the position of the source(s) the closest free ALU is determined (2103).

If an ALU is available for receiving a new instruction (2104), it is sent to that ALU (2105), else checking for available ALUs (2103) continues.

The algorithm for computing the closest free ALU (2103) is described in FIG. 21b. It is preferably implemented in hardware.

For each row the availability of an ALU is determined, e.g. by logical OR-ing (2111) the status signals of each ALU of a row indicating the readiness for receiving new instructions.

The lowest operand source, which means the operand source closest to the bottom (max_row) of the ALU-Block is determined (2112) based on the operand source reference from the RCRT.

A barrel shifter (2113), which receives the row number of the lowest operand source, adjusts the row status produced by 2111, such that the row status of the row directly in the next row below the lowest source(s) is shifted into the first position (2121) and the row directly above the lowest source is shifted linearly into the last position (max_row−1) (2122). The row status of the lowest source, which is actually the last output (max_row) of the barrel shifter is usually neglected (2123).

A priority decoder (2114) selects the first available row, whereas the next row below the lowest source(s) being shifted into the first position (2121) has the highest priority and the row directly above the lowest source being shifted linearly into the last position (max_row−1) (2122) has the lowest priority.

For each row the position of an available ALU (an ALU being ready to receive a new instruction for execution) is determined, based on the respective status signal of each ALU. Preferably priority decoders are used, one for each row (2115, 2116, 2117). The horizontal position of a free ALU (if any) for each row is transmitted to a multiplexer (2118), which selects based on the row (vertical ALU position) selected by the priority decoder (2114) the respective horizontal ALU position.

The computed vertical (2131) and horizontal (2132) position point to the free ALU (being ready for receiving a new instruction for execution) being selected for instruction issue.

Code Fission

While instruction set of RISC processors is usually adapted to single cycle operations, which directly fit the requirements of modern processor cores, CISC processors have rather complex instructions set. One approach to solve this issue are microcodes or μOps as e.g. used in Intel IA processors. For details see e.g. [4].

A complex instruction is decoded into a sequence of simple microcodes. Typically the sequence is handled atomically as a whole inside the processor. Modern processors even fuse microcodes together, for reducing the management overhead. (See e.g. [4] chapter 58).

The approach of the prior art has not much negative impact on store operations on traditional processors, but when processing loops as previously described, it is preferred in the inventive technology to move store operations to the end of the loop code.

For load operations, the prior art approach is rather improper, even for traditional processors of the prior art. It saddles the burden of the latency for reading data from memory to the very data processing operation requiring the data. If the data load operation would split from the data processing operation and start earlier, the negative impact of the latency could be reduced or even avoided.

It is regarded beneficial to split memory operations, particularly load operations from data processing operations.

Load operations are moved upwards in the code sequence, such that they are executed as soon as any possible, which is as soon as all necessary operands (address data) is available.

Data store operations may stay close to or fused with the respective data processing operations, or moved down in the code sequence if beneficial.

It shall be expressively noted that the code fission is regarded highly beneficial even for processors of the prior art.

Moving the memory operations may be done at decoder stage already, or preferably in the CAQ (which might be a TC), e.g. by AOS. More traditional processor architectures do the optimizations preferably in the Trace Cache (TC).

The inventive approach is not limited to code fission and/or memory operations. Also other code (e.g. such as loop control) might be optimized accordingly (e.g. to have the loop termination condition determined earlier in the loop).

As memory load operations and loop control operations are (at least within the scope of this patent) more important, the following description is focusing on moving the respective instructions up in the code sequence (e.g. bubbling up). However, obvious for one skilled in the art the same or similar approaches are applicable on other type of operations (e.g. store operations which may move down in the code sequence).

Two exemplary optimization strategies are described:
1. Bubbling Up

Reference is made to FIG. 23. FIG. 23a shows an exemplary code snippet. A pseudo microcode is used, in which the original instructions are still used, but load and store operations are separated, indicated by the UPPER case mnemonics.

A first bubbling step is shown in FIG. 23b:

Each of the LOAD operations is moved one line up in the code sequence. While doing so, it is checked if any of the required operands are just generated in the upper target line. If so, the operation cannot be moved further up and has to remain on the current line. This is true for the LOAD operation moving from position M1 to R2. However, simple analysis of the mov instruction at R2 provides ebx as a new source for eax. In one advanced embodiment the LOAD operation may therefore move further up, while replacing eax with ebx (underlined in FIG. 23b).

For optimizing loop control the compare instruction cmp is detached from the conditional jump jne. While doing so, the instructions are translated into other microcodes, which store the flag generated by CMP in a flag register flgr, which is then used by JNE as flag input.

FIG. 23c shows the next bubble step, in which the respective operations are moved one more line up, in the same manner as described in FIG. 23b.

As the conditional jump JNE jumps back to the address .L6, it is not possible to move the LOAD operation(s) at the top (R1) further up. Here the bubbling ends. In one embodiment, all LOAD operations may bubble up until they are lined up just below R1, in other embodiments sufficient parallelism is implemented to move all (or at least a plurality of) LOAD operations up to R1 and execute them in parallel.

It shall also be noted, that jump targets (vector addresses) are a problem to be managed by the bubbling algorithm. In the example of FIG. 23b and FIG. 23c the vector address at .L3 is ignored, at this is only used to jump into the loop at the very beginning. It is assumed, that the bubbling is done dynamically during loop execution and in each loop run, the respective operations are moved up.

This way all jumps from the outside into the loop may be ignored. Only loop internal jumps have to be maintained (e.g. .L6). However, it must be ensured that the modified code does not outlast the loop execution. If the loop is executed for the next time it will start at the vector address .L3 again, which would not work if the LOAD operations are moved up above this point.

It may be ensured that the original code is reloaded again before the next execution. For example could a TC plus CAQ structure be implemented, in which the TC caches the original code sequence and the optimizations only performed inside the CAQ, which receives the code from the TC. While processing a loop the code is derived from and optimized within the CAQ. When the loop is started for the next time, the code will be loaded from the TC again.

A stricter implementation of the algorithm is shown in FIG. 23d. It shows the code at the same time as FIG. 23c. In this implementation all jump targets (vector addresses) are complied with. Therefore the LOAD operations are not moved up beyond the vector address of .L3. In the exemplary shown embodiment sufficient parallelism is implemented to move a plurality of LOAD operations up to M1 and execute them in parallel.

2. Attaching to Latest/Lowest Source

In FIG. 24 the latest source of the operands within the instruction sequence is checked for fission and optimizing the load operations. The LOADs depend on the register eax, ecx and edx. Analysis of the RCRT shows, that the registers eax and ecx are supplied by the instructions R1 and R2, edx is supplied even higher in the instruction sequence. Therefore the LOADs could be placed directly below R2 as shown in FIG. 24a.

The loop control is also respectively pulled up, just below the sources of the operands. It shall be noted, that only checking the operands may not be sufficient in many cases for ensuring the correctness of an instruction move to another positions. It may also be necessary to ensure that the result(s) of the operation(s) do(es) not impair other operations. For example could a moved operation produce a result for register ebx and destroy its original content at the new location. Original instructions subsequently accessing ebx will get the wrong data.

In case of FIG. 24a loop control (2401) actually modifies ebx. While this does no harm as M1 rewrites ebx anyhow, it must also be ensured that at the original position of the loop control ebx is correctly set. This is achieved by allosating another register from the ERF (erf0) for loop control and moving erf0 to ebx (mov ebx, erf0 (2402)) at the original location of the loop control. It shall be noted, that ideally loop control is replaced according to FIG. 23e.

In an advanced implementation, simple move operations might be recognized and the source registers are adapted in accordance with the move operation. This is shown in FIG. 24b, where the eax source registers were replaced by the ebx register after moving the operations in front of mov eax, ebx (R2).

It shall also be noted, that the optimization in FIG. 24b pulled the instructions up beyond the jump target (vector address) .L3. The respective effects have been discussed in FIG. 23 already.

A save policy may not allow to move code beyond vector addresses, so that FIG. 24a would be the save representation.

FIG. 25 shows a load/store optimization as previously described. The memory location [ebp-16] is apparently a pseudo-register holding ecx, which stores the loop exit criterion. Having a larger register set, ecx may be moved to the ERF. In the examples of FIG. 23 and FIG. 24, ecx is moved to erf5. The compare operation (CMP) of the loop control (e.g. 2402) has been optimized to access erf5 instead of the costly memory LOAD operation. However, as it is almost impossible to ensure that no other location in the code or even another thread is accessing the memory location [ebp-16], the STORE operation (LTV) is preferably kept in place and the respective move (MOV erf5, ecx) is just added to the code.

Instruction Fusion/Instruction Morphing

Known from microprocessors is the fusion of decoded instructions, so called microcodes, into fused microcodes. Reference is made to [4] chapter 58, e.g. section "µop Fusion". However, this invention follows a different approach.

ZZYX processors preferably move loop control, if possible, into hardware units (e.g. TCC, reference is made to [3]). The respective control code is removed and the conditional jump instruction is replaced by another jump instruction controlling the TCC, e.g. by triggering an increment step with each executed jump and in return receiving status information from the TCC controlling the conditional execution (if the jump is made or not). In this case the original loop control code and the conditional jump code is morphed into a new instruction (e.g. JTCC 5: Jump controlled by TCC number 5).

In other implementations or if the binary source code is too complicated to be off-loaded to a TCC, the instructions may be merged into one complex instruction representing all the functionality. In FIG. 23e the control code is fused (2399) into a single microcode having the source data (eax), the increment settings (+1), the termination condition ([ebp-16] respectively erf5) and the branch target (.L6) as inputs; and the target ebx as output. Such complex microcode may drive a TCC like hardware unit (see e.g. FIG. 10b) but provide more program control than rather autonomous TCC units. The fused representation allows faster execution and requires less resources, in both the CAQ (and/or TC) and the Execution Units (EX). Also the off-loading to TCC (or the like) may allow for automatic loop analysis preventing overshooting (see also section Loop Control). In difference to the prior art not a plurality of microcodes (typically derived from one single instruction) are fused into one representation, but a plurality of instructions are fused into one single microcode.

The respectively fused microcode might be used in all examples of FIG. 23 and FIG. 24.

Subsequently other methods of instruction fusing are described, e.g. fusing a conditional and non-conditional jump instruction into one microcode for more efficient branch prediction.

Write-Back to Register File and Data Network

To preserve the correct order of the processed results, timestamps (TS, also called tokens) are attached to data. The TS is unique, at least within a time or code range wide enough to prevent collisions.

The time-stamp (TS) for each register is managed by the RCRT register, e.g. according to FIG. 16. In addition to the current source (src) of the register content, also the latest time-stamp (ts) is stored in the RCRT. With each new register value being produced by the execution, a new time-stamp is issued and stored in the RCRT. An exemplary time-stamp sequence is shown in 1604: The time-stamp information of register EBX for example starts with TS=1 when the register value is produced by A[0,2], then the time-stamp increments to TS=2 when the register value is produced by A[1,1]. TS increments to TS=3 for A[1,2] and is ultimately TS=4, when the register value is a result of the data processing of A[1,3]. The timestamp for each register is separated; each register requires its linear sequence of time-stamp information to enable sorting the register values in the correct order. Accordingly the time-stamp of ESI changes in this example.

Preferably the scheduler issuing (i.e. placing) instructions on the ALUs in the ALU-Block checks the result's target of the respective operation and manages the generation of the time-stamp accordingly.

Result data in the ALU Block are transferred to the Register File (RF) and/or subsequent ALUs within the ALU-Block together with the attached time-stamp (TS).

Transferring Results to Register File (RF) (I)

In accordance with the principles of Out-Of-Order processing, results should be written into the RF in strict program order.

In one embodiment, a FIFO-like buffer called Result-Sorting-Buffer (RSB) is implemented between the ALU-Block and the register file, buffering the result data together with the associated time-stamps. On basis of the time-stamps data is then selected for transmission to the register file (RF), such that the linear order of the time-stamps is maintained. Note that previously the time-stamps were generated in linear order according to the strict program order of the occurrence of the respective register transfers.

The buffer may delay the availability of data in the register file and by that also delay the execution of operations depending on the data. One solution could be to allow read access to the RSB, as it is e.g. implemented in ReOrder Buffers (ROB) of the state-of-the-art. However this increases the hardware complexity significantly.

Preferably this issue is solved by the data network in between the ALUs within the ALU Block. According to this invention, result data is transmitted from the generating ALU to the ALU requiring the data as an operand via the ALU-Block internal bus system (see e.g. FIG. 22). Therefore current operations do not depend on the availability of the data in the register file (RF), avoiding the issue. It shall be mentioned, that no hazard is generated if data is not available in the register file for an operation at time. All operations check the time-stamps of the ALU contents prior to execution, which is delayed if necessary until data with the matching time-stamp is available.

Data Network

Within the data network transmissions are preferably synchronized by a handshake protocol.

Two types of transmission might be implemented:
1. Pulsed: Data is available for one clock cycle after generation or after reception in a pipeline stage. Any receive must register the data during that single clock cycle. 2. Steady: Data is available for a plurality of clock cycles after generation, until the next data word is generated, replacing the data. Usually this protocol causes a problem, as it might be unclear to which operations the data is related to (e.g. the same data could trigger a plurality of operations, while only one operation should be processed). The timestamps according to this invention allow a clear identification of the data and prevent erroneous duplicated execution. The time-stamps are transmitted together with the data within the data network. The data network sorts the result data into correct order:

In one embodiment (exemplary shown in FIG. 1) each network node (FIG. 1a) has multiple result inputs. 5 inputs are exemplary shown (0101, 0102, 0103, 0104, 0105), typically a node has not less than 2 inputs, but can have many more (e.g. 32, 64, 128, ... ).

A comparator unit, which may comprise a plurality of comparators (0111, 0112, 0113, 0114, 0115) compares the time-stamp of each of the result data inputs with a reference value. The reference value might be i) exactly the next time-stamp required/expected for the respective register which might be received from the register or RCRT directly; or ii) generated by a local counter linearly counting up the time-stamp values; or iii) a register simply storing currently selected time-stamps, being used as a threshold. Depending on the type of reference, the comparators may compare for equality, larger or less. In the most preferred embodiment (i), the comparators check for the time-stamp being equal to the next value required.

The comparator outputs drive the selection of the result data using a multiplexer (0121) for transmission through the node to a receiver (0123), which might be a subsequent node or a target register of the register file (RF). Depending on the implementation of the multiplexer, the comparator outputs may directly drive the multiplexer's select input or are e.g. binary encoded via a decoder (0122) (e.g. a decimal to binary decoder or a priority decoder). A hit signal (0124) may be generated, e.g. by the decoder, indicating that one of the comparators detected a condition to select a result for transmission though the node.

Figure 1B:
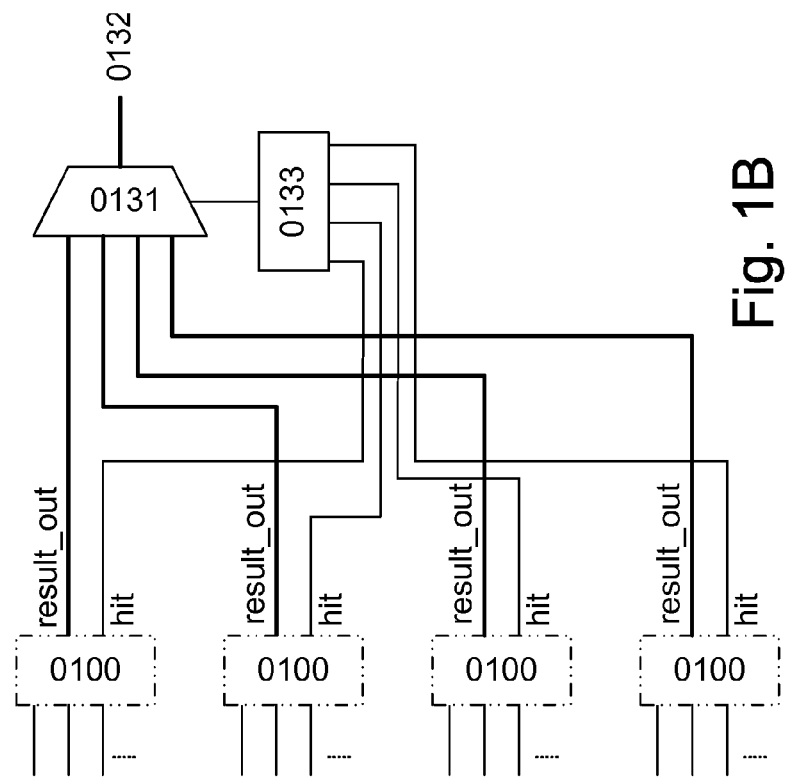
FIG. 1B is a diagrammatic illustration of an example cascade of four of the network nodes shown in FIG. 1A.

FIG. 1b shows an exemplary cascade of 4 network nodes (0100) according to FIG. 1a. The outputs of the nodes are fed to a multiplexer (0131), which selects on of the results for transmission to the receiver (0132) (e.g. the target register of the register file (RF)). In one embodiment, the time-stamps might be checked in accordance to FIG. 1a. However, in the preferred embodiment, the hit signal (0124) of each of the nodes (0100) is used to drive the selector input of the multiplexer (0131). As described in FIG. 1a, depending on the implementation of the multiplexer, the hit signals may drive the multiplexer's selector input directly or a decoder (0133) might be used.

Figure 2:
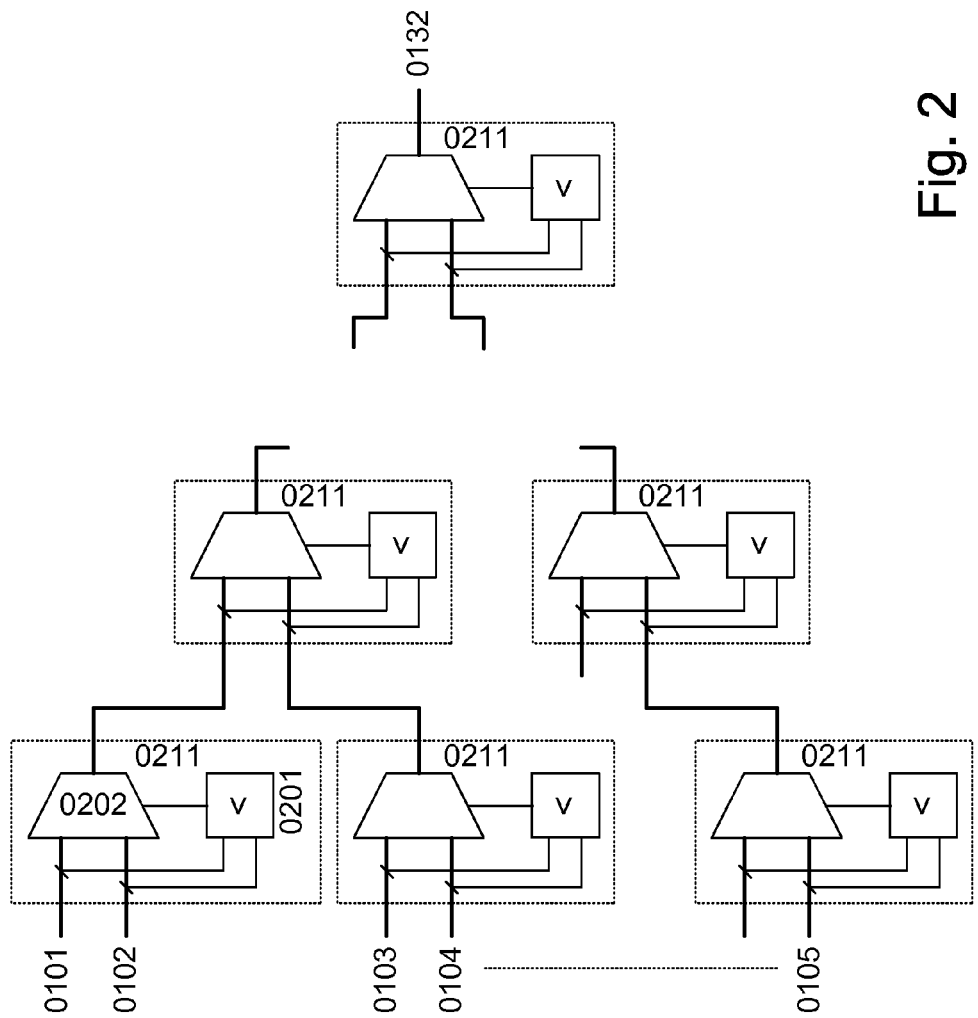
FIG. 2 is a diagrammatic illustration of an example implementation of a bus structure for a data network.

Another embodiment of the bus structure is shown in FIG. 2: The lowest (oldest) time-stamp (according to FIG. 16b) is selected for each result data incoming at a node. In FIG. 2, the selection is done per pair. Obviously other granularities might be chosen. For example in a selector element (0211) the lower time-stamp of the incoming result data is selected by a comparator (0201), which drives the multiplexer (0202) for transmitting the respective result data.

The elements 0211 can be cascaded to form the same network structure as e.g. FIG. 1. Respectively the result data inputs (0101, 0102, 0103, 0104, 0105) and the result data output (0132) use the same references.

In some embodiments, the network may comprise registers or FIFO stages, buffering the data. The benefit is two-fold: i) higher frequencies might be achievable as the network operates pipelined and ii) the data is buffered in the network, eliminating the limitation that an ALU must remain in its state until the data is written into the register file, such blocking the issue of a new instruction.

The respective embodiments are versions of the implementations described in FIG. 1 and FIG. 2, e.g. construed by simply adding registers or FIFOs at the inputs and/or outputs of each stage (e.g. 0100 or 0211) of the inventive network or merging the inventive network with the Result Reordering Buffer previously described. Respective implementations are obvious for one skilled in the art and superfluous to describe.

Synchronization: Issue Level, Network Level

It is necessary to synchronize the data transmission and write into the register file with the issue of new instructions to the ALU. For example it must be prevented to overwrite an ALU operation with a new instruction as long as the respective result has not been written back to the register file. Alternatively results might be stored in the network, e.g. using registers or FIFOs to buffer the data.

In one embodiment, synchronization might be implemented using a handshake protocol in the network for removing data in the network (or ALU) which has been written to the register file (RF) and/or indicating that an ALU can receive a new instruction.

In another embodiment, the scheduler checks if the result data of an ALU has been written to the register file (RF) before placing a new instruction onto the ALU. This can be done by comparing the time-stamp for the result originally issued to the ALU with the register's current time-stamp in the register file. If the ALU's issued result time-stamp is greater than the time-stamp of the result's target register in the register file, the ALU cannot receive a new instruction; else a new instruction can be placed onto the ALU.

Effect of Data Network on Register File

As the sorting of the result data might be done in the data network already, it is not strictly necessary to implement an additional Result Sorting Buffer (RSB).

Scheduling

One problem for scheduling the placement of instruction onto the ALU Block is that a result generated by a first operation required as an operand for a second operation has been generated several clock cycles prior to the placement of the second operation. In this case, the second operation might miss the required data even if it is correctly placed below the source ALU.

Various methods for avoiding the problem exist, two preferred ones (SCD1 and SCD2) are subsequently described:

SCD1: In a first embodiment the instruction scheduler (see e.g. FIG. 14, and/or FIG. 21) not only checks the position of the source ALU, but also the position of result data transferred between the ALUs in the ALU-Block. The data positions are checked based on the attached time-stamps (TS). If an operation required a specific data word as operand, the scheduling algorithm ensures, that the respective instruction is placed into an ALU at a position so that the data with the according time-stamp is accessible at the time of or after placement, depending on when the operand data is transmitted to the ALU inputs or stored in the operand registers of the ALU.

Result data might be outputted by the respective ALU pulsed (for one clock cycle only) or stable (for a plurality of clock cycles, until a new instruction is issued to the ALU).

SCD2: In a second embodiment, the result output of the ALUs must be stable, so that any instruction being issued at any later point in time is able to get the result information in accordance with the network structure (e.g. FIG. 22).

In this variant, the scheduler can issue instructions only to such ALUs which have terminated their operation already and their result is written into the register file already. As long as the ALU's result output might be referenced by a newly placed instruction as a source, the source ALU must remain unmodified (i.e. keep the current instruction) in the ALU-Block. Typically this is no issue for Out-Of-Order processing as the scheduler places the instructions from top to bottom of the ALU-Block and rolls over to the top again after the bottom has been reached. This rolling instruction issue provides adequate time to either receive the result data by subsequent instructions requiring the result as an operand or write the results into the target register of the register file.

ALUs having instructions scheduled which require results produced by prior ALUs in the ALU Block as operands, preferably store the respective result data immediately after it is available in the operand register. This enables the source ALU producing the result data to be replaced.

In some environments the best results are achieved by combining said first and second embodiments.

Time-Stamps

The time-stamps (TS) must be unique within the context of each register or Catena; this means the same time-stamps (e.g. a TS=4) can be used for multiple registers in parallel (as the register address identifies the context of each TS), but for a single register (or Catenae) the time-stamp must be unique for identifying its sequence of data. Yet, the timestamp information may get arbitrarily large.

As the uniqueness is only required within a vicinity of time, a certain locality can be used for shortening the TS width. On this basis a circular TS system can be established, which number range (i.e. width) is limited. Using the at least two most significant bits (MSB) of the TS a circle is formed by the following sequence of the 2 MSB called circular pattern (cp): 00<01<10<11<00<01 .... Thus a TS may have the following format:

| TS = | |
| --- | --- |
| Circular pattern (cp) | Sequence information (si) |
| 2 bits | n bits (e.g. n = 4) |

Figure 16B:
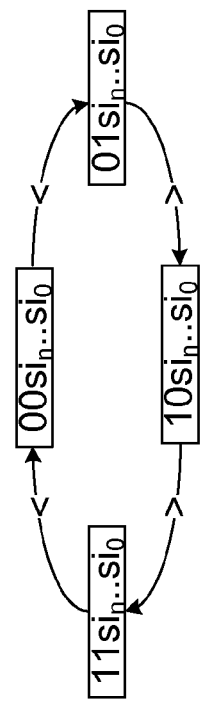
FIG. 16B is a diagrammatic illustration of an example circular timestamp.

An exemplary time-stamp (TS) is shown in FIG. 16b.

The circular time-stamp works perfectly as long as it is ensured that no old circular pattern cp (e.g. 01) is still in use while a same circular pattern cp (e.g. 01) is being newly used due to a roll over, such causing a collision. For forming such a circle, only on bit would not be sufficient. At least 3 interpolation points are required, requiring 2 bits information. More than 2 bits are usually not necessary, if not for other reasons.

In most applications and/or environments there is no guarantee that an instruction may not stall for an arbitrarily long time. Therefore it cannot be assumed, that time-stamps of any length will be large enough to provide the minimum distance within the circle for preventing the reissue of a circular pattern (cp) by the scheduler, which is still in use by any blocked instruction.

Therefore a mechanism is required to stall the scheduler if a collision is about to happen. Several mechanisms are feasible, e.g.:

In one embodiment each time-stamp generator checks, at least before moving from one circular pattern (cp) to the next, if the next circular pattern (cp) is still in used within the ALU-Block. Either each ALU may be checked or monitored, or a time-stamp history buffer might be implemented, recording the issue of time-stamps and the return of the respective results to the register file (RF), such freeing the time-stamps again.

In another less complex to implement embodiment, each ALU constantly monitors the circular pattern (cp) generated by the time-stamp generator of the registers used by its instruction. If the current time-stamp of the time-stamp generator is only one step away from the time-stamp still used by a register of the ALU, the ALU issues a wait signal to the time-stamp generator, preventing it to move ahead to the subsequent circular pattern (cp). Depending on the width of the sequence-information (si), latency is no issue, as there is enough time for checking and transferring the wait signal between the first use of a circular pattern (cp) and moving to the next subsequent circular pattern (cp).

However, in a preferred embodiment, no dedicated hardware is required at all. As disclosed before, usually result data have to be written to the register file (RF) in strict program order, which likely differs from the execution order of the Out-Of-Order (OOO) execution. Result data for each register is sorted by a (preferably dedicated) FIFO-like Result Sorting Buffer (RSB). Result data is written into the RSB in the sequence of its production by the ALUs. However, data is transferred from the RSB into the Register File (RF) in the order defined by the time-stamps associated with the data. If the RSB is full, but the next time-stamp in linear order required for transmission to the Register File (RF) is not available in the RSB or at the input to the RSB from the ALU-Block, scheduling will stall and no new time-stamps will be generated. However, data processing continues.

As also disclosed before, the network preferably transmits result data having the oldest time-stamp. While the result data may stall back in the network that rule (preferably transmitting the data associated with the oldest time-stamp (TS)) will ultimately transfer the (previously missing) data next in order to the input of the RSB. From there the data is then transmitted to the Register File, establishing the correct order. After the previously missing data has been written to the Register File (RF), scheduling continues and the next data in the sequence is selected for transmission from the Result Sorting Buffer (RSB) to the Register File (RF). Stalling scheduling until writing the data next in the timestamp sequence to the Register File (RS) automatically ensures that no time-stamp collision may occur.

Transferring Results to Register File (RF) (II)

Various implementations might be used for transferring back the results from the ALU-Block to the register file. Exemplary two preferred embodiments, a multiplexer arrangement, and a multiplexer tree are shown in FIG. 1 and FIG. 2.

Another preferable embodiment is disclosed and described in [3], e.g. FIG. 27 and FIG. 28. Here the results are transferred to the register file (RF) through a pipeline, each stage capable of adding its current output to the pipeline. The order might be maintained, by selecting for each pipeline stage, whether the timestamp (and respectively data) of the previous pipeline stage or of the current ALU row shall be transmitted.

Other embodiments may use entirely configurable networks (which might also be used in between the ALUs of the ALU-Block) as known from FPGAs and reconfigurable processors. However, as those tend to be slow, large and power inefficient, they are usually not preferred.

Safeguarding Time-Stamps

Modern processors may require rather long latencies accessing memory or peripherals, worst case conditions of 20-60 clock cycles or even more are not uncommon. In such environments the length of the Time-Stamps might become a critical factor. It must be ensured, that the oldest timestamp value in the ALU-Block is not reached again by newer timestamps. One approach could be very wide timestamps, but they are expensive to handle and may even not guarantee the correctness under any conditions.

Depending on the result-to-register-file write-back strategy discussed subsequently, several methods can be implemented to safeguard the correctness of the timestamps and prevent an overflow, for example:

SGT1) The timestamp generator monitors all timestamps issued to ALUs in the ALU-Block. If a new timestamp is about to issue, which is still in use within the ALU-Block, the issue of the respective instruction is delayed, until the required timestamp becomes free (which means the respective instruction in the ALU-Block has been executed). In some embodiments an out-of-order implementation may skip the execution and continue with the issue of other instructions. This is a rather complex way to safeguard.

SGT2) Each ALU of the ALU-Block monitors issued timestamps. If a collision occurs or if a collision could occur soon (the currently issued timestamp is in a close vicinity of the one still in use (e.g. 1, 2, or 3 steps away), the ALU produces a STOP signal preventing the respective instruction to issue. The STOP signal is removed as soon as the ALUs current instruction has been processed and has terminated and the result data has been written back to the register file, so that the timestamp is not in use anymore.

SGT3) The timestamp generator checks the currently generated timestamp versus the timestamp of the data in the respective register. If the currently generated timestamp would be equal to the timestamp of the data in the respective register (or comes close within a vicinity as in case SGT2)), the timestamp is not issued and the respective code issue is blocked, until the timestamp in the data register is updated with newer result data. This is the simplest safeguard implementation.

In-Order-Write-Back (IOWB) vs. Most-Recent-Write-Back (MRWB)

Figure 8:
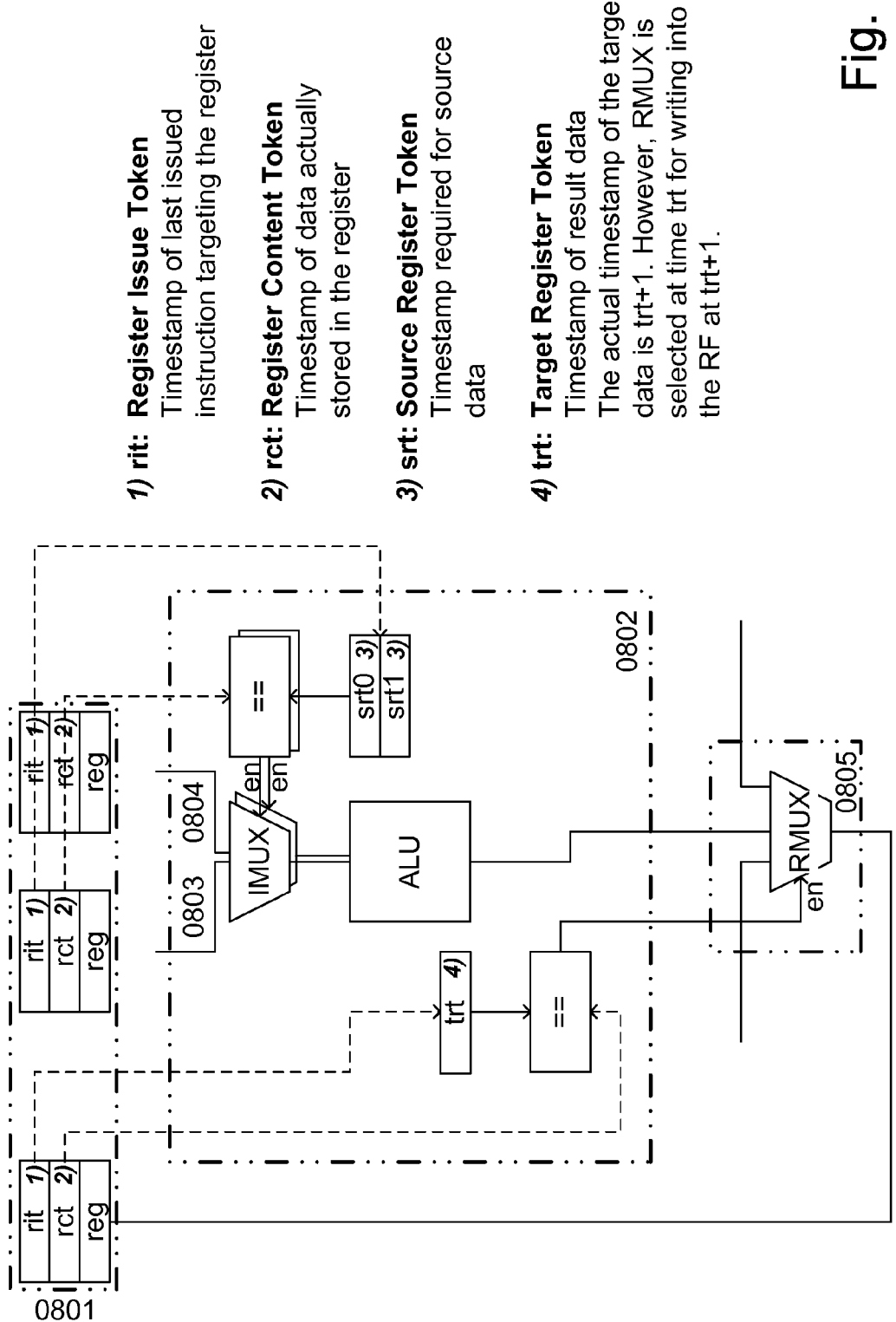
FIG. 8 is a diagrammatic illustration of an example In-Order-Write-Back (IOWB) implementation for writing data to a register file.

FIG. 1, FIG. 2 and FIG. 8 show implementations of an In-Order-Write-Back (IOWB). In those implementations, the result data is written back to the register file in exactly the same order as the instructions are ordered in the program (in program order). The benefit is, that it is ensured that the sequence of results in the register file is the same as the program had produced executed in order. Also, the simple timestamp safeguarding according to SGT3) can be implemented, as the timestamps are linearly written to the register file. However, the strict implementation might be unnecessary. Usually if a newer timestamp for a register is issued to the ALU-Block, the timestamp older data became obsolete. Either it is not required or it is consumed by instructions already been issued to ALUs of the ALU-Block, so that those ALUs directly receive the data from the producing ALU via the ALU-Block data network: So the writing-back this data to the register file is obsolete. For example the write back structure of FIG. 2 can be modified such that not the lowest (oldest) timestamp is selected for transmission to the register file, but the largest (newest). All data with older timestamps are discarded.

The benefit of this implementation is in the possibly faster write-back of data to the register file: Not all of a plurality of results to the same register do not need to be arbitrated and transferred anymore, only the newest one. Also, respectively energy can be saved: Not transmitted data does not consume energy.

However, safeguarding the correctness of the timestamps becomes more complicated. Still SGT3) is the most preferred safeguarding, but may not be sufficient in all kind of implementations. This may force the implementation of the more complex safeguarding methods SGT2) or SGT1).

FIG. 8 shows an exemplary implementation of a timestamp based result reordering. A register file (0801) comprises a plurality of registers (reg), each having an associated Register Issue Token (timestamp) (rit), containing the timestamp of the last instruction using the register as result target being issued. Also a Register Content Token (timestamp) (rct) is associated with each register, containing the timestamp of the last instruction having written its result back to the respective register (reg) of the register file (0801).

When an ALU (0802) of the ALU-Block is getting a new instruction issued, together with the instruction the current Register Issue Tokens (rit) of source and target registers are transmitted and stored in internal registers (trt for the result token and srt0 and srt1 for 2 operand data tokens). Those tokens (timestamps) reference to the last instruction issued, generating result data to be stored in the respective register. The ALU (0802) has to receive its source data exactly from the last issued instructions producing the register values. It has to write back its own result exactly after the previous instruction has sent its result to the target register. Via an input multiplexer (IMUX), the ALU receives the operands from the selected source. Note: The operand paths (0803 and 0804) are not directly connected with the register file. This shall indicate, that the operands may actually not only be received from the register file, but possible from another ALU in the ALU-Block.

Not only has the correct source had to be selected, but also the correct data from the source. Therefore the sources data tokens are compared with the respective srt(0,1) value and only if the data token and srt value matches, the respective data is transmitted to the ALU. It shall be mentioned, that preferably an input register is implemented right after each of the IMUX for operand0 and operand1. The input register stores the selected incoming data in case the ALU is not ready for operation yet, at a later point in time, the data with the correct timestamp may be lost. There are several reasons why an ALU may not be able to perform an operation, e.g. could another operand source data still be missing.

A similar mechanism is implemented for the result data. In this example the result is written-back in a write-back stage (0805) in-order (IOWB). Therefore, the write-back is enable, after the exact previous instruction (in program order) has written its result to the target register: trt and rct match, and the result transmission to the target register is enabled. Exemplary shown is a result-to-register-file multiplexer (RMUX) collecting and transmitting the result data from all ALUs in the ALU-Block (various implementations have been previously described).

Jump Instructions
Jump Indicating Loop

Instructions for indicating the start and/or end of a loop and switching between the modes are known from [3]. Additionally or alternatively ZZYX processors may provide jump instructions indicating the start and/or end of a loop. This may prevent to amend existing Instruction Set Architecture (ISA), e.g. Intel Pentium, MIPS, ARM, etc. with a special respective instruction. The jump instructions may be similar or even equivalent to traditional jump instruction, but only differ in the binary code, so that the processor can recognize the start or end of a loop and switch accordingly from normal (or Out-Of-Order) execution into loop mode.

The existence of the respective jump instructions may simplify the design, efficiency and accuracy of the loop optimization (e.g. BTA, COA, CAQ).

If actually no jump is necessary but the instruction is only used to switch between the modes, a jump to the next linearly succeeding instruction is implemented, e.g. jmpr 1 (if jump (e.g. jmpr) is relative to the program pointer). The instruction fetcher (IF) may read over the respective instruction, instruct to switch between the modes, and continue fetching the next instruction from ProgramPointer+1 (PP+1). No jump is actually performed, as execution continues with the linearly next subsequent instruction (PP+1). The sole purpose of such "pseudo" jump instructions is switching between the modes. The relative jump to PP+1 is ignored and the instruction fetcher (IF) and instruction decoder (ID) only issues the instruction to perform the switch.

The following exemplary jump instructions might be implemented, which can be conditionally executed as disclosed below (and as e.g. the ARM instructions set provides):
  bass (branch and superscalar) If execution is enabled, branch and switch to superscalar mode.
  boss (branch or superscalar) Branch if execution is enabled else switch to superscalar mode.
  bala (branch and loop-accelerator) If execution is enabled, branch and switch to loop-accelerator mode.
  bola (branch or loop-accelerator) Branch if execution is enabled else switch to loop-accelerator mode.

Branch Prediction and Speculative Execution

As of today, branch prediction is widely supported in modern processor architectures. In conjunction with tracking the jump history it is an important tool to avoid unnecessary jumps and/or pipeline stalls. However, speculative execution is complex to implement, and required significant resources and power.

ZZYX cores therefore may provide conditional jump instructions indicating if the jump is typically executed or not, e.g. by using specific binaries: One for jump typically executed, and another one for jump typically not executed. This leaves it to the programmer, compiler and/or code analysis tools to set the jump instruction in accordance to the most typical case of the algorithm. In most cases, it is well predictable either by analysing the algorithm or by profiling the execution of realistic data, which path might be take more often. For example, if the conditional jump defines a loop, it is rather likely that the jump leads to the top of the loop doing another iteration, than exiting the loop.

Compilers detect and optimize loops and can therefore be enhanced to use the respective jump in loops.

Other constructs, such as compares may require the analysis and/or profiling of realistic data to define the best jump setting. Such analysis can be done upfront at compile (or design) time of a program or it can be done at runtime e.g. in conjunction with the operating system and/or a compiler library. At runtime the code might be temporarily altered just for the runtime of the execution or it might be written back to the mass storage, so that the altered code is used at the time of the next program start.

Depending on the Jump Instruction:
  jump-likely: the processor executes the jump and trashes the pipeline in case it is figured out that the jump should not have been executed.
  jump-unlikely: the processor does not execute the jump and trashes the pipeline in case it is figured out that the jump should have been executed.

The respective opcodes and functionality can be implemented in existing instruction sets (e.g. Intel IA, ARM, MIPS). However some instruction sets might not have room for additional instructions or it does not appear useful to waste space in the instruction map. In this case the following construct may be used to emulate the function:

conditional_jump <adr>
unconditional_jump <adr>

It is a combination of a conditional jump, directly followed by an unconditional jump. Whenever the instruction decoder of a processor detects such a combination, depending on a predefined policy, the processor may speculatively execute the conditional jump (if the predefined policy says so) or may speculatively not execute the conditional jump (if the predefined policy says so). In order not to waste time, it the policy is preferred to speculatively execute conditional jumps in such a combination.

While this combination if two opcodes might be a waste of time in traditional processor architectures, Trace Caches enable efficient execution. Furthermore and even preferred, the two jump opcodes might be fused by the Instruction Decoder (ID) into one opcode, which may require only one slot in the processor internal buffers (e.g. the trace cache) and/or requires only one (instead of worst-case two) jump cycle for execution. The Instruction Decoder analysis two subsequent instructions for detecting the combination of a conditional jump, directly followed by an unconditional jump and fusing it into a respective Microcode, Microcode sequence or combined opcode, depending on the implementation.

Fusing a plurality of Opcodes into one Microcode or a joint combination of Microcodes is known in the state of the art, e.g. by Intel x86 processors. Reference is made to [4], e.g. chapter 58, section "µop Fusion".

It shall be noted, that the respective combination of a conditional and unconditional jump instruction may lead to rather weird code, for example in the code of FIGS. 11A and 11B:

The original code uses a conditional jump (jne, 1110) to loop to label .L6, but continues with label .L4 if the condition is not met:

```
        lea     ebx, [eax+1]
        cmp     ebx, DWORD PTR [ebp-16]
        jne     .L6
.L4:
        add     esp, 4
        pop     ebx
```

After the combination of a conditional and unconditional jump instruction is inserted, the code has an additional, rather superfluous jump instruction jmp .L4:

```
        lea     ebx, [eax+1]
        cmp     ebx, DWORD PTR [ebp-16]
        jne     .L6
        jmp     .L4
.L4:
        add     esp, 4
        pop     ebx
```

However, it shall be pointed out that the sole purpose of this jump instruction is (as described) the declaration of the likely jump target. jne .L6 and jmp .L4 are recognized as a complex or joint opcode by the instruction decode and trigger the execution unit (EX) or and/or fetch unit (IF) to execute the conditional jump according the policy. Particularly the two instructions might be fused into a single microcode or a microcode group subsequently treated as a whole, e.g.:

```
first_jump_to_.L6_check_if_condition_met_...
    ...else_trash_pipeline_and_jump_to_.L4
```

Speculative execution is expensive on processors of the prior art. If a speculative execution has been proven wrong, not only the pipeline has to be flushed and reloaded, but also previously processed data, already transmitted to the register file has to be removed and the register content before the speculation has to be restored. This restoration is costly in terms of time, resources and energy.

The ALU Block of ZZYX processors enable a new type of speculative execution. In case a branch is speculatively taken, instructions might be issued to the ALUs of the ALU Block, with a speculation-flag set. Data produced by such instructions are transmitted within the ALU Block, but not written back to the register file, unless the speculation has proven correct. In case the speculation was wrong, the produced data in the ALU Block is not written to the register file, but overwritten by new data of the correctly taken branch.

Conditional Execution

For efficient execution of an algorithm on the ALU Block, e.g. in loop mode, it is beneficial to keep data streaming as long as possible through the ALUs of the ALU Block. Conditional jumps would destroy the instruction pattern mapped onto the ALU Blocks and require fetching and issuing of new instructions. However, ideally conditionally executed code is inlined and issued together with the surrounding code to the ALUs of the ALU Block. This inlined conditional code is then conditionally executed on a cycle-by-cycle basis, depending on the currently processed data during execution.

Various approaches can be used to achieve the required inlining, some are exemplary described:

Each instruction may have a token defining the condition on which it is executed. Such condition fields within instructions are for example known from the ARM instruction set, e.g. reference is made to [8] chapter 4 "ARM Instruction Set".

However, in most other assembly languages, conditional jumps are used to exclude code from processing. However, code analysis e.g. at the Instruction Decoder (ID) stage or based in the Trace Cache (e.g. CAQ) are able to detect such code exclusions. For example:

The C-Code

```
if (i > j)
    i -= j;
else
    j -= i;
``` compiles to an assembly code as such

```
        cmp     Ri, Rj      ; set condition "NE" if (i != j),
                            ;               "GT" if (i > j),
                            ;            or "LT" if (i < j)
        jle     .L1         ; jump if less or equal
        sub     Ri, Ri, Rj  ; if "GT" (greater than), i = i-j;
        jmp     .L2
.L1:    sub     Rj, Rj, Ri  ; if "LT" (less than), j = j-i;
.L2:    ...                 ; Label reached from both branches:
                            ; common code
```

The execution graph is analyzed. It splits at instruction jle and merges again at label .L2. Conditional execution control is attached to the respective instructions of the branches, jump instructions can be removed. Respectively the original code comprising jump instructions is transformed (e.g. at the Instruction Decoder (ID) stage or based in the Trace Cache (e.g. CAQ)) into the following assembly code using condition fields:

```
        cmp     Ri, Rj      ; set condition "NE" if (i != j),
                            ;               "GT" if (i > j),
                            ;            or "LT" if (i < j)
        subgt   Ri, Ri, Rj  ; if "GT" (greater than), i = i-j;
        suble   Rj, Rj, Ri  ; if "LT" (less than), j = j-i;
        ...                 ; common code
```

At execution time each ALU of the ALU Block decides based on incoming status flags produced by previously executed instructions if the condition is met and executes the instruction in this case.

The respective model can also be applied for multi-level conditional execution. This is subsequently described on more abstract code:

```
uncond_op              ; unconditional opcode
uncond_op (set flags)  ; unconditional opcode setting status flags
```

| | | |
|---|---|---|
| branch .L1 | ; branch to .L1 depending on status ; depending on set flags | |
| uncond_op | ; unconditional opcode omitted by jump .L1 | |
| uncond_op | ; unconditional opcode omitted by jump .L1 | |
| uncond_op (set flags) | ; unconditional opcode omitted by jump .L1 ; setting status flags | |
| branch .L2 | ; branch to .L2 depending on status ; depending on set flags ; omitted by jump .L1 | |
| uncond_op | ; unconditional opcode omitted by ; jump .L1 and/or .L2 | |
| uncond_op | ; unconditional opcode omitted by ; jump .L1 and/or .L2 | |
| .L2: uncond_op | ; unconditional opcode omitted by jump .L1 | |
| uncond_op | ; unconditional opcode omitted by jump .L1 | |
| .L1: uncond_op | ; unconditional opcode | |

The code example comprises unconditionally executed instructions having no condition field (uncond_op). The branch instructions (branch) do also not comprise condition fields, they branch to the given label if the received status information meets the branching condition.

Within the first conditionally executed branch (branch .L1 to .L1:) a second conditionally executed branch is located (branch .L2 to .L2:). The second branch is tested and potentially executed only, if the respective code is enabled by the first branch. At .L1 all branches merge again.

The exemplary code and respective graph is shown in FIG. 3a.

In the following the ARM architecture condition codes are used as an example. The condition code according to the table are set in the condition fields of ARM instructions and enable the execution of the respective instruction depending on the received status flags:

| condition code | mnemonic | Execute, if flag(s): |
|---|---|---|
| 0000 | EQ | zero set |
| 0001 | NE | zero not set |
| 0010 | CS | carry set |
| 0011 | CC | carry not set |
| 0100 | MI | negative set |
| 0101 | PL | negative not set |
| 0110 | VS | overflow set |
| 0111 | VC | overflow not set |
| 1000 | HI | carry set and zero not set |
| 1001 | LS | carry not set and zero set |
| 1010 | GE | negative equals overflow |
| 1011 | LT | negative not equal overflow |
| 1100 | GT | zero not set and (negative equals overflow) |
| 1101 | LE | zero set and (negative not equal overflow) |
| 1110 | AL | execute always |
| 1111 | BK/AB | back one level/as before |

Note:
The additional condition code (1111 = BK) is implemented at a formerly unused position. This code terminates the conditional execution, as always would. However, BK does not switch to unconditional execution, but goes back to the previous level of conditional execution as will be described subsequently.

The exemplary code (e.g. FIG. 3a) is optimized such, that two condition fields are generated processor internally. Depending on the processor implementation, not only two but a plurality of condition fields (e.g. 4, 7, 8 or more) can be used.

The first field (0301) defined the first or lowest condition level. Only if a condition is used at this level, the next higher condition level will be checked, in this example the second field (0302). If a further level (e.g. a third) is implemented, this will be checked only if a condition is already placed into the second condition field, and so on.

The condition fields 0301 and 0302 show, how the conditions are set depending on the instruction flow.

In FIG. 3b the same graph is implemented using an assembly set providing condition fields. Jump instructions are redundant.

After status flags are set for the second time (set flags 2) the subsequent instructions are conditionally executed on the basis of the newly set flags. This advances the condition level one level higher. At some time, a special back (back_2) instruction might be used, quasi to close the branch and go back to the previous condition level. Subsequent code is then again executed according to the first condition. Finally a second back instruction (back_1) terminates the conditional execution.

Obviously the status information is newly set during the execution and the original information is eliminated. This will jeopardize any conditional execution of a previous level after a level is finished. For example the cond_1 instruction (0311) would not process correctly after the status flags have been set (0312) for the second time. Various implementation alternatives exist to avoid this problem.

For example:
Ca) At each level status flags may be saved and made available (e.g. by transmitting them via a bus or network) to all ALUs operating at the respective level. Each ALU get the correct status information in accordance with the condition level it is operating at and is able to check those status flags in accordance with the condition code.
Cb) In another implementation, an Level-Enable-Disable (LED) signal is generated by the ALU performing the first conditional operation. The LED signal is condition level specific, each condition level has its respective dedicated LED signal. It is then evaluated by all subsequent ALUs operating at the same level.

For example may 0313 set the enable signal for the first level and 0312 for the second level. If conditional execution is used, just the enable signal at the respective level is evaluated.

Obvious for one skilled in the art various other implementations exist.

The back instruction would require additional space in the instruction set, decrease the code density and takes additional time and energy to fetch and decode. In one implementation an additional condition code called back (BK) is implemented as shown in the table above. BK (back) set has the same effect as a back instruction. However the current instruction, which could be any instruction, is effected and retreated one condition level (e.g. 0321, 0322). This replaces the back instruction by a useful instruction. It shall be noted, that instruction 0322, which goes back to non-condition execution, may alternatively use the AL condition code (always).

This leads to another possible implementation, in which the Always condition code (AL) is given a slightly different semantics: It is actually not enabling entirely unconditional execution, but retreating one condition level back, as the back condition code (BK) does. The back condition code (BK) is therefore eliminated, which may increase the compatibility with existing processor architectures and/or instruction sets.

However in case Cb) is implemented and the LED signals are used, instructions executed after the status flags are newly set cannot check the original status flags their condition may depend on. While this is no problem in a implementation of the type Ca), the respective status information is available at each level, only the LED signals are transmitted in the Cb) implementation.

Therefore, a condition code might be used, called As-Before (AB). This code simply checks the respective LED signal and enables the execution in accordance to the original condition which generated the LED signal, respectively enabling or disabling all further operation having the AB condition code set.

The condition codes As-Before (AB) and Back (BK) might be both implemented. However, this would not fit into the space of the condition table shown above. A fifth bit would be required. In a preferred implementation, either AB or BK are implemented. In case AB is used, Back (BK) is not implemented, but the Always (AL) condition code has the modified semantics described above: retreating one condition level back.

Managing the FIFO Register File, e.g. FIFO Data Registers (FDR)

Special instructions might be used to manage FIFO Register File, e.g. the FIFO Data Registers (FDR). [3] comprises a detailed description of the FIFO Register File, e.g. "Each single register (for instance 0401) consist of a FIFO and may operate in one of at least two modes, as single register or as First-In-First-Out memory (FIFO)." Particularly it is important to switch between the FIFO stages, respectively the entries in the FIFOs. As described in [3] each iteration of a loop may use—and typically does use—another entry in the e.g. FDR.

During the first loop run, e.g. a first Catena (see [ ]), the register entries for each iteration (i.e. the FIFO entries) must be initialized. Various methods may be used, for example:

a) Before the first loop run, for each single register a copy of the currently selected register is copied into all its respective FIFOs entries, so that the value of the currently active register is duplicated for all FIFO stages of that register. By doing so, all subsequent loop iterations get access to the respective starting value.

b) Only before a new loop iteration starts, the FIFO entries for this respective loop entries is initialized. In this case, this might be a copy of the each final register value of the previous loop iteration into its respective FIFO entry for the new loop iteration.

While those functions may be controlled by dedicated instructions, in one embodiment, loop instructions (e.g. as the previously discussed bass, boss, bala, bola instructions) may be used to implement the respective features.

Context Switching

ERF and/or PRF and/or SRF may exist in a plurality of instances. Preferably only one instance is active at a time. A context switch is detected, if the pointer to the address translation table (i.e. PML4) is changed by resetting the respective register (i.e. CR3) of the processor pointing to the address translation table. For the description of PML4 and CR3 reference is made to [1].

The active ERF and/or PRF and/or SRF instance is moved to the PUSH pipeline, in which formerly used instances are lined up for being pushed to the memory hierarchy in the background by a DMA-like mechanism.

ERF and/or PRF and/or SRF instances might be speculatively prefetched (popped from memory hierarchy) in the background by a DMA-like mechanism using various mechanisms. Those prefetched instances are checked, if one of them meets the new CR3 entry. If so, the respective instance is selected as active set.

If no prefetched instance fits or the feature is not implemented, the newly selected instance is fetched (popped) from the memory hierarchy.

The prefetching strategy may depend on the scheduling algorithm of the Operating System. Some strategies, such as e.g. Round-Robin or Priority scheduling are widely predictable, so that the hardware can prefetch at high accuracy. Other strategies may require the scheduler to explicitly inform the hardware, which ERF instances shall be prefetched.

Figure 6:
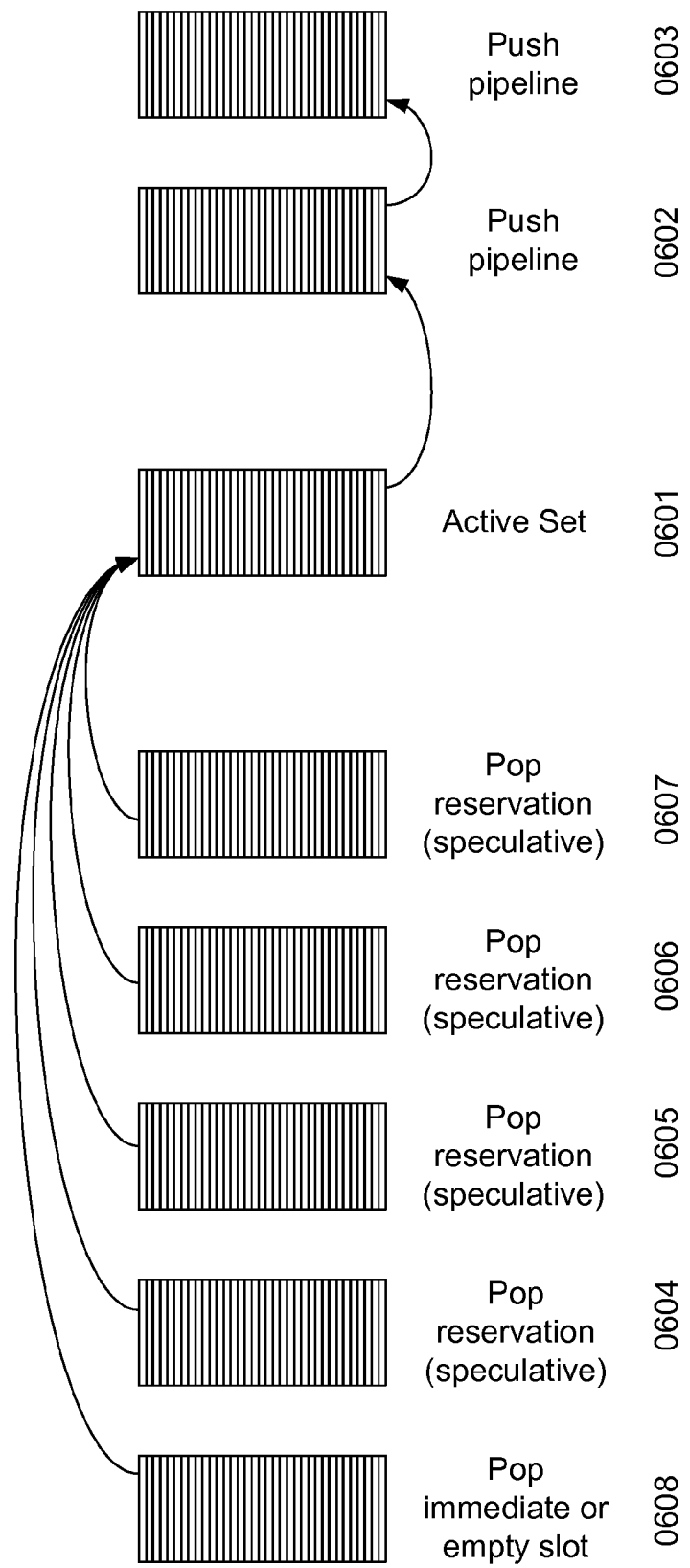
FIG. 6 is a diagrammatic illustration of an example of prefetching register file instances to be available for context switching.

An exemplary sequence is shown in FIG. 6. The active set (0601) is the register file (e.g. ERF and/or PRF and/or SRF) currently in use. Formerly used register files (0602 and 0603) are in a push pipeline for being spilled (pushed) to the memory hierarchy.

Register files (0604, 0606, 0606, 0607) for subsequent future use might be preloaded into register file reservation unit (or pop pipeline), having the register files available for fast context switching. Depending on the processors implementation, this might be one register file, or a plurality of register files (e.g. 4 as shown in the figure). They might be preloaded on a speculative basis, or—as preferred—under the control of a task and/or thread scheduler located in the operating system and/or in the application. (Note: typically the task scheduler is located in the operating system, but task schedulers might be located within the application). Those register files (0604, 0606, 0606, 0607) are loaded from the memory hierarchy, or if necessary directly from the push pipeline (0602 or 0603).

In some embodiments an immediate slot (0608) might be available for immediate preload and subsequent use. This slot is for example very useful in realtime environment, in which fast or time critical task and/or thread switches are necessary. This register file is usually kept free and only used for time critical context switches.

It shall be mentioned, that the register file slots are preferably addressed by pointers. There is a pointer locating the active slot (0601), one or more pointer locating slots to be off-loaded to memory (0602, 0603) and one or more pointer locating slots to be pre-loaded from memory (0604, 0606, 0606, 0607). Particularly the slots might be arranged in linked lists, with a section defining the active set and sections for being loaded or off-loaded.

Addressing the slots using pointers or a linked list might be faster and is energy saving compared to copying the data in the register files of the slots from one slot to another.

ZZYX Matrix Mode

Two Options:

using the IA instructions, with all limitations (e.g. requiring aliasing)

as the instructions space has to be limited in Matrix mode anyhow, e.g. complex instructions cannot be executed but only simple, a dedicated instruction set (HYP instructions) makes sense, i.e. the HYPERION instruction set.

The instruction set is changed when switching between the modes.

Option ii) opens up to an additional variant for the register file:

Only the dedicated instructions according to option ii) use the full register file. The IA registers are physically mapped into the file, e.g. to the first 8 registers. The remaining registers (24 more according to the HYP spec) are only accessible through the HYP instructions.

ALU Block Architecture and Shape

In a variety of executed software algorithms placers may not be able to fill an array of ALUs within the ALU Block entirely or sufficiently. To the contrary, the lower rows may show significant lower usage than higher rows, closer to the register file. While optimizing the placer and analyser algorithms will improve the usage, algorithmic limitations apply. For example often instructions in the lower rows combine processing results produced by higher rows. As instructions have usually 2 inputs and one output, the number of combinable operands may shrink by per row.

For saving silicon area and static power dissipation, a quadratic or rectangular arrangement of ALUs in the ALU Block array may be inefficient. Analysis shows, that depending on the application space and markets it might be preferred in some embodiments to arrange the ALUs in a triangular fashion. One extreme could be a perfect triangle, such as e.g. 4 ALUs in the top ($1^{st}$) row, 3 ALUs in the $2^{nd}$ row, 2 ALUs in the $3^{rd}$ row and only one ALU in the $4^{th}$. However other arrangement may implement less "perfect" triangles, e.g. 4 ALUs in the top ($1^{st}$) row, 3 ALUs in the $2^{nd}$ row, 3 ALUs in the $3^{rd}$ row and 2 ALUs in the $4^{th}$ or even 4 ALUs in the top ($1^{st}$) row, 4 ALUs in the $2^{nd}$ row, 4 ALUs in the $3^{rd}$ row and 3 ALUs in the $4^{th}$. Structures in which each lower ALU row comprise equal or less ALUs than the respective higher ALU row are regarded inventive.

It shall be noted, that enhanced implementations as e.g. discussed in FIG. 22, may provide additional connectivity (e.g. 2299) increasing the placeability if instruction on the ALU Block array and by such eliminating the efficiency benefits of triangular arrangements.

Type of Execution Units (e.g. ALUs)

Most processors tend to have instructions of different complexity, some requiring rather little hardware, others are highly complex to implement. However, analysis shows that in most cases the less complex instructions are used far more often than the complex ones.

In one preferred embodiment not all ALUs of the ALU-Block are exactly identical. Some may only support a limited set of instructions for reducing area size, power dissipation and/or hardware complexity. In a preferred embodiment rows or columns may use the same ALUs supporting the same instructions. So, for example, in one embodiment all ALUs of the first row may support the complete instruction set, while the ALUs of all subsequent rows, may only support a limited set. In another embodiment each even row may support all instructions, while all odd rows have a limited set. In again another implementation the first and last row support all instructions, while the rows in-between support only a limited set. Furthermore, some instructions might be almost never used. Examples are instructions forcing the processor to trap, e.g. for debugging purposes and/or system calls, or instructions changing the protections modes, e.g. from one ring to another. Such instructions might be implemented on one single ALU only. In some embodiments, even an ALU might be implemented separated from the ALU-Block for supporting the most complex and/or seldom used instructions. In one embodiment, this separated ALU might be able to process all instructions. It might even be the main ALU, e.g. after a processor reset, and the ALU-Block is only switched on and used optionally, e.g. when required.

In other embodiments, specialized functions may be arranged in columns, e.g. one column supports Load/Store functions, while another supports multipliers. In one embodiment, at least some cells may have connection to their horizontal neighbours (e.g. FIG. 22, 2299). Preferably in such an embodiment, the most left column may support load instructions, the right column may support store instructions and at least some of the middle columns may support multiplication. In yet another embodiment, the functions might be distributed triangularly, e.g. a triangle spanning the top row and the left column may support e.g. load instructions while another triangle spanning the bottom row and the right column may support e.g. store instructions.

Some processors support highly specialized instructions, such as e.g. protection mode switching, special load/store functions, complex ALU functions, etc.

As already described, such functions may be supported by only one or a few of the ALUs in the ALU Block; even jump, call, and return instructions may not be supported by all ALUs.

Furthermore some instructions (limited-instruction) may not be usable for Out-of-Order execution or loop acceleration. For example block load or block store instructions (such as e.g. ldm and stm of the ARM instruction set) might be not supported.

In case such a limited-instruction is decoded, the issue may be delayed until all previously issued instructions have been completely executed and have terminated in the ALU-Block. No other instruction after the limited-instruction is issued, but instruction issue is blocked until the limited-instruction has been issued (and in some implementations even has terminated).

For example, the implementation of block load/store instructions (such as ldm and stm of the ARM instruction set) might be too expensive for supporting Out-of-Order processing, as many time stamps for the plurality of registers have to be stored within the ALU, dramatically increasing the number of registers. Such instructions may be implemented as limited-instructions, e.g. not supporting time-stamps. As a result, it must be ensured that all previous instructions have been executed, so that either the register content is correct for block store or block load does not destroy registers still in use. Also the issue of subsequent instructions has to be delayed until the limited-instruction terminates, so that either the register content to be stored is not destroyed in case of a block store instruction or the correct data has actually been loaded in case of a block load instruction).

Applicability on Operating Systems and Compilers

The inventive algorithms for optimizing standard processor code (e.g. Code for Intel x86 (IA) processors) can not only be implemented in hardware but also in software. For example the following software platforms may use the invention: Compilers (e.g. GCC) may do the respective analysis and optimize and/or generate and/or emit the binary code accordingly. Separately run code optimizing tools for existing binaries (e.g. legacy code and/or newly compiled code) may do the respective analysis and optimize and/or generate and/or emit the binary code accordingly. The code optimizing tools may be executed e.g. by a programmer for porting/generating the code, a system administrator when updating/upgrading a computer system or e.g. by the operating system, e.g. after installing the operating system, after installing the respective software and/or at runtime before executing the software.

More Examples

Further examples are discussed in this section. The source code is written in plain C, the discussed assembly code is based on the ARM instruction set architecture.

1. FIR Filter

The previously discussed FIR filter written in C is compiled using a compiler generating code optimized for a ZZYX processor.

For discussing some of the differences between optimized and non-optimized code, first the non-optimized assembly code is provided:

```
_start:
        stmfd       sp!, {r4, r5, r6, r7, r8, lr}
        sub         r6, r1, #5
        cmp         r6, #0
        str         r6, [r3, #0]
        mov         r8, r2
        ldmeqfd     sp!, {r4, r5, r6, r7, r8, pc}
        mov         r5, #0
        ldr         r4, .L8
        mov         lr, r0
        mov         r7, r5
        b           .L4
.L4:
        ldr         ip, [lr, #12]
        ldr         r3, [r4, #4]
        mul         r0, r3, ip
        ldr         r2, [lr, #16]
        ldr         r1, [r4, #0]
        mla         ip, r1, r2, r0
        ldr         r3, [r4, #8]
        ldr         r1, [lr, #8]
        mla         r0, r3, r1, ip
        ldr         r2, [r4, #12]
        ldr         r1, [lr, #4]
        mla         ip, r2, r1, r0
        ldr         r3, [r4, #16]
        ldr         r2, [lr], #4
        mla         r1, r3, r2, ip
        add         r5, r5, #1 /* Loop Control */
        cmp         r5, r6     /* Loop Control */
        str         r1, [r8, r7, asl #2]
        mov         r7, r5
        bne         .L4
        ldmfd       sp!, {r4, r5, r6, r7, r8, pc}
.L9:
```

The respective optimized assembly code may look as follows:

```
_start:
        stmfd       sp!, {r4, r5, r6, r7, r8, lr}
        sub         r6, r1, #4 /* */
        cmp         r6, #0
        str         r6, [r3, #0]
        mov         r8, r2
        ldmeqfd     sp!, {r4, r5, r6, r7, r8, pc}
        mov         r5, #0
        ldr         r4, .L8
        mov         lr, r0
        mov         r7, r5
        bala        .L4 /* Enter Loop, switch to loop acceleration mode*/
.L4:
        add         r5, r5, #1 /* Modified loop control */
        cmp         r5, r6     /* Modified loop control */
        basseq      .L10 /* Exit Loop, switch to superscalar mode*/
        ldr         ip, [lr, #12]
        lcp         r3, [r4, #4]
        mul         r0, r3, ip
        ldr         r2, [1r, #16]
        lcp         r1, [r4, #0]
        mla         ip, r1, r2, r0
        lcp         r3, [r4, #8]
        ldr         r1, [lr, #8]
        mla         r0, r3, r1, ip
        lcp         r2, [r4, #12]
        ldr         r1, [lr, #4]
        mla         ip, r2, r1, r0
        lcp         r3, [r4, #16]
        ldr         r2, [lr], #4
        mla         r1, r3, r2, ip
        str         r1, [r8, r7, asl #2]
        mov         r7, r5
        b           .L4
.L10:
        ldmfd sp!,  {r4, r5, r6, r7, r8, pc}
```

In this example the optimized code differed from the non-optimized in the following points:

lcp: The state-of-the-art load instructions (ldr) are replaced by Load-Constant-Pre (lcp) instructions when loading constant data for avoiding unnecessary memory accesses for already loaded constants.

bala: The loop is entered via the bala instruction, switching into loop-accelerator mode.

bass: The loop is left via the bass instruction, switching back into superscalar mode. According to the ARM instruction set architecture 'eq' is added to the bass instruction, so that the instruction is conditionally executed if r5 equals r6 in the compare instruction (cmp r5, r6).

Modified Loop Control: Loop Control is moved from the tail of the loop body to its head. Such, the loop exit criteria is checked at the very beginning of each loop iteration. This is beneficial for large loop which do not entirely fit into the ALU-Block but has to be partitioned into a plurality of Catenae sequentially executed on the ALU-Block. The loop exit criteria is evaluated within the first Catena, correctly determined and forwarded to all subsequent Catenae, so that they terminate correctly.

2. Quicksort

Exemplary Quicksort implementations have already been discussed e.g. in FIG. 4 and FIG. 5.

For the sake of completeness the C-Code of an exemplary implementation is listed below:

```
main_string.c:
#include "qsort2.h"
static const char *data[ ] = {
        "Tree", "Beach",
        "Desert", "Ocean",
        "Sky", "Creek",
        "Redwood", "Ridge",
        "Mountain", "River"
};
void _start( )
{
        int n = ARRAYSIZE(data);
        sort((void*)data, 0, n-1, cmp_string);
}
cmp_string.c:
#include "qsort2.h"
#include <string.h>
int cmp_string(void *a, void *b)
{
```

```
    return (strcmp(a, b));
}
strcmp.c:
/* Nonzero if either X or Y is not aligned on a "long" boundary. */
#define UNALIGNED(X, Y) \
    (((long)X & (sizeof (long) – 1)) | ((long)Y & (sizeof (long) – 1)))
/* DETECTNULL returns nonzero if (long)X contains a NULL byte. */
#define DETECTNULL(X) (((X) – 0x01010101) & ~(X) & 0x80808080)
#ifndef DETECTNULL
#error long int is not a 32bit or 64bit byte
#endif
int strcmp(const char *s1, const char *s2)
{
# if defined(PREFER_SIZE_OVER_SPEED) || defined(__OPTIMIZE_SIZE__)
    while (*s1 != '\0' && *s1 == *s2)
        {
            s1++;
            s2++;
        }
    return (*(unsigned char *) s1) – (*(unsigned char *) s2);
#else
    unsigned long *a1;
    unsigned long *a2;
    /* If s1 or s2 are unaligned, then compare bytes. */
    if (!UNALIGNED (s1, s2))
        {
            /* If s1 and s2 are word-aligned, compare them a word at a time. */
            a1 = (unsigned long*)s1;
            a2 = (unsigned long*)s2;
            while (*a1 == *a2)
                {
                    /* To get here, *a1 == *a2, thus if we find a null in *a1,
                       then the strings must be equal, so return zero. */
                    if (DETECTNULL (*a1))
                        return 0;
                    a1++;
                    a2++;
                }
            /* A difference was detected in last few bytes of s1, so search
bytewise */
            s1 = (char*)a1;
            s2 = (char*)a2;
        }
    while (*s1 != '\0' && *s1 == *s2)
        {
            s1++;
            s2++;
        }
    return (*(unsigned char *) s1) – (*(unsigned char *) s2);
#endif
}
qsort2.c
#include <string.h>
static inline void swap(void **a, void **b)
{
    void *t=*a; *a=*b; *b=t;
}
int choose_pivot(int i,int j )
{
    return((i+j) /2);
}
void sort(void *list[ ],int m,int n, int (*cmp) (void *a, void *b))
{
    int i,j,k;
    if( m < n)
        {
            k = choose_pivot(m,n);
            swap(&list[m],&list[k]);
            void *key = list[m];
            i = m+1;
            j = n;
            while(i <= j)
                {
                    // while((i <= n) && (list[i] <= key))
                    while((i <= n) && (cmp(list[i], key)) <= 0)
                        i++;
                    // while((j >= m) && (list[j] > key))
                    while((j >= m) && (cmp(list[j], key)) > 0)
                        j--;
```

```
        if( i < j )
            swap(&list[i],&list[j]);
    }
    // swap two elements
    swap(&list[m],&list[j]);
    // recursively sort the lesser list
    sort(list, m, j-1, cmp);
    sort(list, j+1, n, cmp);
    }
}
```

Respective non-optimized ARM assembly code may look as such:

```
_start:
    8000:   ldr     r0, [pc, #12]   ; 8014 <.text+0x14>
    8004:   ldr     r3, [pc, #12]   ; 8018 <.text+0x18>
    8008:   mov     r1, #0          ; 0x0
    800c:   mov     r2, #9          ; 0x9
    8010:   b       8030 <sort>
    8014:   streqh  r8, [r0], -r8
    8018:   andeq   r8, r0, ip, lsl r0
cmp_string:
    801c:   b       818c <strcmp>
choose_pivot:
    8020:   add     r1, r0, r1
    8024:   add     r1, r1, r1, lsr #31
    8028:   mov     r0, r1, asr #1
    802c:   bx      lr
sort:
    8030:   stmdb   sp!, {r4, r5, r6, r7, r8, r9, sl, fp, lr}
    8034:   cmp     r2, r1
    8038:   sub     sp, sp, #8 ; 0x8
    803c:   mov     r9, r1
    8040:   mov     sl, r2
    8044:   str     r0, [sp]
    8048:   mov     r7, r3
    804c:   ble     8178 <sort+0x148>
    8050:   mov     r1, sl
    8054:   mov     r0, r9
    8058:   bl      8020 <choose_pivot>
    805c:   ldr     r3, [sp]
    8060:   mov     r2, r9, lsl #2
    8064:   ldr     r1, [r2, r3]
    8068:   ldr     ip, [sp]
    806c:   ldr     r3, [r3, r0, lsl #2]
    8070:   str     r3, [r2, ip]
    8074:   str     r1, [ip, r0, lsl #2]
    8078:   add     r5, r9, #1 ; 0x1
    807c:   cmp     r5, sl
    8080:   ldr     r8, [r2, ip]
    8084:   add     r2, r2, ip
    8088:   str     r2, [sp, #4]
    808c:   movle   r6, sl
    8090:   movle   fp, sl, lsl #2
    8094:   bgt     8180 <sort+0x150>
    8098:   cmp     r5, sl
    809c:   ldrle   r0, [sp]
    80a0:   addle   r4, r0, r5, lsl #2
    80a4:   ble     80b8 <sort+0x88>
    80a8:   b       80d4 <sort+0xa4>
    80ac:   add     r5, r5, #1 ; 0x1
    80b0:   cmp     sl, r5
    80b4:   blt     80d4 <sort+0xa4>
    80b8:   ldr     r0, [r4]
    80bc:   mov     r1, r8
    80c0:   mov     lr, pc
    80c4:   bx      r7
    80c8:   cmp     r0, #0          ; 0x0
    80cc:   add     r4, r4, #4 ; 0x4
    80d0:   ble     80ac <sort+0x7c>
    80d4:   cmp     r6, r9
    80d8:   ldrge   r0, [sp]
    80dc:   addge   r4, r0, fp
    80e0:   bge     80f4 <sort+0xc4>
    80e4:   b       8114 <sort+0xe4>
```

```
    80e8:   sub     r6, r6, #1 ; 0x1
    80ec:   cmp     r6, r9
    80f0:   blt     8110 <sort+0xe0>
    80f4:   ldr     r0, [r4]
    80f8:   mov     r1, r8
    80fc:   mov     lr, pc
    8100:   bx      r7
    8104:   cmp     r0, #0          ; 0x0
    8108:   sub     r4, r4, #4 ; 0x4
    810c:   bgt     80e8 <sort+0xb8>
    8110:   mov     fp, r6, lsl #2
    8114:   cmp     r5, r6
    8118:   bge     813c <sort+0x10c>
    811c:   ldr     r2, [sp]
    8120:   mov     r3, r5, lsl #2
    8124:   ldr     r1, [r2, r3]
    8128:   ldr     ip, [sp]
    812c:   ldr     r2, [r2, fp]
    8130:   str     r2, [ip, r3]
    8134:   str     r1, [ip, fp]
    8138:   b       8098 <sort+0x68>
    813c:   ble     8098 <sort+0x68>
    8140:   ldr     r1, [sp, #4]
    8144:   ldr     ip, [sp]
    8148:   ldr     r2, [r1]
    814c:   ldr     r3, [fp, ip]
    8150:   mov     r0, ip
    8154:   str     r3, [r1]
    8158:   str     r2, [fp, ip]
    815c:   mov     r1, r9
    8160:   sub     r2, r6, #1 ; 0x1
    8164:   add     r9, r6, #1 ; 0x1
    8168:   mov     r3, r7
    816c:   bl      8030 <sort>
    8170:   cmp     sl, r9
    8174:   bgt     8050 <sort+0x20>
    8178:   add     sp, sp, #8 ; 0x8
    817c:   ldmia   sp!, {r4, r5, r6, r7, r8, r9, sl, fp, pc}
    8180:   mov     r6, sl
    8184:   mov     fp, sl, lsl #2
    8188:   b       8140 <sort+0x110>
strcmp:
    818c:   orr     r3, r0, r1
    8190:   tst     r3, #3          ; 0x3
    8194:   mov     r2, r0
    8198:   bne     8214 <strcmp+0x88>
    819c:   ldr     r2, [r0]
    81a0:   ldr     r3, [r1]
    81a4:   cmp     r2, r3
    81a8:   bne     8210 <strcmp+0x84>
    81ac:   add     r3, r2, #-16777216    ; 0xff000000
    81b0:   sub     r3, r3, #65536  ; 0x10000
    81b4:   sub     r3, r3, #256    ; 0x100
    81b8:   sub     r3, r3, #1 ; 0x1
    81bc:   bic     r3, r3, #2130706432   ; 0x7f000000
    81c0:   bic     r3, r3, #8323072 ; 0x7f0000
    81c4:   bic     r3, r3, #32512  ; 0x7f00
    81c8:   bic     r3, r3, #127    ; 0x7f
    81cc:   bics    r2, r3, r2
    81d0:   beq     81e0 <strcmp+0x54>
    81d4:   b       8254 <strcmp+0xc8>
    81d8:   bios    ip, r2, ip
    81dc:   bne     8254 <strcmp+0xc8>
    81e0:   ldr     ip, [r0, #4]!
```

-continued

| | | | |
|---|---|---|---|
| 81e4: | add | r3, ip, #−16777216 | ; 0xff000000 |
| 81e8: | sub | r3, r3, #65536 | ; 0x10000 |
| 81ec: | sub | r3, r3, #256 | ; 0x100 |
| 81f0: | sub | r3, r3, #1 ; 0x1 | |
| 81f4: | bic | r2, r3, #2130706432 | ; 0x7f000000 |
| 81f8: | ldr | r3, [r1, #4]! | |
| 81fc: | bic | r2, r2, #8323072 | ; 0x7f0000 |
| 8200: | bic | r2, r2, #32512 | ; 0x7f00 |
| 8204: | cmp | ip, r3 | |
| 8208: | bic | r2, r2, #127 | ; 0x7f |
| 820c: | beq | 81d8 <strcmp+0x4c> | |
| 8210: | mov | r2, r0 | |
| 8214: | ldrb | r3, [r2] | |
| 8218: | cmp | r3, #0 ; 0x0 | |
| 821c: | bne | 8234 <strcmp+0xa8> | |
| 8220: | b | 8248 <strcmp+0xbc> | |
| 8224: | ldrb | r3, [r2, #1]! | |
| 8228: | cmp | r3, #0 ; 0x0 | |
| 822c: | add | r1, r1, #1 ; 0x1 | |
| 8230: | beq | 8248 <strcmp+0xbc> | |
| 8234: | ldrb | r0, [r1] | |
| 8238: | cmp | r0, r3 | |
| 823c: | beq | 8224 <strcmp+0x98> | |
| 8240: | rsb | r0, r0, r3 | |
| 8244: | bx | lr | |
| 8248: | ldrb | r0, [r1] | |
| 824c: | rsb | r0, r0, r3 | |
| 8250: | bx | lr | |
| 8254: | mov | r0, #0 ; 0x0 | |
| 8258: | bx | lr | |

The further discussion concentrates on the sort and string compare loops.

A first optimization targets the inner loops of the Quicksort algorithm.

The branch opcodes are replaced with respective ones controlling the loop accelerations:

| | | |
|---|---|---|
| 8098: | cmp | r5, sl |
| 809c: | ldrle | r0, [sp] |
| 80a0: | addle | r4, r0, r5, lsl #2 |
| 80a4: | balale | 80b8 <sort+0x88> |
| 80a8: | b | 80d4 <sort+0xa4> |
| 80ac: | add | r5, r5, #1 ; 0x1 |
| 80b0: | cmp | sl, r5 |
| 80b4: | basslt | 80d4 <sort+0xa4> |
| 80b8: | ldr | r0, [r4] |
| 80bc: | mov | r1, r8 |
| 80c0: | mov | lr, pc |
| 80c4: | bx | r7 |
| 80c8: | cmp | r0, #0 ; 0x0 |
| 80cc: | add | r4, r4, #4 ; 0x4 |
| 80d0: | bossle | 80ac <sort+0x7c> |
| 80d4: | cmp | r6, r9 |
| 80d8: | ldrge | r0, [sp] |
| 80dc: | addge | r4, r0, fp |
| 80e0: | balage | 80f4 <sort+0xc4> |
| 80e4: | b | 8114 <sort+0xe4> |
| 80e8: | sub | r6, r6, #1 ; 0x1 |
| 80ec: | cmp | r6, r9 |
| 80f0: | basslt | 8110 <sort+0xe0> |
| 80f4: | ldr | r0, [r4] |
| 80f8: | mov | r1, r8 |
| 80fc: | mov | lr, pc |
| 8100: | bx | r7 |
| 8104: | cmp | r0, #0 ; 0x0 |
| 8108: | sub | r4, r4, #4 ; 0x4 |
| 810c: | bossgt | 80e8 <sort+0xb8> |
| 8110: | mov | fp, r6, lsl #2 |
| 8114: | cmp | r5, r6 |
| 8118: | bge | 813c <sort+0x10c> |
| 811c: | ldr | r2, [sp] |
| 8120: | mov | r3, r5, lsl #2 |
| 8124: | ldr | r1, [r2, r3] |
| 8128: | ldr | ip, [sp] |
| 812c: | ldr | r2, [r2, fp] |

-continued

| | | |
|---|---|---|
| 8130: | str | r2, [ip, r3] |
| 8134: | str | r1, [ip, fp] |
| 8138: | b | 8098 <sort+0x68> |

In line 80*a*4 the first loop is conditionally if less or equal (−le) entered via the bala instruction, which switches into loop acceleration mode. The loop is left in lines 80*b*4 and 80*d*0. Line 80*b*4 uses the bass instruction, leaving the loop and switching back to superscalar execution mode if the condition less-then (−lt) is met. Line 80*d*0 continues the loop in loop acceleration mode if the condition less-equal (−le) is met with the boss instructions. If the condition is not met, the loop is left and operation is switched into superscalar mode.

The second loop is respectively optimized in lines 80*e*0, 80*f*0 and 810*c*.

Also the loops of the string compare algorithm are respectively optimized:

| | | | |
|---|---|---|---|
| 81d0: | balaeq | 81e0 <strcmp+0x54> | |
| 81d4: | b | 8254 <strcmp+0xc8> | |
| 81d8: | bics | ip, r2, ip | |
| 81dc: | bassne | 8254 <strcmp+0xc8> | |
| 81e0: | ldr | ip, [r0, #4]! | |
| 81e4: | add | r3, ip, #−16777216 ; 0xff000000 | |
| 81e8: | sub | r3, r3, #65536 ; 0x10000 | |
| 81ec: | sub | r3, r3, #256 ; 0x100 | |
| 81f0: | sub | r3, r3, #1 ; 0x1 | |
| 81f4: | bic | r2, r3, #2130706432 ; 0x7f000000 | |
| 81f8: | ldr | r3, [r1, #4]! | |
| 81fc: | bic | r2, r2, #8323072 | ; 0x7f0000 |
| 8200: | bic | r2, r2, #32512; 0x7f00 | |
| 8204: | cmp | ip, r3 | |
| 8208: | bic | r2, r2, #127 ; 0x7f | |
| 820c: | bosseq | 81d8 <strcmp+0x4c> | |
| 8210: | mov | r2, r0 | |
| 8214: | ldrb | r3, [r2] | |
| 8218: | cmp | r3, #0 ; 0x0 | |
| 821c: | balane | 8234 <strcmp+0xa8> | |
| 8220: | b | 8248 <strcmp+0xbc> | |
| 8224: | ldrb | r3, [r2, #1]! | |
| 8228: | cmp | r3, #0 ; 0x0 | |
| 822c: | add | r1, r1, #1 ; 0x1 | |
| 8230: | basseq | 8248 <strcmp+0xbc> | |
| 8234: | ldrb | r0, [r1] | |
| 8238: | cmp | r0, r3 | |
| 823c: | bosseq | 8224 <strcmp+0x98> | |
| 8240: | rsb | r0, r0, r3 | |
| 8244: | bx | lr | |
| 8248: | ldrb | r0, [r1] | |
| 824c: | rsb | r0, r0, r3 | |
| 8250: | bx | lr | |
| 8254: | mov | r0, #0 ; 0x0 | |
| 8258: | bx | lr | |

The first loop is conditionally entered in line 81*d*0 with the condition equal (−eq) with the bala instruction which switches to loop acceleration mode. The loop is conditionally left in line 81*dc* or line 820*c*. In line 81*dc* the loop is left via the bass instruction if the condition not-equal (−ne) is met and the execution mode is switched to superscalar. Line 820*c* continues the loop if the condition equal (−eq) is met, if not the instruction boss switches back to superscalar mode and exits the loop.

The second loop is accordingly optimized.

Optimizing conditional executions have been discussed and accordingly a second optimization might be performed. For the sake of effort we solely concentrate on the Quicksort code. One skilled in the art understands that the methods are obviously also applicable on the string-compare code as to any other code.

The Quicksort loops have been modified for extended conditional execution and partitioned into Catenae (see [9]):

```
<Catena n>
  8098:         cmp      r5, sl
  809c:         ldrle    r0, [sp]
  80a0:         addle    r4, r0, r5, lsl #2
  80a4:         balale   80b8 <sort+0x88>
  80a8:         b        80d4 <sort+0xa4>
<Catena n+1>
  80ac:         add      r5, r5, #1 ; 0x1
  80b0:         cmp      sl, r5
  80b8: ge      ldr      r0, [r4]
  80bc: ge      mov      r1, r8
  80c0: ge      mov      lr, pc
  80cc: ge      add      r4, r4, #4 ; 0x4
  80b4:         basslt   80d4 <sort+0xa4>
  80c4:         bx       r7
<Catena n+2>
  80c8:         cmp      r0, #0  ; 0x0
  80d0:         bossle   80ac <sort+0x7c>
<Catena n+3>
  80d4:         cmp      r6, r9
  80d8:         ldrge    r0, [sp]
  80dc:         addge    r4, r0, fp
  80e0:         balage   80f4 <sort+0xc4>
  80e4:         b        8114 <sort+0xe4>
<Catena n+4>
  80e8:         sub      r6, r6, #1 ; 0x1
  80ec:         cmp      r6, r9
  80f4: ge      ldr      r0, [r4]
  80f8: ge      mov      r1, r8
  80fc: ge      mov      lr, pc
  8108: ge      sub      r4, r4, #4 ; 0x4
  80f0:         basslt   8110 <sort+0xe0>
  8100:         bx       r7
<Catena n+5>
  8104:         cmp      r0, #0  ; 0x0
  810c:         bossgt   80e8 <sort+0xb8>
<Catena n+6>
  8110:         mov      fp, r6, lsl #2
  8114:         cmp      r5, r6
  8118:         bge      813c <sort+0x10c>
  811c:         ldr      r2, [sp]
  8120:         mov      r3, r5, lsl #2
  8124:         ldr      r1, [r2, r3]
  8128:         ldr      ip, [sp]
  812c:         ldr      r2, [r2, fp]
  8130:         str      r2, [ip, r3]
  8134:         str      r1, [ip, fp]
  8138:         b        8098 <sort+0x68>
```

Beginning with the basslt instruction in line 80b4 an additional conditional execution level has been introduced, so that the instructions 80b8, 80bc, and 80c0 are conditionally executed if the condition less-then (–lt) of the basslt instruction is not met. Respectively those instructions are executed if the inverted instruction greater (ge)—which is not-less-then (!less-then)—is met. This additional conditional execution level is defined in the exemplary assembly code in the second column, right after the line number and in front of the instruction mnemonic. A plurality of levels can be defined in that column, separated by comma and growing from right to left. The used conditional execution optimization algorithm optimizes conditional execution such, that all jumps are moved directly in front of a barrier instruction. Barrier instructions define a barrier which is not crossed during optimization. Therefore a first optimization must end in front of the barrier instruction, while a second subsequent optimization my start right after the barrier. For example, jumps to outside of a respective loop (line 80c4 (bx)) qualify as such a barrier. Different kind of instructions may qualify as a barrier, depending on the instruction set of the processor, the optimizer strategy and/or the algorithms being optimized. However, i) jumps to functions outside a routine being optimized and/or ii) jumps leaving the loop body (e.g. after loop termination) typically define such barriers.

Just for visualization purposes line 80b4 has been moved directly in front of line 80c4.

The same optimization is done in lines 80f0 to 8100, with bx in line 8100 being the barrier.

The Catenae are preferably partitioned such, that each can be iterated a plurality of times depending on the capability of the processor (e.g. the ALU Block and/or register file), before processing continues with the next Catena. For that purpose, instructions are moved (if possible), so that each Catena becomes self-contained. For example line 80cc is moved to Catena n+1. As the execution of this instruction depends on the jump basslt in line 80b4, a conditional execution flag inverse to less-then (basslt in line 80b4), which is "eq", is added. The same optimization is done with line 8108 in Catena n+4. It shall be noted, that the optimizer preferably changes the line numbering for consistency, but for sake of simplicity and reference the original line numbers are kept in this example.

With that optimization Catena n+1 and Catena n+4 become self-contained, capable of preparing input data of each iteration for calling the string compare function in line 80c4 and line 8100 respectively.

The resulting code performs the inner loops very efficiently. However, the switching back from loop acceleration mode into superscalar mode (as it is e.g. done for Catena n+3 and/or Catena n+6) might be a waste of performance, particularly if the code is embedded within an outer loop as it is the case in this exemplary Quicksort algorithm. This deficit becomes even more critical as Catena n+2 and Catena n+5 are very short and may not make adequate use of the processor hardware resources (e.g. an ALU-Block).

Therefore, in one optimization step only one time executed code (in superscalar mode) might be tied into existing Catenae operating in loop acceleration more and/or switched into one time executed code in loop acceleration mode. Respective code is shown below:

```
<Catena m>
  8098:         cmp      r5, sl
  809c:         ldrle    r0, [sp]
  80a0:         addle    r4, r0, r5, lsl #2
  80a4:         balale   80b8 <sort+0x88>
  80a8:         b        80d4 <sort+0xa4>
<Catena m+1>
  80ac:         add      r5, r5, #1 ; 0x1
  80b0:         cmp      sl, r5
  80b8: ge      ldr      r0, [r4]
  80bc: ge      mov      r1, r8
  80c0: ge      mov      lr, pc
  80cc: ge      add      r4, r4, #4 ; 0x4
  80b4:         basslt   80d4 <sort+0xa4>
  80c4:         bx       r7
<Catena m+2>
  80c8:         cmp      r0, #0  ; 0x0
  80d0:         ble      80ac <sort+0x7c>
  80d4: gt      cmp      r6, r9
  80d8: gt      ldrge    r0, [sp]
  80dc: gt      addge    r4, r0, fp
  80e0: gt      balage   80f4 <sort+0xc4>
  80e4: gt      b        8114 <sort+0xe4>
<Catena m+3>
  80e8:         sub      r6, r6, #1 ; 0xl
  80ec:         cmp      r6, r9
  80f4: ge      ldr      r0, [r4]
  80f8: ge      mov      r1, r8
  80fc: ge      mov      lr, pc
  8108: ge      sub      r4, r4, #4 ; 0x4
  80f0:         basslt   8110 <sort+0xe0>
  8100:         bx       r7
```

-continued

```
<Catena m+4>
  8104:           cmp    r0, #0     ; 0x0
  810c:           bgt    80e8 <sort+0xb8>
  8110: le        mov    fp, r6, lsl #2
  8114: le        cmp    r5, r6
  811c: lt,le     ldr    r2, [sp]
  8120: lt,le     mov    r3, r5, lsl #2
  8124: lt,le     ldr    r1, [r2, r3]
  8128: lt,le     ldr    ip, [sp]
  812c: lt,le     ldr    r2, [r2, fp]
  8130: lt,le     str    r2, [ip, r3]
  8134: lt,le     str    r1, [ip, fp]
  8118: le        bge    813c <sort+0x10c>
  8138           b      8098 <sort+0x68>
```

Catena n becomes Catena m; Catena n+1 becomes Catena m+1; Catenae n+2 and n+3 are combined into Catena m+2; Catena n+4 becomes Catena m+4 and Catenae n+5 and n+6 are combined into Catena m+4.

As the execution mode is not switched to superscalar, but remains in loop acceleration, the boss instructions in line 80d0 and 810c are replaced by normal branch instructions b again. The bala instruction in line 80e0 may remain bala or be changed into an ordinary branch instruction b, this does not matter as the processor remains in loop acceleration mode. However it might be beneficial to instruct to processor that another loop is entered. Therefore, in this example, the bala instruction remains in the code.

Lines 80d4 to 80e4 in Catena m+2 can only executed if the condition for the jump instruction in line 80d0 is not met. Therefore, respectively a conditional level is added, which is the invers of less-equal (not-less-equal=greater-then "gt").

In Catena m+4 the whole code below the condition execution in line 810c, which are lines 8110 to 8138, are conditionally executed only if the condition of line 810c is not met. Therefore an additional conditional level is added to those instructions, which is less-equal "le" (the invers of greater-then).

In accordance to the previously discussed optimizations, line 8118 is moved in front of the barrier instruction, which is in this exemplary case the branch instruction exiting the loop in line 8138. This instruction has been changed into bass, switching back from loop acceleration into superscalar mode. The conditional jump in line 8118 requires to add another conditional level controlling the instructions in lines 811c to 8134, which is the invers of greater-equal (not-greater-equal=less-then "lt").

The discussed optimizations might be performed with or on basis of algorithms previously described in this patent. The optimization might be performed within a compiler (e.g. as optimization pass or in the back-end), as a separated postprocessing tool (e.g. before linking and/or assembly), as part of the operation system (e.g. the loader) and/or within the processor hardware.

The invention and its capabilities have been demonstrated with two well-known algorithms a FIR filter and Quicksort. Those algorithms have been carefully selected to disclose the invention and show its capabilities. On this basis it becomes obvious for one skilled in the art how the invention applies on other even more complex algorithms.

Applicability on State-of-the-Art Processors

One skilled in the art understands that many of the disclosed inventions are applicable on standard RISC, CISC and VLIW processors, even without requiring an array of ALUs (ALU Block). Examples for using ARM and Intel instruction sets have been disclosed.

Respective optimizers might be partially or completely implemented in hardware and/or partially or completely implemented in software, e.g. compilers, linkers, separated optimizer tools or steps and/or the operation system.

Applicability on Compilers and Operating Systems

Respective optimizers might be partially or completely implemented in compilers (e.g. JAVA, C, C++, Fortran, etc) or compilation tools. Alternatively or additionally the optimizers or part of the optimizers might be implemented as a part of an operating system (e.g. Linux, Windows, Android, etc) being executed on the target processor. It shall be noted, that even with extensive software support, some modifications of the processor hardware according to this patent might be required of beneficial.

EMBODIED LITERATURE AND PATENTS/PATENT APPLICATIONS

The following references fully embodied into the patent for complete disclosure. It is expressively noted, that claims may comprise elements of any reference embodied into the specification:

[1] x86 Instruction Set Architecture; Tom Shanley; Mindshare Inc.; ISBN978-0-9770878-5-3
[2] Pentium PRO and Pentium II System Architecture; Second Edition; Tom Shanley; Mindshare Inc.; ISBN978-0-201-30973-7
[3] PCT/EP 2009/007415 (WO2010/043401); M. Vorbach
[4] The unabridged Pentium 4; IA32 Processor Genealogy; Tom Shanley; Mindshare Inc.; ISBN0-321-25656-X
[5] Compilers Principles, Techniques, & Tools; Second Edition; Alfred V. Aho, Monica S. Lam, Ravi Sethi, Jeffrey D. Ullman, Addison Wesley; ISBN 0-321-48681-1; (The purple dragon)
[6] Trace Cache: a Low Latency Approach to High Bandwidth Instruction Fetching; Rotenberg, Bennett, Smith; IEEE; Proceedings of the 29th Annual International Symposium on Microarchitecture, Dec. 2-4, 1996, Paris
[7] PCT/EP 2010/003459 (WO 2010/142432), M. Vorbach
[8] ARM7TDMI-S Data Sheet (ARM DDI 0084D), ARM Limited, UK
[9] EP 10 007 074.7, M. Vorbach (ZZYX09c)
[10] EP 10 007 437.6, M. Vorbach (ZZYX09d)
[11] EP 10 007 657.9, M. Vorbach (ZZYX09e)
[12] EP 10 008 734.5, M. Vorbach (ZZYX09f/EP-dp)
[13] EP 10 010 803.4, M. Vorbach (ZZYX09g)
[14] EP 10 013 253.9, M. Vorbach (ZZYX09h)
[15] EP 10 013 932.8, M. Vorbach (ZZYX09i)
[16] EP 10 016 117.3, M. Vorbach (ZZYX09k)
[17] EP 11 OOO 597.2, M. Vorbach (ZZYX10)
[18] EP 11 001 305.9, M. Vorbach (ZZYX10b)
[19] EP 11 004 033.4, M. Vorbach (ZZYX10c)
[20] Optimizing compilers for modern architectures; Randy Allen & Ken Kennedy; Moran Kaufmann Publishers; ISBN-13:978-1-55860-286-1; ISBN-10:1-55860-286-0

The invention claimed is:
1. A processor comprising:
a trace cache;
a plurality of ALUs arranged in a matrix; and
an analyser unit connected to the trace cache, the analyser unit:
analysing the code in the trace cache;
detecting loops in the code;
transforming the code, including arranging the code into sections of the code mapping to multiple ALUs of the plurality of ALUs; and issuing to the multiple ALUs the sections of the code for joint execution of instructions in the sections of code for a plurality of clock cycles, each instruction in one of the sections of code being issued to a different ALU within the matrix, and at least one of the instructions issued to one of the ALUs staying temporarily fixed for a plurality of clock cycles while multiple data words are streamed through the ALU.

2. The processor of claim 1 wherein the sections of the code are loops or loop partitions that are statically mapped to the multiple ALUs until the loops terminate.

3. The processor of claim 1 wherein the sections of the code are mapped to the multiple ALUs based on dependencies between multiple instructions in the code.

4. The processor of claim 1 wherein transforming the code includes analyzing dependencies between multiple instructions in the code, and setting up connections between one or more pairs of the plurality of ALUs, wherein the connections allow one or more results from execution of instructions by one or more result-generating ALUs to be fed to one or more ALUs that execute instructions dependent on the one or more results.

5. The processor of claim 1 further comprising loop control hardware to compute a loop termination criterion for at least one of the detected loops in the code.

6. The processor of claim 5 wherein the loop control hardware includes a counter.

7. The processor of claim 1, wherein each of the multiple data words is processed based on a same temporarily fixed instruction.

8. The processor of claim 7, wherein after the plurality of clock cycles, a new instruction is issued to at least one of the ALUs.

9. The processor of claim 5 wherein transforming the code includes evaluating at least one of a loop header and a loop footer and setting one or more parameters of the loop control hardware based on the evaluation.

10. The processor of claim 9, wherein transforming the code includes removing code controlling the loop from execution by the plurality of ALUs after setting the one or more parameters of the loop control hardware.

* * * * *